US009246777B2

(12) United States Patent
Murase et al.

(10) Patent No.: US 9,246,777 B2
(45) Date of Patent: Jan. 26, 2016

(54) COMPUTER PROGRAM AND MONITORING APPARATUS

(75) Inventors: Kaori Murase, Yokohama (JP); Masataka Nagura, Yokohama (JP); Takayuki Nagai, Machida (JP); Takaki Kuroda, Machida (JP); Kazuyoshi Hoshino, Tokyo (JP)

(73) Assignee: HITACHI, LTD., Tokyo (JP)

( * ) Notice: Subject to any disclaimer, the term of this patent is extended or adjusted under 35 U.S.C. 154(b) by 611 days.

(21) Appl. No.: 13/634,779

(22) PCT Filed: Feb. 14, 2012

(86) PCT No.: PCT/JP2012/053412
§ 371 (c)(1),
(2), (4) Date: Sep. 13, 2012

(87) PCT Pub. No.: WO2013/121529
PCT Pub. Date: Aug. 22, 2013

(65) Prior Publication Data
US 2013/0212257 A1    Aug. 15, 2013

(51) Int. Cl.
*G06F 15/173* (2006.01)
*H04L 12/26* (2006.01)
*H04L 12/24* (2006.01)

(52) U.S. Cl.
CPC .............. *H04L 43/00* (2013.01); *H04L 41/065* (2013.01); *H04L 41/0631* (2013.01)

(58) Field of Classification Search
USPC .............. 709/224; 702/58, 183, 182; 714/39, 714/E11.197, E11.207
See application file for complete search history.

(56) References Cited

U.S. PATENT DOCUMENTS

| 7,251,584 | B1 * | 7/2007 | Perazolo et al. | 702/183 |
| 2002/0111755 | A1 * | 8/2002 | Valadarsky et al. | 702/58 |
| 2009/0313198 | A1 | 12/2009 | Kudo et al. | |
| 2010/0325493 | A1 * | 12/2010 | Morimura et al. | 714/39 |

(Continued)

FOREIGN PATENT DOCUMENTS

| JP | 2008-014041 A | 2/2008 |
| JP | 2010-086115 A | 4/2010 |

(Continued)

OTHER PUBLICATIONS

International Search Report received in corresponding International Application No. PCT/JP2012/053412 dated Jun. 12, 2012.

*Primary Examiner* — Kyung H Shin
(74) *Attorney, Agent, or Firm* — Mattingly & Malur, PC

(57) ABSTRACT

To analyze the cause if an event occurred to a plurality of monitoring targets. A monitoring computer 101 includes a general rule storing part 136 configured to store a general rule, wherein the general rule previously associates a first event which can occur in any of the plurality of monitoring targets and a second event which can cause the first event, an correlation rule generating part 129 configured to generate an correlation rule, wherein the correlation rule is created based on the general rule and configuration information, and in the case where a predetermined number or more of events corresponding to the second events are detected, the correlation rule indicates that an event corresponding to the first event will occur, and an analyzing part 125 configured to analyze a cause of an event indicated by the event information based on received event information and the correlation rule.

10 Claims, 40 Drawing Sheets

(56) References Cited

U.S. PATENT DOCUMENTS

2011/0302305 A1  12/2011  Morimura et al.
2012/0030346 A1  2/2012  Fukuda et al.

FOREIGN PATENT DOCUMENTS

| JP | 2012-003406 A | 1/2012 |
| WO | 2012/014305 A1 | 2/2012 |

* cited by examiner

FIG. 3

(a) COMPUTER MANAGING TABLE OF CONFIGURATION INFORMATION TABLE

| IDENTI-FIER | TYPE | PROVIDED SERVICE | ACCESS SERVICE | CONNECTED SWITCH |
|---|---|---|---|---|
| ServerA | Computer | WebService | — | NwSwitchA, NwSwitchB |
| ServerB | Computer | WebService | — | NwSwitchA, NwSwitchB |
| ServerC | Computer | WebService | — | NwSwitchA, NwSwitchB |
| ServerD | Computer | WebService | — | NwSwitchA, NwSwitchB |
| Client | Computer | — | WebService | NwSwitchA |
| ... | ... | ... | ... | ... |

(b) NETWORK SWITCH MANAGING TABLE OF CONFIGURATION TABLE

| MANAGED COMPONENT IDENTIFIER | MANAGED COMPONENT TYPE | CONNECTED COMPUTER |
|---|---|---|
| NwSwitchA | IpSwitch | ServerA, ServerB, ServerC, ServerD, Client |
| ... | ... | ... |

FIG. 4

| | GENERAL RULES IN GENERAL RULE REPOSITORY | |
|---|---|---|

400a

| | GENERAL RULE NAME | GeneralRule1 |
|---|---|---|
| 411a | | |
| 412a | I F | Computer. ACCESS SERVICE=%ServiceX% (%ServiceX%)AveResponseTime_Err |
| | 432 | Computer. PROVIDED SERVICE=%ServiceX%  Nic_Err  [2>=]  431 |
| 413a | T H E N | Computer. PROVIDED SERVICE=%ServiceX%  Nic_Err |

400b

| | GENERAL RULE NAME | GeneralRule2 |
|---|---|---|
| 411b | | |
| 412b | I F | Computer. ACCESS SERVICE=%ServiceX% (%ServiceX%)AveResponseTime_Err<br>IpSwitch  PacketLossRateExceeded |
| 413b | T H E N | IpSwitch  PacketLossRateExceeded |

400c

| | GENERAL RULE NAME | GeneralRule3 |
|---|---|---|
| 411c | | |
| 412c | I F | IpSwitch  Port LinkDown<br>Computer  Nic_Err |
| 413c | T H E N | Computer  Nic_Err |

| | | |
|---|---|---|
| 511a | TARGET GENERAL RULE | GeneralRule1 |
| 512a | ORIGIN CONDITION | Computer && <br> Computer. PROVIDED SERVICE=%ServiceX% |
| 513a | ENDPOINT CONDITION | Computer && <br> Computer. ACCESS SERVICE=%ServiceX% |
| 514a | TRANSIT CONDITION | — |
| 515a | TOPOLOGY CONSTRUCTION CONDITION | (Computer. PROVIDED SERVICE) <br> =(Computer. ACCESS SERVICE) =%ServiceX% |

500b

| | | |
|---|---|---|
| 511b | TARGET GENERAL RULE | GeneralRule2 |
| 512b | ORIGIN CONDITION | Computer && <br> Computer. ACCESS SERVICE=%ServiceX% |
| 513b | ENDPOINT CONDITION | Computer && <br> Computer. PROVIDED SERVICE=%ServiceX% |
| 514b | TRANSIT CONDITION | IpSwitch |
| 515b | TOPOLOGY CONSTRUCTION CONDITION | (Computer. CONNECTED NETWORK SWITCH) <br> = (IpSwitch. MANAGED COMPONENT IDENTIFIER), <br> (IpSwitch. CONNECTED COMPUTER) <br> =(Computer. MANAGED COMPONENT IDENTIFIER), <br> (Computer. PROVIDED SERVICE) <br> = (Computer. ACCESS SERVICE) |

500c

| | | |
|---|---|---|
| 511c | TARGET GENERAL RULE | GeneralRule3 |
| 512c | ORIGIN CONDITION | IpSwitch |
| 513c | ENDPOINT CONDITION | Computer |
| 514c | TRANSIT CONDITION | — |
| 515c | TOPOLOGY CONSTRUCTION CONDITION | (Computer. CONNECTED NETWORK SWITCH) <br> = (IpSwitch. MANAGED COMPONENT IDENTIFIER), <br> (IpSwitch. CONNECTED COMPUTER) <br> =(Computer. MANAGED COMPONENT IDENTIFIER) |

FIG. 6A

GROUP OF CORRELATION RULES WITH CONCLUSION OF ServerA Nic_Err

600a
IF  ___601
  <Client (WebService)AveResponseTime_Err>
  <ServerA Nic_Err>
  <ServerB Nic_Err>

THEN ___602
  <ServerA Nic_Err>

600b
IF
  <Client (WebService)AveResponseTime_Err>
  <ServerA Nic_Err>
  <ServerC Nic_Err>
THEN
  <ServerA Nic_Err>

600c
IF
  <Client (WebService)AveResponseTime_Err>
  <ServerA Nic_Err>
  <ServerD Nic_Err>
THEN
  <ServerA Nic_Err>

FIG. 6B

GROUP OF CORRELATION RULES WITH CONCLUSION OF ServerB Nic_Err

600d
```
IF
  <Client (WebService)AveResponseTime_Err>
  <ServerB Nic_Err>
  <ServerA Nic_Err>
THEN
  <ServerB Nic_Err>
```

600e
```
IF
  <Client (WebService)AveResponseTime_Err>
  <ServerB Nic_Err>
  <ServerC Nic_Err>
THEN
  <ServerB Nic_Err>
```

600f
```
IF
  <Client (WebService)AveResponseTime_Err>
  <ServerB Nic_Err>
  <ServerD Nic_Err>
THEN
  <ServerB Nic_Err>
```

FIG. 8

| ITEM NAME | ITEM VALUE |
|---|---|
| MANAGED COMPONENT TYPE | Computer |
| MANAGED COMPONENT IDENTIFIER | ServerA |
| EVENT TYPE | Nic_Err |

EVENT MESSAGE 805

801 — MANAGED COMPONENT TYPE
802 — MANAGED COMPONENT IDENTIFIER
803 — EVENT TYPE

FIG. 9

| | EVENT QUEUE TABLE 132 | | | |
|---|---|---|---|---|
| | 901 | 902 | 903 | 904 |
| | MANAGED COMPONENT TYPE | MANAGED COMPONENT IDENTIFIER | EVENT TYPE | RECEIVED DATE AND TIME |
| 911 | Computer | ServerA | Nic_Err | 4/7/2008 10:20:11 |
| | Computer | ServerB | Nic_Err | 4/7/2008 10:20:20 |
| | Computer | Cilent | (WebService)Ave ResponseTime_Err | 4/7/2008 10:20:35 |
| | ... | ... | ... | ... |

FIG. 10

| | EVENT DELETE CONFIGURATION TABLE 133 | | |
|---|---|---|---|
| | MANAGED COMPONENT TYPE 1001 | EVENT TYPE 1002 | TERM OF VALIDITY (MINUTE) 1003 |
| 1011 | Computer | Nic_Err | 10 |
| | Computer | (WebService)AveResponseTime_Err | 15 |
| | ... | ... | ... |
| | ipSwitch | Port_LinkDown | 15 |
| | ipSwitch | PacketLossRate Exceeded | 20 |
| | ... | ... | ... |

FIG. 11

| | EVENT DELETE TASK TABLE 134 | |
|---|---|---|
| START DATE AND TIME (1101) | MANAGED COMPONENT IDENTIFIER (1102) | EVENT TYPE (1103) |
| 4/7/2008 10:30:11 | ServerA | Nic_Err |
| 4/7/2008 10:30:20 | ServerB | Nic_Err |
| 4/7/2008 10:35:35 | Cilent | (WebService)Ave ResponseTime_Err |
| ... | ... | ... |

1111 points to the first data row.

FIG. 12

| | GENERAL RULE SEARCH TABLE 131 | | |
|---|---|---|---|
| | MANAGED COMPONENT TYPE /1201 | EVENT TYPE /1202 | GENERAL RULE NAME /1203 |
| 1211 | Computer | Nic_Err | GeneralRule1 |
| 1212 | Computer | Nic_Err | GeneralRule3 |
| | Computer | (WebService)AveResponseTime_Err | GeneralRule1 |
| | Computer | (WebService)AveResponseTime_Err | GeneralRule2 |
| | ... | ... | ... |
| | ipSwitch | Port_LinkDown | GeneralRule2 |
| | ipSwitch | PacketLossRate Exceeded | GeneralRule3 |
| | ... | ... | ... |

FIG. 21

| OCCURRED PHENOMENON | ROOT CAUSE PLACE | CAUSE STATE | MATCHING RATIO |
|---|---|---|---|
| AVERAGE RESPONSE TIME OF CLIENT COMPUTER SERVICE INCREASING ERROR | SERVER A | NIC FAULT | 1.00 |
| AVERAGE RESPONSE TIME OF CLIENT COMPUTER SERVICE INCREASING ERROR | SERVER B | NIC FAULT | 1.00 |
| AVERAGE RESPONSE TIME OF CLIENT COMPUTER SERVICE INCREASING ERROR | SERVER C | NIC FAULT | 0.66 |
| AVERAGE RESPONSE TIME OF CLIENT COMPUTER SERVICE INCREASING ERROR | SERVER D | NIC FAULT | 0.66 |
| AVERAGE RESPONSE TIME OF CLIENT COMPUTER SERVICE INCREASING ERROR | SWITCH A | PACKET LOSS EXCEEDED | 0.50 |

CLOSE

FIG. 23

(a) COMPUTER MANAGING TABLE OF CONFIGURATION INFORMATION TABLE

| IDENTIFIER | TYPE | PROVIDED SERVICE | ACCESS SERVICE | LOAD BALANCER |
|---|---|---|---|---|
| ServerP | Computer | DNSService | — | LoadBalancerA |
| ServerQ | Computer | DNSService | — | LoadBalancerA |
| ServerR | Computer | DNSService | — | LoadBalancerA |
| ServerS | Computer | DNSService | — | LoadBalancerA |
| ServerX | Computer | MailService | DNSService | — |
| ... | ... | ... | ... | ... |

(b) LOAD BALANCER MANAGING TABLE OF CONFIGURATION INFORMATION TABLE

| MANAGED COMPONENT IDENTIFIER | MANAGED COMPONENT TYPE | CONNECTED COMPUTER |
|---|---|---|
| LoadBalancerA | LB | ServerP, ServerQ, ServerR, ServerS, ServerX |
| ... | ... | ... |

FIG. 24

| | 2400 | |
|---|---|---|
| 2411 | GENERAL RULE NAME | GeneralRule11 |
| 2412 | I F | Computer. ACCESS SERVICE=%ServiceX% ServiceResponseTime_ThresholdErr<br><br>Computer. PROVIDED SERVICE=%ServiceX%  Nic_Err  [2>=]  2431 |
| 2413 | T H E N | Computer. PROVIDED SERVICE=%ServiceX%  Nic_Err |

FIG. 25

| | | |
|---|---|---|
| 2511 | TARGET GENERAL RULE | GeneralRule11 |
| 2512 | ORIGIN CONDITION | Computer &&<br>Computer. PROVIDED SERVICE=%ServiceX% |
| 2513 | ENDPOINT CONDITION | Computer &&<br>Computer. ACCESS SERVICE=%ServiceX% &&<br>Computer. PROVIDED SERVICE=%ServiceY% |
| 2514 | TRANSIT CONDITION | LoadBalancer |
| 2515 | TOPOLOGY CONSTRUCTION CONDITION | (Computer. CONNECTED LOAD BALANCER)<br>= (LB. MANAGED COMPONENT IDENTIFIER),<br>(LB. CONNECTED COMPUTER)<br>=(Computer. MANAGED COMPONENT IDENTIFIER),<br>(Computer. PROVIDED SERVICE) =(Computer. ACCESS SERVICE) |

2500

COMPUTER PROGRAM AND MONITORING APPARATUS

TECHNICAL FIELD

The present invention relates to a computer program and a monitoring apparatus.

BACKGROUND ART

As various IT (an abbreviation for information technology) apparatuses are connected to one another via networks, IT systems have complicated and scaled up. A fault occurred in an IT system affects the various IT apparatuses over the networks.

As a root cause analyzing technology for identifying the cause place and the cause event of each of these faults, Patent Literature 1 discloses a fault analyzing technology for analyzing fault descriptions received from the IT apparatuses for the root cause place and the cause event of the fault. When an IT apparatus has a fault, it notifies the computer of the fault as event information.

In a conventional fault analyzing technology, a control program configured to analyze a fault accumulates various status information (particularly fault information) of controlled apparatuses in an event DB (database) as events.

The control program has an correlation rule. The correlation rule describes the cause event which may occur in a component and a group of related events which may be triggered by the cause event in an IF-THEN statement.

The control program estimates a cause event of a plurality of faults which exist in the controlled apparatuses based on a plurality of events and correlation rules acquired from the controlled apparatus. Depending on IT systems to be controlled, system topologies may be substantially different. Here, the system topology means relationship among managed components and, hereinafter, may be referred to as "topology" for short.

Since the system topologies may be largely different, the control program has a fault propagation model (hereinafter, referred to as "general rule") which is described in an independent manner from the topology. Further, the control program has configuration information including the topology of the IT system to be controlled, and generates an correlation rule according to the environment of the controlling target based on the fault propagation model and the configuration information.

CITATION LIST

Patent Literature

[Patent Literature 1] Japanese Patent Laid-Open No. 2010-86115

SUMMARY OF INVENTION

Technical Problem

Recent IT systems mostly adopts an HA (High Availability) configuration or a load distribution configuration. The HA configuration provides standby equipment or a standby equipment component for providing redundancy for the IT system so that the IT system can maintain its normal state on the whole even if a fault occurs in part of the IT system. The load distribution configuration distributes processes among a plurality of apparatuses or components to improve scalability of applications, apparatuses, and components forming the apparatus.

In a configuration for implementing a virtual application or apparatus by a plurality of managed components (hereinafter, also referred to as "virtual component") as in the case of a redundant configuration (HA configuration) or a load distribution configuration, fault propagation patterns can be divided as described below.

In the above described type of configuration, a possible fault propagation pattern may be that an event occurred in a managed component triggers an event in one or more other managed components. Another possible fault propagation pattern may be that a combination of events separately occurred in a plurality of managed components triggers an event in a different managed component. The fault propagation pattern from a combination of a plurality of events can be divided into two cases as shown below.

(a) A case where occurrence of an event in all the managed components which implement a virtual component in a redundant configuration or a load distribution configuration may trigger an event in another managed component.

(b) A case where occurrence of an event in a certain number or more of the managed components which implement a virtual component in a redundant configuration or a load distribution configuration may trigger an event in another managed component.

An example of the fault propagation pattern (a) includes a case shown below. For example, in a Web service provided by Web servers which are in a load distribution configuration, when a fault event occurs in all the Web servers which form the Web service, an access error to the Web service occurs in the client computers.

An example of the fault propagation pattern (b) includes a case shown below. For example, in a Web service provided by Web servers which are in a load distribution configuration, when a fault event occurs in some of the Web servers, a performance error of the Web service occurs in the client computers.

The above described conventional art describes a technology for diagnosing a cause of a fault occurred in the monitoring target apparatuses which form the IT system. In the conventional art, the associations among types of the events to occur in the apparatuses are defined in IF-THEN rules and the topology conditions of the monitoring target apparatuses to which the rules are to be applied are previously defined. As a result, the conventional art automatically generates a rule depending on the environment of the monitoring targets based on the configuration information of the monitoring target apparatuses. Then, the conventional art analyzes the automatically generated rules and events received from the plurality of monitoring target apparatuses for the cause of the fault.

However, the conventional art does not take account of the root cause analysis of a problem of the above described pattern in which a combination of events occurred in a plurality of managed components triggers a fault in another managed component. Therefore, the conventional art cannot generate a rule for the root cause analysis corresponding to the IT system in a redundant configuration or a load distribution configuration, and thus, should be improved.

The present invention is adapted in view of the above described problem and has an object of providing a computer program and a monitoring apparatus which are configured so that when a previously configured predetermined number or more of second events occurred in a previously grouped plurality of predetermined monitoring targets among a plurality of monitoring targets, the computer program and the monitoring apparatus can estimate that the second events would have caused the first event.

Solution to Problem

A computer program according to an aspect of the present invention is a computer program for causing a computer to function as a monitoring apparatus wherein the monitoring apparatus is for monitoring a computer system including a plurality of monitoring targets, the computer program comprising: a configuration information storing part configured to store configuration information of the plurality of monitoring targets; a general rule storing part configured to store a general rule, wherein the general rule previously associates a first event which can occur in any of the plurality of monitoring targets and a second event which can cause the first event, and in the case where a previously configured predetermined number or more of the second events occurred in a previously grouped plurality of predetermined monitoring targets among the plurality of monitoring targets, the general rule leads to an estimate that the second events would have caused the first event; an event information storing part configured to store event information of an event which occurred in the plurality of monitoring targets; an correlation rule generating part configured to generate an correlation rule, wherein the correlation rule is created based on the general rule and the configuration information, and in the case where the predetermined number or more of events corresponding to the second events are detected in events indicated by the event information, the correlation rule indicates that event corresponding to the first event of the events indicated by the event information will occur, and an analyzing part configured to analyze a cause of an event indicated by the received event information based on the received event information and the correlation rule.

BRIEF DESCRIPTION OF DRAWINGS

FIG. 3 is a diagram illustrating examples of configuration information table.

FIG. 4 is a diagram illustrating an example of a general rule repository.

FIG. 5 is a diagram illustrating an example of a topology construction method repository.

FIG. 6A is a diagram illustrating an example of an correlation rule list.

FIG. 6B is a diagram illustrating another example of the correlation rule list.

FIG. 8 is a diagram illustrating an exemplary data structure of an event message.

FIG. 9 is a diagram illustrating an exemplary data structure of an event queue table.

FIG. 10 is a diagram illustrating an exemplary data structure of an event delete configuration table.

FIG. 11 is a diagram illustrating an exemplary data structure of an event delete task table.

FIG. 12 is a diagram illustrating an exemplary data structure of a general rule search table.

FIG. 21 is an example of a screen shown on a display by an external module.

FIG. 23 is a diagram illustrating examples of a configuration information table of the embodiment 2.

FIG. 24 is a diagram illustrating an example of a general rule repository of the embodiment 2.

FIG. 25 is a diagram illustrating an example of a topology construction method repository of the embodiment 2.

DESCRIPTION OF EMBODIMENTS

Figure 1:
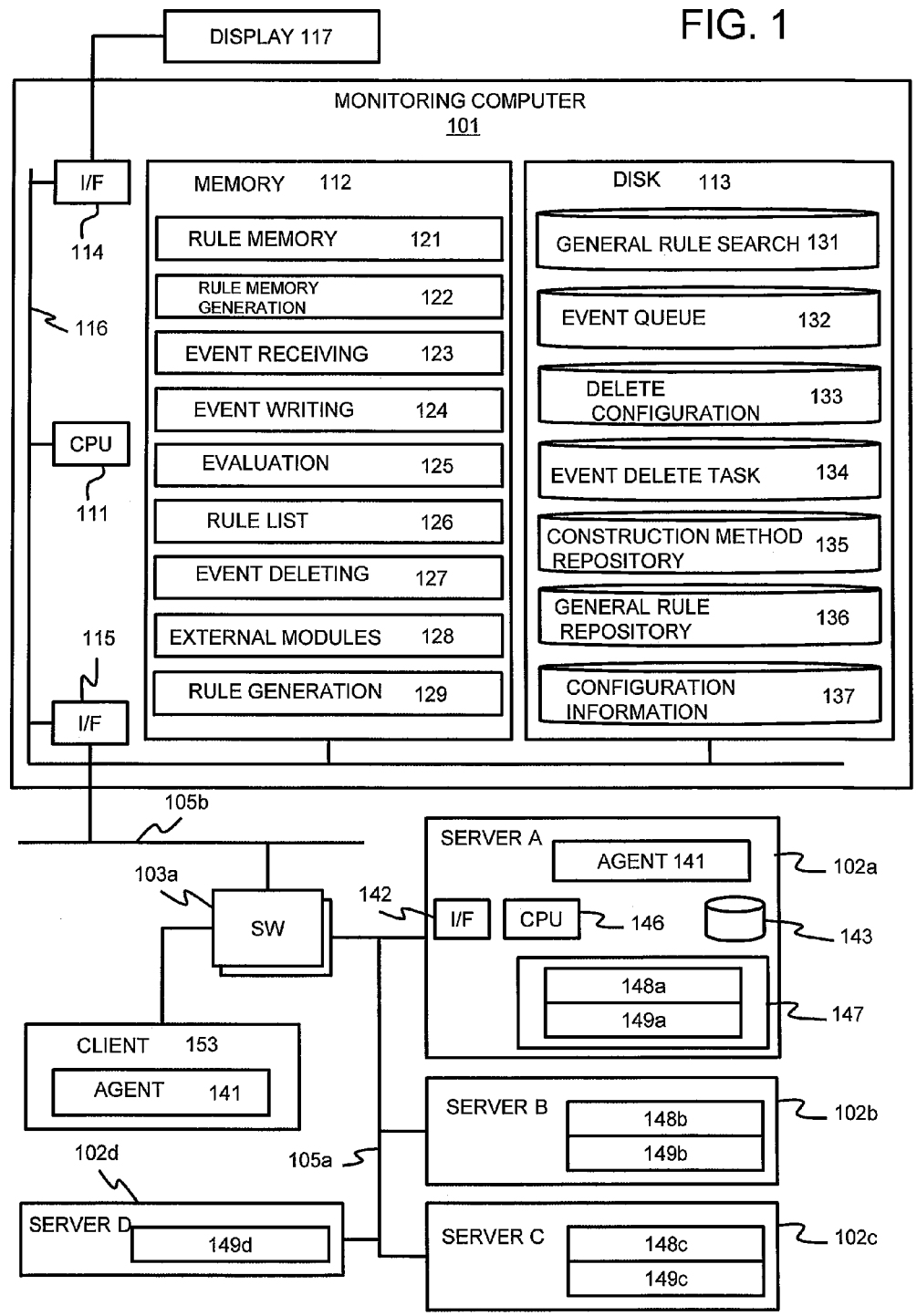
FIG. 1 is a diagram illustrating an example of hardware and a logical composition to which a method and an apparatus of the present invention can be applied.

The detailed description of the present invention below references the attached diagrams which form part of the disclosure; though, these diagrams show exemplified embodiments which can implement the present invention and do not limit the present invention. In these diagrams, the same reference codes denote the same components through the plurality of diagrams. In addition, it should be noted to those skilled in the art that the detailed description provides various exemplified embodiments, but the present invention is not limited to the embodiments described and shown in the specification and can be broadened to a publicly known embodiment or an embodiment to be publicly known in future as described and shown below.

Where the terms "an embodiment" or "the embodiment" are mentioned in the specification, it means that a specific characteristic, structure, or feature described in relation to the embodiment concerned is included in at least one embodiment of the present invention, and not all of these terms appeared throughout this specification necessarily specify the same embodiment.

The detailed description below discloses many specific detailed matters for the purpose of complete understanding of the present invention. However, as apparent to those skilled in the art, not all of these specific detailed matters are necessary to implement the present invention. In the other circumstances, in order to avoid unnecessarily complicating the present invention, publicly known structures, materials, circuits, processing, and interfaces are not described in detail and/or they are shown in the form of block diagram.

Further, the parts which are described in detail below are shown by algorisms for implementing operations inside a computer and by symbolic representations. These algorithmic descriptions and symbolic representations are used by a person skilled in the art who is versed in data processing technology as means for most efficiently communicating the essence of an invention made by the person skilled in the art to the other persons skilled in the art. The algorism is a series of defined steps to reach a desired final state or result. In this embodiment, a performed step requires a physical quantity of physical operation to realize a physical result.

Generally, but not necessarily, these quantities are in the form of an electric or magnetic signal which can be saved, transferred, combined, compared, and subjected to the other operations. It is known that these signals are conveniently referred to as bit, value, element, symbol, character, item, numeral, command, and the like in many cases because they can be commonly used in principle. However, it should be noted that all of them or the same items of them should be associated to an appropriate physical quantity and are merely expedient labels attached to these physical quantities.

Unless otherwise described, as it is apparent from the description below, the description using the terms "process," "compute," "calculate," "determine," "display," and the like may include operations and processing of other information processing apparatuses which operate data represented by a physical (electrical) quantity in a computer system or a register and a memory of the computer system to convert the data into the other data similarly represented as a physical quantity in a memory, register, or the other information storing apparatuses, information transmitting apparatuses, or information display unit of the computer system throughout the specification.

The present invention also relates to an apparatus for performing the operations described in this specification. The apparatus may be constructed specifically for a necessary purpose or may include one or more general-purpose computers which are selectively started or reconfigured by one or more computer programs. These computer programs can be saved in, for example, an optical disk, a magnetic disk, a read-only memory, a random access memory, a computer readable storage medium such as a solid state device and a drive, or any other medium which is suitable for saving electronic information, although the programs are not limited to be saved in them. Further, the computer program may be transmitted by a distribution computer which contains a storage medium storing these computer programs and a CPU for transmitting a computer program.

The algorisms and the displays shown in this specification are not essentially related to any specific computers and the other apparatuses. Various general-purpose systems may be used together with programs and modules taught by the specification, but in some cases, it is understood that constructing an apparatus more specific to perform a desired method step is more convenient. The structures of these various systems will be apparent from description disclosed below. The present invention does not describe any specific programming language as an assumption. As it is described below, it is understood that various programming language can be used for performing the teaching of the present invention. The command of the program language can be executed by one or more processing units such as a central processing unit (CPU), a processor, or a controller.

As it is described in detail below, the exemplified embodiments of the present invention provide an apparatus, a method, and a computer program for performing root cause analysis which is capable of diagnosing the root cause in the case where a fault in a fault propagation pattern in which a combination of events in a plurality of managed components is propagated to an event of another managed component (hereinafter, also referred to as "complex fault propagation pattern").

In the embodiment, a server computer, a network switch, a storage apparatus, parts and units which make up each apparatus, a program operating on each apparatus, and an information processing service provided by a program are collectively referred to as "managed component."

According to the exemplified embodiments, an analysis engine which is a program for analyzing the cause of a fault generates an correlation rule memory based on a general rule related to a received event and topology information including association information on redundant configuration and load distribution configuration of apparatuses and applications when the analysis engine receives each event.

The general rule is a fault propagation model described in a form independent from a specific topology, and each general rule has each topology construction method information for acquiring information on the topology to which the general rule concerned is to be applied (hereinafter, also referred to as "topology construction method" for short).

In these embodiments, a propagation condition that a combination of events occurred in a plurality of managed components is propagated to an event of another managed component is described in the general rule. Accordingly, in the embodiment, when an correlation rule memory is generated, an correlation rule is generated which enables the root cause analysis for complex fault propagation pattern by analyzing a propagation condition described in the general rule and acquiring the topology information to which the general rule is to be applied from the topology construction method. Then, in the embodiment, based on that correlation rule and a plurality of events received from the monitoring targets, the root cause is identified.

The technology disclosed in this specification relates to an operation management method, apparatus, system, program, a medium containing the program, and a distribution apparatus for the program for managing operation of an IT system including a server computer, a network apparatus, a storage apparatus, parts and units which make up each apparatus, a program operating on each apparatus, and an information processing service provided by the program.

With respect to the general rule, an correlation rule and an correlation rule memory can be generated, which are for analyzing the root cause based on the topology information of the monitoring target system by configuring a condition indicating a fault propagation pattern in which a combination of events occurred in a plurality of managed components triggers an event in another managed component.

Accordingly, in this embodiment, the root cause can be automatically analyzed also for a propagation condition pattern in which a combination of events occurred in a plurality of managed components triggers an event of another managed component. Consequently, in this example, the root cause analysis for a managing target of an IT system in a redundant configuration or a load distribution configuration can be implemented.

Example 1

<Hardware Configuration and Logical Composition>

FIG. 1 shows exemplary hardware and logical composition of an information system which can implement an embodiment of the present invention. In the figure, names of the components are abbreviated as required.

The system of FIG. 1 includes a monitoring computer 101, one or more network switches or other network apparatus 103, one or more computers which connect with one another to communicate with one another via a network such as a LAN (Local Area Network) 105 or other computers 102.

The monitoring computer 101 may be a general-purpose computer including a CPU 111, a memory 112, a storage medium such as a hard disk drive (HDD) 113, a video interface 114, and a network interface 115 (I/F) which connects to the monitoring computer 101 via a system bus 116.

The monitoring computer 101 may be formed with a computer or with a plurality of computers to cooperate with one another. The monitoring computer 101 may include a user interface part for exchanging information with a system administrator. Alternatively, the system may be adapted to have the monitoring computer 101 connected with a managing terminal (out of the diagram) by wire or wirelessly so that the system administrator inputs/outputs information to/from the monitoring computer 101 by using a user interface part of the managing terminal.

The logic module and the data structure of the monitoring computer 101 includes an correlation rule memory 121, an correlation rule memory generator program 122, an event receiving program 123, an event writing program 124, a matching ratio evaluation program 125, an correlation rule list 126, an event deleting program 127, an external module 128, an correlation rule generator program 129, a general rule search table 131, an event queue table 132, an event delete configuration table 133, an event delete task table 134, a topology construction method repository 135, a general rule repository 136, and a configuration information table 137.

The correlation rule memory 121 saves the state of the event and an object model which represents an correlation rule derived as a result of the root cause analysis. The correlation rule memory 121, the correlation rule memory generator program 122, the event receiving program 123, the event writing program 124, the matching ratio evaluation program 125, the correlation rule list 126, the event deleting program 127, the external module 128, and the correlation rule generator program 129 are saved in the memory 112 or other computer readable media and executed by the CPU 111.

The data structures of the general rule search table 131, the event queue table 132, the event delete configuration table 133, the event delete task table 134, the topology construction method repository 135, the general rule repository 136, and the configuration information table 137 to be described below may be saved in the disk 113 or other suitable computer readable media.

The monitoring computer 101 has a network interface 115 for communicating with the LAN 105. With the network interface 115, the monitoring computer 101 receives an event message from an operation managed component which is a monitoring target such as the server 102 or the network switch 103 via the LAN 105. The display 117, which is connected with the video interface 114, is used for presenting the result of the root cause analysis and other information from the external module 128 to the administrator.

As is known in the art, each of the servers 102 may be a monitoring target node which is executing an application and the like. The server 102 may be a general-purpose computer including the CPU 146, the memory/storage 147, a storage medium such as the hard disk drive (HDD) 143, and the network interface 142. Each of the servers 102 may also include a monitoring agent 141. When a specific state transition is detected, the monitoring agent 141 sends an event message to the monitoring computer 101 via the LAN 105.

Alternatively, the monitoring agent 141 on any one of the servers 102 may monitor the state of the network switch 103. Further, optionally, the network switch 103 may be provided with a monitoring agent of itself.

In the exemplified embodiment, each of the servers 102 has an application 148 which operates on the memory 147. The application 148 is a computer program for providing a Web service for a client computer 153 via the LAN 105 and the network switch 103a. The applications 148a, 148b, 148c for providing respective Web services may be three-tier Web applications.

Further, an HA (High Availability) program 149 may be operating on the memory 147 of each of the servers 102. The HA program 149 may be a monitoring target application which realizes the high availability of the application 148. The HA programs 149 operating on the respective servers 102 exchange operating state information of the applications 148 or the servers 102 each other.

The HA program 149 may be an application which keeps providing the service by starting the application 148 on the standby server 102d in the case where the service providing by the application 148 is disabled. In the embodiment, the HA program 149 improves availability of the application by the so-called 3 to 1 configuration between the three servers in use 102a to 102c and the one standby server 102d. Any numbers of the servers in use and the standby servers may be used.

The client computer 153 is one of the monitoring target nodes. The client computer 153 uses the Web service (hereinafter, also referred to as "service" for short) by accessing the application 148 which is operating on the server 102.

The client computer 153 accesses the application 148 to receive the Web service provided by the server 102. The client computer 153 may be a pseudo client computer for monitoring whether the service is normally provided. Further, the client computer 153 may include a monitoring agent 141 which can monitor the state of the client computer 153 to report an event to the monitoring computer 101.

Although the server 102, the client computer 153, and the network switch 103 are described as an example of a monitoring target node in this embodiment, the monitoring target node is not limited to them and may include, for example, the storage apparatus or the other managed components which form the IT system.

<Block Diagram of Functional Relationship>

Figure 2:
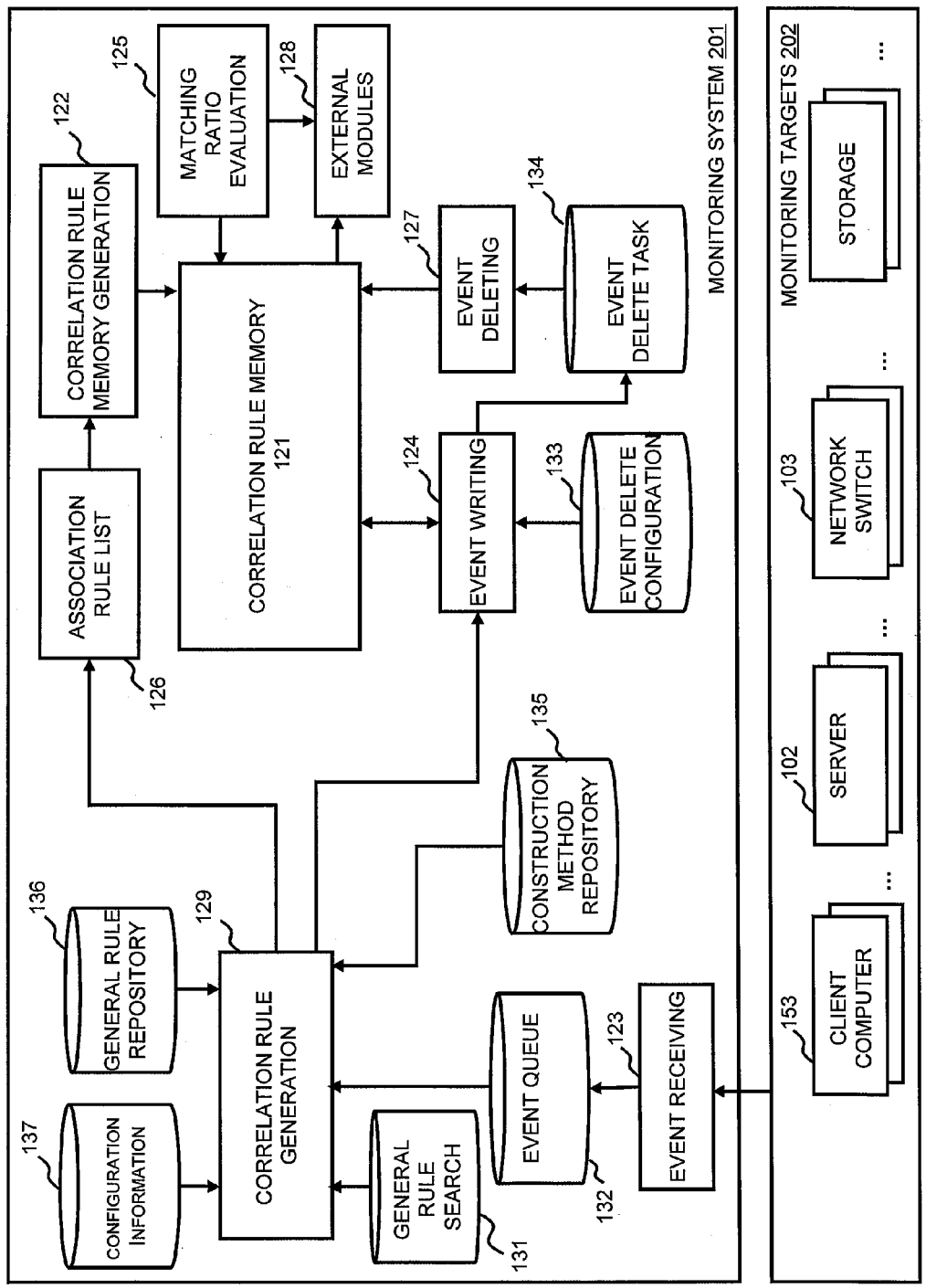
FIG. 2 is a diagram illustrating functional relationship in an information system.

The block diagram of FIG. 2 shows exemplary functional relationship inside a monitoring system 201. In FIG. 2, the monitoring system 201 including the module and the data structure of the monitoring computer 101 is adapted to monitor a plurality of monitoring targets 202 such as the server 102, the network switch 103, and the like.

In the monitoring system 201, the event receiving program 123 receives an event message from a monitoring target part of the IT system including the monitoring targets 202 and saves the event messages in the event queue table 132. For example, when an event occurs in the server 102, the client computer 153, or the switch 103, the monitoring agent 141 on the server 102, the client computer 153, or the switch 103 can send an event message according to the event to the event receiving program 123.

The correlation rule generator program 129 acquires the event message from the event queue table 132, and acquires a general rule name required to analyze the acquired event message by searching the general rule search repository 131. The correlation rule generator program 129 reads in the general rule corresponding to the event message from the general rule repository 136.

In addition, the correlation rule generator program 129 acquires the corresponding topology construction method from the topology construction method repository 135 based on the acquired general rule name. Then, based on the acquired topology construction method and the information on the managed component in which the event occurred, the correlation rule generator program 129 acquires topology information including information on the managed computer in which the event occurred from the configuration information table 137.

The correlation rule generator program 129 generates an correlation rule from the general rule read from the general rule repository 136 and the topology information acquired from the configuration information table 137, and adds the correlation rule to the correlation rule list 126. The correlation rule memory generator program 122 receives the correlation rule list 126 from the correlation rule generator program 129 and generates the correlation rule memory 121.

The event writing program 124 acquires the event message processed by the correlation rule generator program 129 and writes information including the acquired event message into the correlation rule memory 121. Further, according to the configuration of the event delete configuration table 133, the event writing program 124 generates an event delete task in the event delete task table 134.

When the event writing program 124 finishes the process of itself, it starts a program 125 for evaluating the matching ratio. The value of the matching ratio may change in response to occurrence of a new event. Accordingly, the matching ratio evaluation program 125 evaluates the matching ratio for each correlation rule which is involved with input of the event.

The matching ratio evaluation program 125 may start one or more external modules 128. An example of the external module 128 includes a module for displaying information on the root cause on the display 117.

The event deleting program 127 is triggered by a timer and periodically executes a task based on the event delete task table 134. The event deleting program 127 deletes a previously occurred event based on the time passed from the occurrence of the event.

<Configuration Information Table>

FIG. 3 shows an exemplary data structure of the configuration information table 137 residing on the monitoring computer 101. When the correlation rule is generated from the general rule, the configuration information table 137 is used for searching for and acquiring the topology information of the monitoring target managed component to which the general rule is to be applied.

As examples of the configuration information, a computer managing table 300*a* which stores information on the computers 102, 153, and a network switch managing table 300*b* which stores information on the network switch 103 are considered.

As shown in the upper part of FIG. 3, the computer managing table 300*a* includes a managed component identifier 301*a*, a managed component type 302*a*, a provided service 303, an access service 304, and a connected switch 305.

In the managed component identifier 301*a*, a value for uniquely identifying each computer, which is a managing target, is stored. In the managed component type 302*a*, information indicating type of the corresponding managed component is stored. In the provided service 303, name of the service which is provided by the application operating on the corresponding computer is stored. In the access service 304, name of the service which is accessed by the application operating on the corresponding computer is stored. In the connected switch 305, the managed component identifier for identifying the network switch 103 which connects with the corresponding computer is stored.

As shown in the lower part of FIG. 3, the network switch managing table 300*b* includes a managed component identifier 301*b*, a managed component type 302*b*, and the connected computer 306. In the managed component identifier 301*b*, a unique value for identifying each of the network switches 103 is stored. In the managed component type 302*b*, a value indicating type of the corresponding managed component is stored. In the connected computer 306, the managed component identifier of the computer which is connected with the corresponding network switch is stored.

The topology information can be acquired from the configuration information table 137. In this embodiment, the topology information includes two or more entries acquired from the configuration information table 137 and association information between the entries.

For example, as for the entry 311 of the computer managing table 300*a*, the managed component identifier 301*a* is "ServerA," and the managed component identifier "NwSwitchA" is included in the connected network switch 305. On the other hand, as for the entry 321, which has the managed component identifier 301*b* "NwSwitchA" in the network switch managing table 300*b*, the managed component identifier "Client" is included in the connected computer 306. Accordingly, the topology information representing association between the server and the network switch such as the entry 311—the entry 321—the entry 315 can be acquired.

In this embodiment, the configuration information table 137 is described as a database table for managing information on the monitoring target apparatuses and connection information between the apparatuses; though, the configuration information table 137 is not limited to that. The configuration information table 137 may be in any form as far as it manages the configuration information, regardless of whether it is on a storage medium or on a storage device, the storing method, the data representation form and the data structure of each item to be stored. Further, the configuration information may include not only the apparatuses and a connection between the apparatuses but also information other than equipment such as information on service, application, and subnet.

<General Rule Repository and General Rules>

The general rule will be described with reference to FIG. 4. The general rule is a fault propagation model described in a form independent from a specific topology.

FIG. 4 shows an example of general rules residing in the general rule repository 136. The general rule 400a is an example of general rule which is used in the root cause analysis performed on a fault of a complex fault propagation pattern. The general rule 400a is an example of general rule which suggests that a combination of NIC faults (Network Interface faults) of a plurality of computers is the root cause.

The rules for identifying the root cause in that type of fault analysis mostly represent a pair of the combination of events predicted to occur and the fault to become the root cause in an IF-THEN statement based on the event association.

The rule represented in the IF-THEN statement describes a rule which means that "if the condition described in the IF part is satisfied, the THEN part is true." The general rule may include one or more condition elements.

In this embodiment, it is assumed that the rule is described in the IF-THEN statement like the general rule of the expert system. In the condition part of the IF part in the general rule, a condition for determining a managed component to which the rule is applied and information on an event which occurs in the managed component are previously defined. In the conclusion part of the THEN part in the general rule, a condition for determining a managed component to which the rule is applied and information on the cause of the fault are previously defined.

The description format of the rule is not necessarily in the IF-THEN statement and may be in any format as far as a condition element of the IF part in the general rule or a certain condition which can identify the managed component, the object of the THEN part, are previously defined.

Further, a "multiple cause propagation condition" can be described in the condition element of the general rule. The multiple cause propagation condition means that "if an event type indicated by the condition element which configures the multiple cause propagation condition occurred in the predetermined number of more of different managed components where the predetermined number is specified by the multiple cause propagation condition, the THEN part is true."

Here, the general rule is not limited to those shown in FIG. 4 and more rules may be present. The general rule repository 136 may include a plurality of general rules.

The general rule includes fields 411, 412, 413. In the field 411, the general rule name which is to be an identifier of the general rule is registered. In the field 412, an observed event type corresponding to the IF part of an event propagation model described in the "IF-THEN" statement is registered. The field 413 is the THEN part in which a cause event type corresponding to the THEN part of the general rule described in the "IF-THEN" statement is registered. Hereinafter, the field 412 may be referred to as the IF part 412 and the field 413 will be referred to as the THEN part 413. In the general rule, the IF part 412 and the THEN part 413 are in the relation such that when the status of the THEN part 413 is normalized, the problem of the IF part 412 is solved.

In FIG. 4, some specific examples of the general rule contained in the monitoring server 101 are shown. The general rule 400a indicated by the general rule name "GeneralRule1" will be described. In the general rule 400a, when the "(% ServiceX %) AveResponseTime_Err (the average response time of the service increasing error) in the computer which has the specific service ServiceX as the access service" and "Nic_Err (NIC fault error) in the computer which has the specific service ServiceX as the provided service" are detected as the IF part 412a, it is concluded that "Nic_Err (NIC fault error) in the computer which has ServiceX as the provided service" is the cause.

The multiple cause propagation condition 431 described in the general rule 400a indicates that "if a plurality of computers satisfy the condition 432 described in the IF part 412a, the predetermined number (two or more) of the computers have the event Nic_Err, and if the other condition elements become true, it can be estimated that the THEN part is true."

Here, the multiple cause propagation condition 431 may be expressed with a combination of a numerical value and a sign of inequality like "2>=" or may be expressed with a value indicating a ratio such as a percentage. The predetermined number is not limited to "2" and may be the value of 1 or more.

Alternatively, the numerical value part of the multiple cause propagation condition 431 may be defined as a variable, which may be input by a user according to the environment of the monitoring target or automatically configured for each monitoring target by acquiring information from the monitoring target apparatus or application.

For example, the monitoring system 201 may be adapted to acquire the fact that the computers 102a, 102b, 102c, 102d are in the 3 to 1 redundant configuration from the configuration information of the HA program 149 shown in FIG. 1 and, based on the information, derive the multiple cause propagation condition "2>=." The part corresponding to ">=" may be the other signs representing a sign of inequality or a sign of equality meaning 'greater than or equal to,' 'less than or equal to,' 'greater than,' 'less than,' 'equal to,' or the like.

"% ServiceX %" in "access service=% ServiceX %," "provided service=% ServiceX %," and "(% ServiceX %) AveResponseTime_Err" described in the IF part 412a will be described. The value "% ServiceX %" may be a fixed value independent from the environment of the monitoring target or may be a variable. In the case where the value is defined as a variable, the identifier of the service provided by the computer or accessed by the computer may be acquired from the information in the configuration information table 137 and the received event message and substituted for the general rule 400a when an correlation rule is generated. In this embodiment, "% ServiceX %" is described as a variable.

<Topology Construction Method Repository and Topology Construction Methods>

FIG. 5 is a diagram illustrating a configuration example of topology construction method information in the topology construction method repository 135 of the monitoring server 101.

The topology construction method is the information defining a method for the monitoring server 101 to generate the information indicating the association among a plurality of managed components which is to be the monitoring targets based on the configuration information.

The topology construction method 500 includes fields 511, 512, 513, 514, 515. The field 511 stores the identifier of the general rule to which the topology construction method 500 is applied. In the field 512, conditions of the managed component which is to be the origin for generating the topology information are registered. The condition of the managed component which is to be the origin includes the managed component type and an attribute of the managed component. In the field 513, conditions of the managed component which is to be the endpoint for generating the topology information (the managed component type and an attribute of the managed component) are registered.

In the field 514, conditions of a managed component which is between the origin component and the endpoint component (the managed component type and an attribute of the managed component) are registered. In the field 515, conditions for generating a topology between the origin component and the endpoint component are registered.

FIG. 5 shows specific examples of the topology construction method which is contained in the monitoring server 101. For example, the topology construction method 500a is a topology construction method used by the correlation rule generator program 129 in generating an correlation rule from the general rule GeneralRule1 (the general rule 400a in FIG. 4).

The topology construction method 500a indicates that the topology information to which GeneralRule1 is to be applied can be acquired by searching the configuration information table 137 for a topology which has one of the computers as the origin and the other as the endpoint and which is a combination of the computers, one of which has the provided service name the same as the access service name of the other of which, when the topology information to which GeneralRule1 is to be applied is acquired.

"% ServiceX %" in "(Computer. access service)=% ServiceX %" and "(Computer. provided service)=% ServiceX %" described in the topology construction method 500a may be a fixed value independent from the environment of the monitoring target or may be a variable. In the case where it is a variable, the identifier of the service provided by the computer or accessed by the computer may be acquired from the information in the configuration information table 137 and the received event message and substituted for the topology construction method 500a before the topology information is acquired. In this embodiment, it is described as a variable.

The topology construction method 500a is a topology construction method used by the correlation rule generator program 129 in generating an correlation rule from the general rule GeneralRule2.

The topology construction method 500b indicates that the topology information to which GeneralRule2 is to be applied can be acquired by searching the configuration information table 137 for a combination that satisfies an origin managed component condition 512b, an endpoint managed component condition 513b, and a transit managed component condition 514b and also satisfies a topology construction condition 515b, when the topology information to which GeneralRule2 is to be applied is acquired.

The topology construction condition 515b defines a combination, one of the computers of which is connected with a network switch that has the same managed component identifier as that of the network switch of any of the monitoring targets, and the described one of the computers which is connected with the network switch has the same managed component identifier as that of the other computer, and the described one of the computer has the provided service name the same as the access service name of the other computer.

In this embodiment, an example of configuration that has only one network switch among the computers is described. In the case of a configuration that has a plurality of network switches or other network equipment among the computers, the topology construction condition 515 may include a construction condition like "trace the connections to find the connection with an apparatus other than the network equipment."

<Correlation Rule>

FIG. 6A to FIG. 6F show configuration examples of the correlation rule. These correlation rules are stored in the correlation rule memory 121.

The correlation rule is generated based on the general rule 400 and the topology information acquired from the configuration information table 137. The correlation rule is a rule representing the association among a plurality of events depending on the topology. FIG. 6A to FIG. 6F show examples of correlation rules 600a to 600q which are generated from the general rule 400 shown in FIG. 4 and the configuration information table 137 shown in FIG. 5.

In general, the correlation rule 600 can be divided into two parts of a first part 601 which is called "IF" part and a second part 602 which is called "THEN" part. The IF part 601 may include one or more condition elements. For example, the correlation rule 600a includes three conditions in the IF part 601.

These three conditions are "Client (WebService)AveResponseTime_Err (the average response time of the Web service of the client computer increasing error)>," "<ServerA Nic_Err (NIC fault error in the Server A)>," and "<ServerB Nic_Err (NIC fault error in the Server B)>." That means when an error event like "Nic_Err (NIC fault error)" is received from "Server A," the condition "<ServerA Nic_Err>" becomes true.

If all the conditions described in the IF part 601 are true, it is estimated that the conclusion element of the THEN part 602 is true according to a specific rule. For example, the correlation rule 600a has the conclusion element "<ServerA Nic_Err>."

Therefore, according to the correlation rule 600a, in the case where the Server A and the Server B report the NIC fault errors and also the client computer 153 reports an error that the average response of the Web service has increased, it is indicated that the root cause of these errors is the NIC fault in the Server A.

Each element of the IF part 601 and the THEN part 602 includes the identifier for identifying the managed component, which is the monitoring target, and the event type representing the type of the event. For example, the condition element of the correlation rule 600a "<ServerA Nic_Err>" includes the identifier "ServerA" for identifying the Server A and the event type "Nic_Err" representing the NIC fault.

The correlation rule 600 may also have a plurality of conclusions. That is, it includes the case where the THEN part 602 indicates events in a plurality of managed components. For example, in the case where it is preferable to define a plurality of correlation rules of different conclusions for the respective THEN parts 602 although all the IF parts 601 have the same condition, an correlation rule may be made to have the THEN part 602 with a plurality of conclusions.

For example, when there are two correlation rules as "IF A B C THEN X (If A B C, then X)" and "IF A B C THEN Y (If A B C, then Y)," these rules can be combined into one rule to define "IF A B C THEN X Y (If A B C, then X and Y)."

Figure 6C:
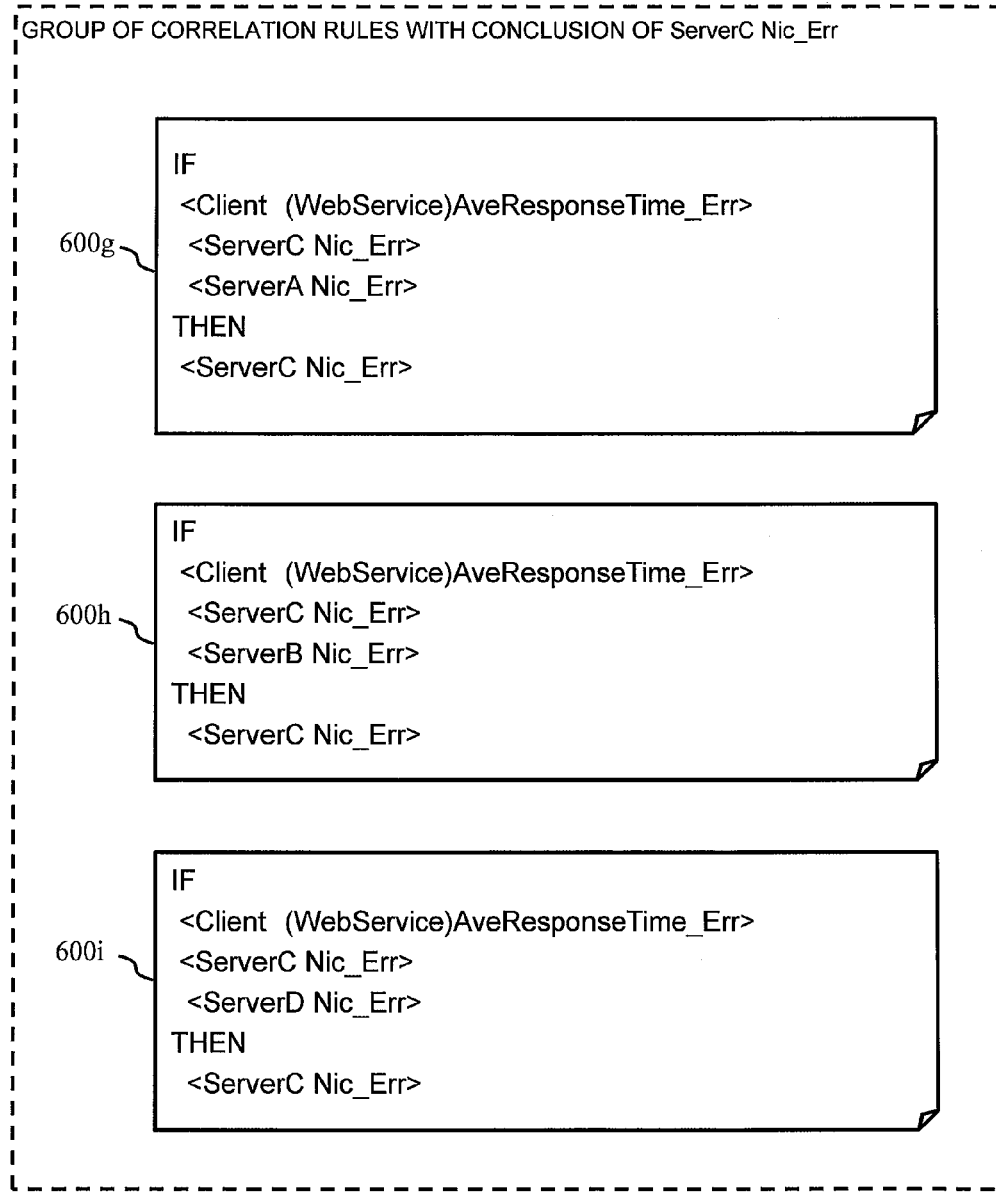
FIG. 6C is a diagram illustrating yet another example of the correlation rule list.
Figure 6D:
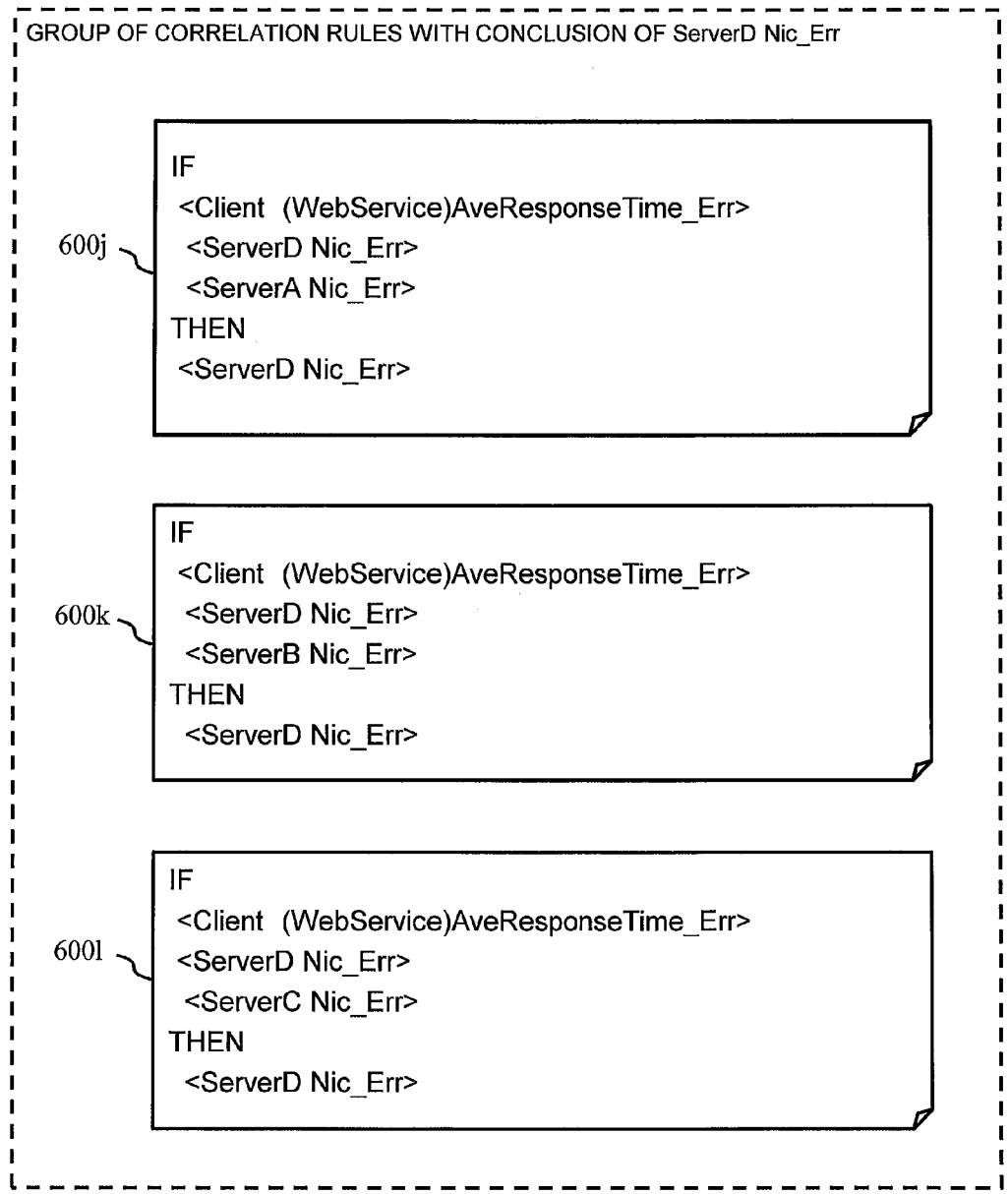
FIG. 6D is a diagram illustrating yet another example of the correlation rule list.

FIG. 6A shows three correlation rules 600a to 600c for the case where the Server A (102a) is the root cause. FIG. 6B shows three correlation rules 600d to 600f for the case where the Server B (102b) is the root cause. FIG. 6C shows three correlation rules 600g to 600i for the case where the Server C (102c) is the root cause. FIG. 6D shows three correlation rules 600j to 600l for the case where the Server D (102d) is the root cause.

The correlation rules shown in FIG. 6A to FIG. 6D can be acquired based on the general rule 400a and the configuration information table 137. As described above, the general rule 400a defines as the multiple cause propagation condition 431 that the NIC error occurs in two or more servers.

Then, in this embodiment, the cases where the respective servers, which are the monitoring targets, may be the root cause are automatically extracted and correlation rules are generated for all the combinations. For example, there are three combinations of two servers for the case where the Server A (102a) might become the root cause: the Server A (102a) and the Server B (102b), the Server A (102a) and the Server C (102c), and the Server A (102a) and the Server D (102d). Therefore, the correlation rules 600a to 600c are created for the respective three combinations. There are also three combinations respectively for the cases where the Server B (102b), the Server C (102c), and the Server D (102d) are the root cause.

Figure 6E:
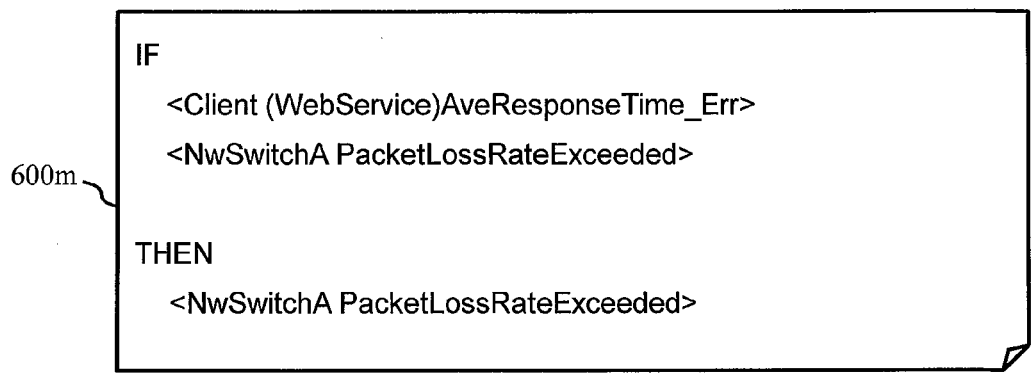
FIG. 6E is a diagram illustrating yet another example of the correlation rule list.

FIG. 6E shows an correlation rule 600m for the case where the network switch 103 is the root cause. The correlation rule 600m is generated based on the general rule 400b and the configuration information table 137.

Figure 6F:
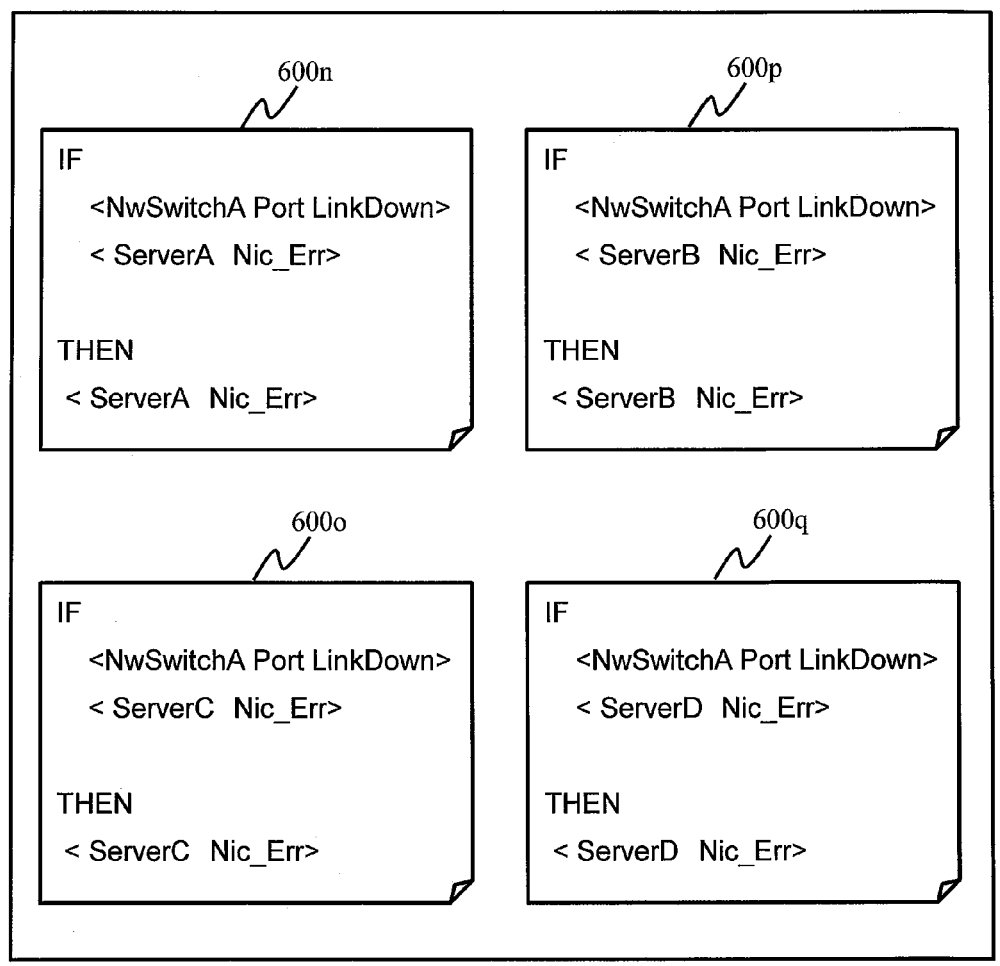
FIG. 6F is a diagram illustrating yet another example of the correlation rule list.

FIG. 6F shows correlation rules 600n to 600q to address the case where both of the network switch and the server have errors (events). These correlation rules 600n to 600q are generated based on the general rule 400c and the configuration information table 137.

<Correlation Rule Memory>

Figure 7:
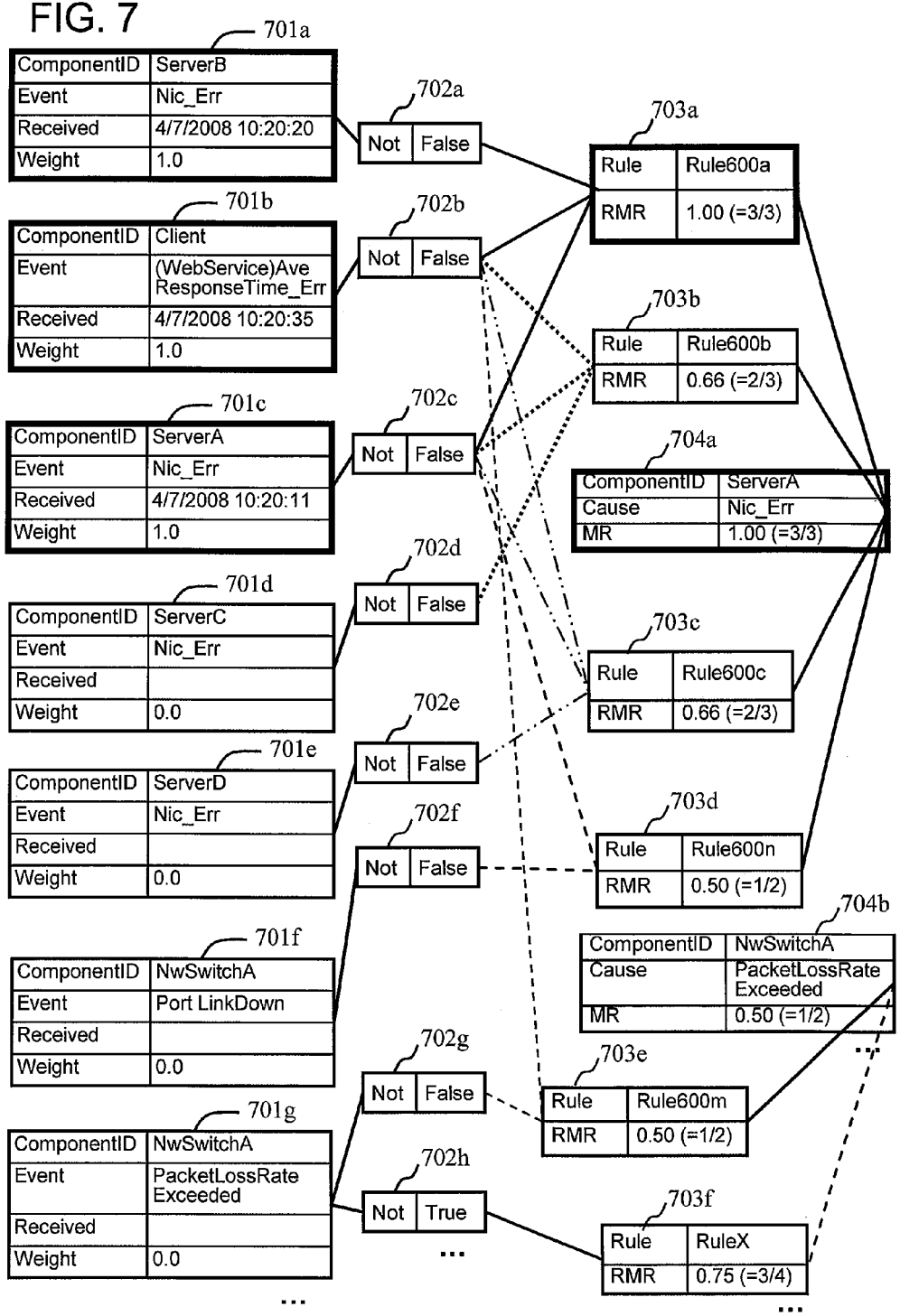
FIG. 7 is a diagram illustrating an example of association in an correlation rule memory.

In the correlation rule memory 121, an object model which represents an correlation rule is saved. FIG. 7 shows an example of association between the object models (correlation rule) which are saved in the correlation rule memory 121.

In FIG. 7, four kinds of objects, i.e., condition objects 701 (a to g), operator objects 702 (a to h), correlation rule objects 703 (a to f), and conclusion objects 704 (a, b) are shown. These objects 701 to 704 and connections between them are generated by the correlation rule memory generator program 122.

The condition object 701 has four kinds of attributes. The four kinds of attributes are the "managed component identifier" for identifying the managed component, the "event type" which is the type of the event, the "received date and time" which is the date and time when the event was received, and the weight value allocated to the condition.

The operator object 702 has an attribute "Not" and may have a true value or a false value. For example, when the condition element written in the correlation rule 600 is a specified unary operator "NOT" such as "<NOT ServerA Nic_Err (not a NIC fault error in the ServerA)>," the value for the attribute is configured to "true." In contrast, when the condition element written in the correlation rule is not a specified unary operator "NOT," the value for the attribute is configured to "false."

The correlation rule object 703 includes the "rule name" for specifying the identifier of a specific correlation rule, and the "rule matching ratio" (RMR) indicating the probability of accuracy of the correlation rule. The operator object 702 connected to the correlation rule object 703 and the condition object 701 connected to the operator object 702 indicate the condition element (IF part) of one correlation rule. Also, the conclusion object 704 connected to the correlation rule object 703 indicates the conclusion element (THEN part) of one correlation rule. The RMR value of the correlation rule object 703 is calculated from the "weight" of the condition object 701 connected to the correlation rule object 703.

The conclusion object 704 has three kinds of attributes. The three kinds of attributes are the "managed component identifier" for identifying the managed component to which the correlation rule is applied, the "cause" for identifying the cause of the error, and the "matching ratio" (MR) indicating the probability of accuracy.

In other words, the MR value indicates the likelihood that the conclusion is the root cause. This object model is formed without redundancy of the condition element and the conclusion element. The correlation rule memory generator program 122 excludes redundancy in generating the condition object 701. As a result, the event writing program 124 does not need to write the event for a number of times for a received event.

The correlation rule is represented by connecting the conclusion object 704 and the operator object 702 to one correlation rule object 703 and further connecting the condition object 701 to the operator object 702.

For example, the correlation rule object 703a has three connections with the operator objects 702a, 702b, 702c. The respective operator objects 702 are connected to just one condition object 701. Therefore, it is understood that the IF part of the "correlation rule 600a" includes three conditions. Further, the correlation rule object 703a is also connected to the conclusion object 704a. Therefore, the THEN part of the "correlation rule 600a" is <ServerA Nic_Err>.

Also the correlation rule object 703b has three connections with the operator objects 702b, 702c, 702d and further has a connection with the conclusion object 704a. The operator objects 702b, 702c, and the conclusion object 704a are shared by the correlation rule objects 703a, 703b.

The "rule matching ratio" in this embodiment is the likelihood calculated by the ratio of the condition elements of the correlation rule to be true to the whole condition elements of the correlation rule. The rule matching ratio (also referred to as "RMR" for short) is calculated as a value of the number of the condition elements to be true divided by the total number of the condition elements.

Also, the "matching ratio" in this embodiment is the likelihood which is the maximum value of the "rule matching ratios" of the respective correlation rule objects 703 to which the conclusion object 704 is connected. The matching ratio (also referred to as "MR" for short) can be calculated according to the expression below.

MR=Max (RMR of the connected correlation rule object)

In FIG. 7, the condition elements 701a to 701c are true, and the total number of the condition elements of the correlation rule 600a is 3. Then, since three condition elements of the three condition elements are true, the analysis engine calculates the rule matching ratio of the correlation rule 600a at (3/3)=1.0.

As for the correlation rule 600b, the total number of the condition elements is three, and among the total number, only two of the condition elements are true. As a result, the rule matching ratio is 0.66 (=2/3).

Similarly, according to FIG. 7, the rule matching ratio of the remaining correlation rule 600c which is connected to the conclusion object 704a is 0.66, and the rule matching ratio of the correlation rule 600n is 0.50.

Therefore, in that case, the resulting value for the matching ratio of the conclusion 704a is 3/3=1.0, which is the maximum value of the rule matching ratio of the correlation rule object 703a.

Similarly, the rule matching ratio of the conclusion 704b is 0.50. As a result, the analysis engine can decide the conclusion of the highest ratio by configuring the matching ratio, even if only one of the condition elements is not true, which might be the case where the event message for one of the managed components is not sent to the analysis engine. For example, the case where the managed component has broken down without sending an error event message to the monitoring system 201 might lead a situation in which some of the condition elements is not true, but the system can address even that situation by configuring the matching ratio.

<Event Message>

FIG. 8 shows an example of data structure of the event message 805. The event receiving program 123 receives the event message 805 from the monitoring agent or the like provided on the monitoring target node.

The event message 805 has three kinds of information. The three kinds of information is the "managed component type" 801, the "managed component identifier" 802, and the "event type" 803.

The managed component type 801 is the type of the managed component to which the event message is related such as a computer, a network switch, a storage, or the like. The managed component identifier 802 is a unique identifier which can identify a specific managed component in the IT system environment. The event type 803 indicates the type of the occurred event.

<Event Queue Table>

FIG. 9 shows an exemplary data structure of the event queue table 132 residing on the monitoring computer 101. When the event receiving program 123 receives the event message 805 from the monitoring target 202, it inputs the event information into the table. The event queue table 132 complies with the first-in first-out (FIFO) principle as for the order of inputting and outputting the events for generating the list of queues of reported events.

The event queue table 132 has four columns. The four columns are the managed component type 901, the managed component identifier 902, the event type 903, and the received date and time 904.

The managed component type 901 is the type of the managed component which generated the event. The managed component identifier 902 is information for uniquely identifying the managed component. The event type 903 indicates the type of the occurred event. The received date and time 904 indicates the date and time when the event message was received.

The managed component type 901, the managed component identifier 902, and the event type 903 are acquired from the received event message 805. The received date and time 904 is the date and time when the event receiving program 123 received the event message.

The event queue table 132 functions as a buffer for the correlation rule generator program 129. The correlation rule generator program 129 acquires the event information from the event queue table 132, reads the general rule 400 related to the acquired event information, and generates the rule memory for the correlation rules.

<Event Delete Configuration Table>

FIG. 10 shows an exemplary data structure of the event delete configuration table 133 residing on the monitoring computer 101. The event delete configuration table 133 includes configuration information of the event deleting program 127 which specifies the term of validity (lifetime). The event delete configuration table 133 is used by the event writing program 124 to decide the term of validity for each of the received events.

In the event delete configuration table 133, the managed component type 1001 indicates the type of the managed component which generated an event message, the event type 1002 indicates the type of the event, and the term of validity 1003 indicates the duration of the event to be considered (i.e., the term of validity of the event).

The term of validity 1003 is defined for each combination of the type of the managed component and the event type. The term of validity 1003 is a period from the moment when the event message is received to the moment when the event is deleted from the correlation rule memory 121. For example, in the case where the term of validity is ten minutes, the weight value in the corresponding condition object 701 is reduced to 0.0 at ten minutes after the event reception.

<Event Delete Task Table>

FIG. 11 shows an exemplary data structure of the event delete task table 134 residing on the monitoring computer 101. In this embodiment, the term of validity for each of the received events is managed by using the event delete task table 134.

When an event is received, the event delete task table 134 is written by the event writing program 124. The event delete task table 134 is used by the event deleting program 127 to decide when to start deleting the event.

The event delete task table 134 includes the start date and time 1101, the managed component identifier 1102, and the event type 1103. The start date and time 1101 is the date and time to start the event delete task. The start date and time 1101 is calculated by the expression "received date and time 904+ term of validity 1003." The managed component identifier 1102 is the identifier for uniquely identifying the managed component. The event type 1103 is the type of the event that caused the event message.

The event deleting program 127 identifies the target condition object 701 based on the managed component identifier 1102 and the event type 1103. Therefore, the managed component identifier 1102 and the event type 1103 on the event delete task table 134 is copied from the managed component identifier 902 and the event type 903 on the event queue table 132.

<General Rule Search Table>

FIG. 12 shows an exemplary data structure of the general rule search table 131 residing on the monitoring computer 101. In this embodiment, a non-periodical generation form is assumed in which only the correlation rule for analyzing the cause of the event acquired from the correlation rule generator program 129 is generated from the general rule and the configuration information. That is, in this embodiment, the correlation rule is generated each time an event message is received from the managed component. With this configuration, only necessary correlation rule can be generated at the moment it is required, thus, the storage capacity of the correlation rule memory 121 can be efficiently used.

It may also be adapted to previously create and store all or some of the correlation rules which are possibly used by the monitoring target IT system.

The general rule search table 131 is used by the correlation rule generator program 129 to search for the general rule which is required for analyzing the cause of the received event. The general rule search table 131 has the managed component type 1201, the event type 1202, and the general rule name 1203.

The managed component type 1201 is the type of the managed component by which an event message is generated. The event type 1202 is the type of the event that caused the event message. The general rule name 1203 is the name for uniquely identifying the general rule.

The general rule name 1203 is defined for each combination of the managed component type and the event type. The general rule name 1203 is the identifier equal to the "general rule name" stored in the field 411 of the general rule 400 and the "corresponding general rule" stored in the field 511 of the topology construction method 500.

The correlation rule generator program 129 searches the managed component type 1201 and the event type 1202 on the general rule search table 131 by using the values of the managed component type 901 and the event type 903 on the event queue table 132 as keys. Through this search, the correlation rule generator program 129 acquires the general rule name 1203 corresponding to the general rule to be developed.

The correlation rule generator program 129 searches the managed component type 1201 and the event type 1202 on the general rule search table 131 by using the values of the managed component type and the event type of the conclusion element of the generated correlation rule as keys, and acquires the general rule name corresponding to the general rule to be developed.

<Event Receiving Program and Correlation Rule Generator Program>

Figure 13:
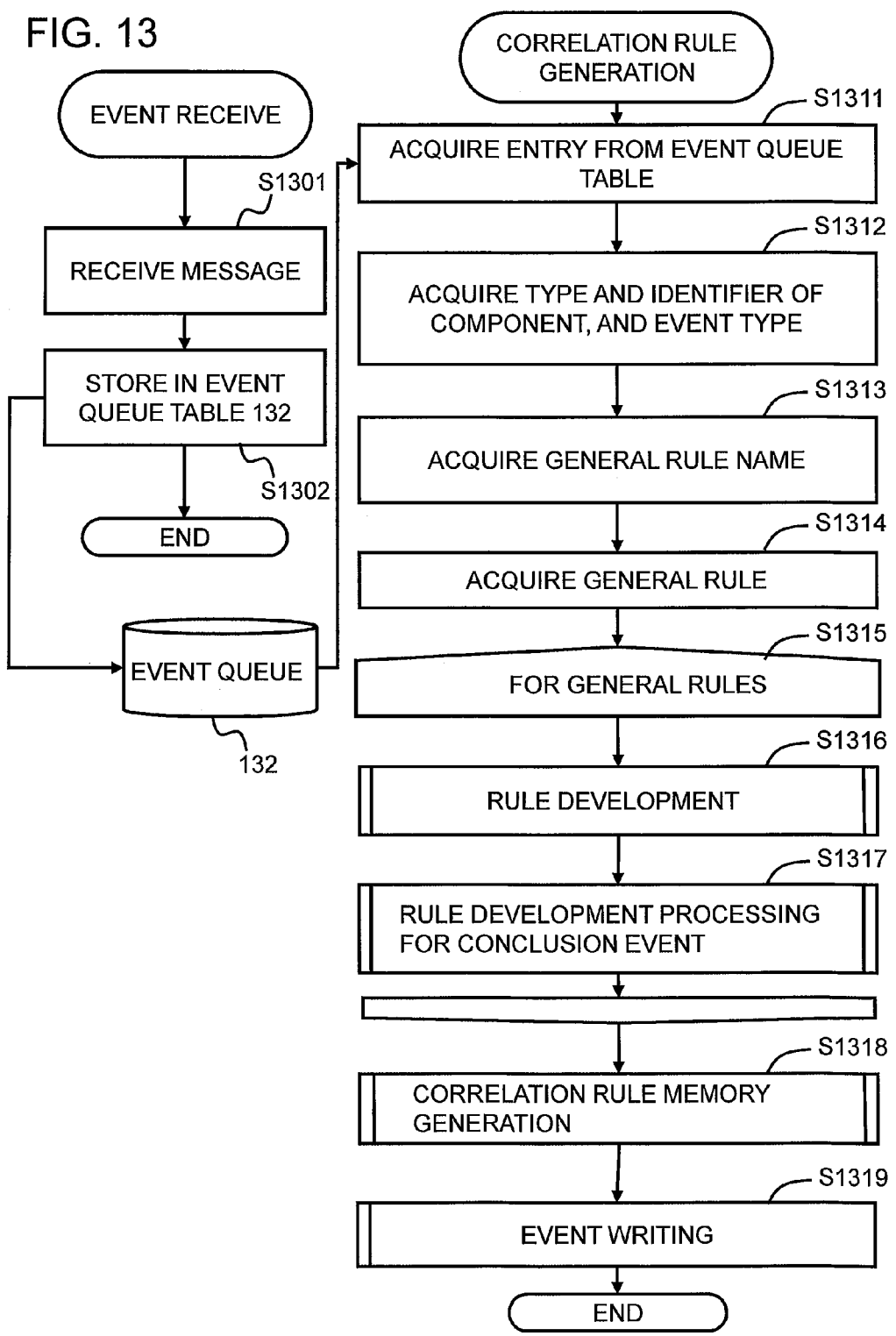
FIG. 13 is a flowchart showing an example of event receiving program processing and correlation rule generator program processing.

FIG. 13 shows a flowchart of an example of event receive processing and correlation rule generation processing which are performed by the event receiving program 123 and the correlation rule generator program 129 in the monitoring computer 101.

In response to reception of an event message from one of the monitoring targets 202, the event receiving program 123 starts the processing.

In step S1301, the event receiving program 123 receives an event message 805 from the monitoring target 202.

In step S1302, the event receiving program 123 stores the information of the event message 805 received in step S1301 as the managed component type 901, the managed component identifier 902, and the event type 903 and the current date and time as the received date and time 904 respectively in the new records on the event queue table 132, and then finishes the processing.

For example, when the event shown in the event message 805 of FIG. 8 is received, the information of an entry 911 of FIG. 9 is added to the event queue table 132.

In step S1311, the correlation rule generator program 129 acquires one entry from the event queue table 132 for processing.

In step S1312, the correlation rule generator program 129 acquires the managed component type 901, the managed component identifier 902, and the event type 903 from the entry acquired in step S1311.

In step S1313, the correlation rule generator program 129 acquires all the general rule names 1203 corresponding to the managed component type 901 and the event type 903 acquired from the general rule search table 131 in step S1312.

In step S1314, the correlation rule generator program 129 acquires from the general rule repository 136 the correlation rules 400 corresponding to all the general rule names 1203 acquired in step S1313.

In step S1315, the correlation rule generator program 129 repeats the processing from step S1316 to step S1317 for all the general rules 400 retrieved in step S1314.

Figure 14:
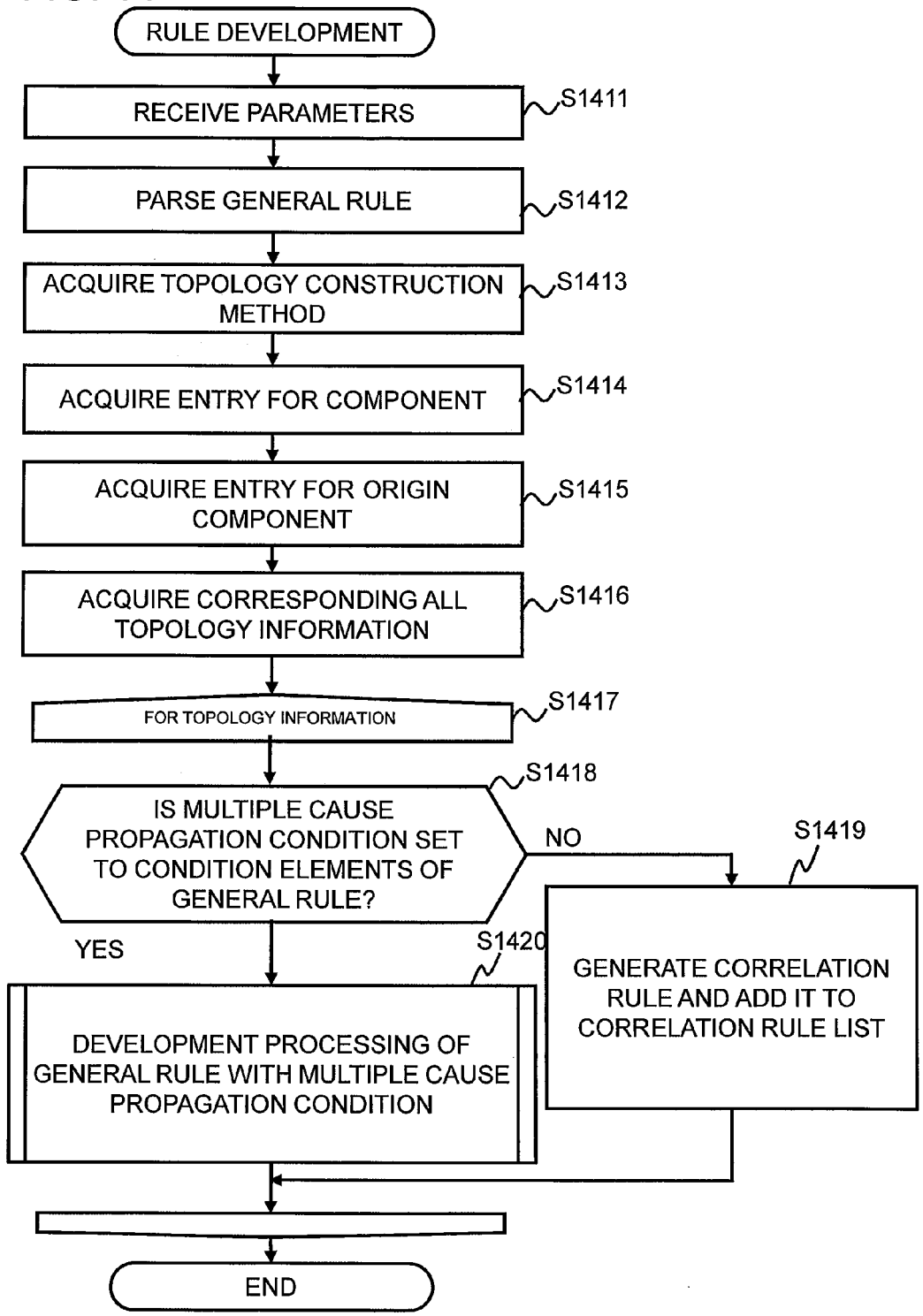
FIG. 14 is a flowchart showing an example of rule development processing.

In step S1316, the correlation rule generator program 129 performs the "rule development processing" shown from step S1411 to step S1420 of FIG. 14 by passing the managed component type 901, the managed component identifier 902, and the event type 903 acquired in step S1312 and the specific general rule 400 acquired in step S1315, as parameters.

Figure 16:
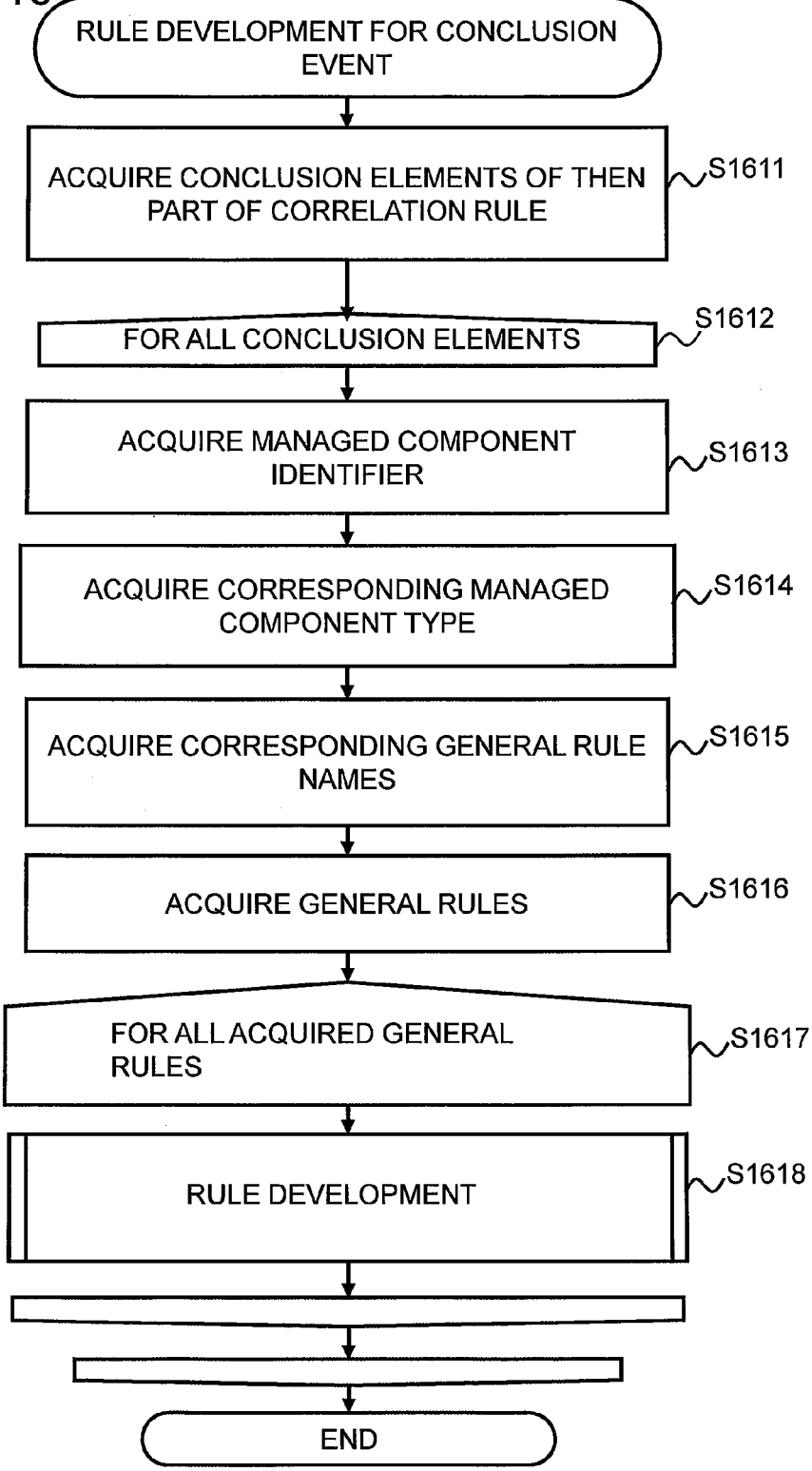
FIG. 16 is a flowchart showing an example of rule development processing for conclusion event.

In step S1317, the correlation rule generator program 129 performs the "rule development processing for conclusion event" shown from step S1611 to step S1618 of FIG. 16.

In step S1318, the correlation rule generator program 129 starts the correlation rule memory generator program 122 by passing, as parameters, the correlation rule list 126 which are generated respectively by the "rule development processing" and the "rule development processing for conclusion event."

In step S1319, the correlation rule generator program 129 starts the event writing program 124 by passing the entry of the event queue table 132 acquired in step S1311, as parameters.

For example, the correlation rule generator program 129 acquires the entry 911 of FIG. 9 from the event queue table 132 (step S1311). The correlation rule generator program 129 acquires the managed component type "Computer," the managed component identifier "ServerA," and the event type "Nic_Err" from the entry 911 (step S1312).

The correlation rule generator program 129 acquires entries 1211, 1212 which have the managed component type "Computer" and the event type "Nic_Err" from the general rule search table 131, and acquires information of the general rule name 1203 "GeneralRule1" and "GeneralRule3" form the entries 1211, 1212 (step S1313).

Next, the correlation rule generator program 129 acquires the general rules 400a, 400c respectively under the names of "GeneralRule1" and "GeneralRule3" from the general rule repository 136 (step S1314). The correlation rule generator program 129 performs the rule development processing on the acquired general rules 400a, 400c, and the entry 911 (step S1316).

As described above, in this embodiment, when an event (error event message) is received from the monitoring target 202, the correlation rule generation processing 129 is started. Instead of that configuration, it may be adapted to develop all the general rules for all the managed components at starting of the monitoring computer 101, for example, to previously generate the correlation rules required for fault analysis. Alternatively, it may also be adapted to generate some of the correlation rules before receiving an event and generate the other correlation rules at the reception of an event, instead of previously generating all of the correlation rules.

FIG. 14 shows a flowchart of the rule development processing which is performed in step S1316 of the correlation rule generator program 129 of FIG. 13 and in step S1618 of the "rule development processing for conclusion event" of FIG. 16.

In step S1411, the "rule development processing" receives the general rule 400, the managed component type, the managed component identifier, and the event type as parameters.

In step S1412, the "rule development processing" parses the general rule 400 acquired in step S1411.

In step S1413, the "rule development processing" acquires the topology construction method 500 corresponding to the general rule name stored in the general rule name 411 of the general rule 400 from the topology construction method repository 135.

In step S1414, from the configuration information table 137, the "rule development processing" acquires an entry corresponding to the managed component identifier acquired in step S1411.

In step S1415, based on means indicated by the topology construction method 500 acquired in step S1413, the "rule development processing" acquires from the configuration information table 137 an entry of the origin managed component corresponding to the entry acquired in step S1414.

In step S1416, based on the means indicated by the topology construction method 500 acquired in step S1413, the "rule development processing" acquires all the corresponding topology information from the configuration information table 137 with the entry of the origin managed component acquired in step S1415 as the origin.

In step S1417, the "rule development processing" repeats the processing from step S1418 to step S1420 for all the topology information acquired in step S1416.

In step S1418, the "rule development processing" examines whether the multiple cause propagation condition is configured to any of the condition elements in the IF part 412 of the general rule 400 acquired in step S1411. If the multiple cause propagation condition is configured (S1418: YES), the processing proceeds to step S1420. If the multiple cause propagation condition is not configured (S1418: NO), the processing proceeds to step S1419.

In step S1419, the "rule development processing" generates the correlation rule 600 corresponding to the condition element and the conclusion element of the general rule 400 acquired in step S1411 and to the managed component identifier included in the specific topology information acquired in step S1416, and add the correlation rule 600 to the correlation rule list 126.

Figure 15:
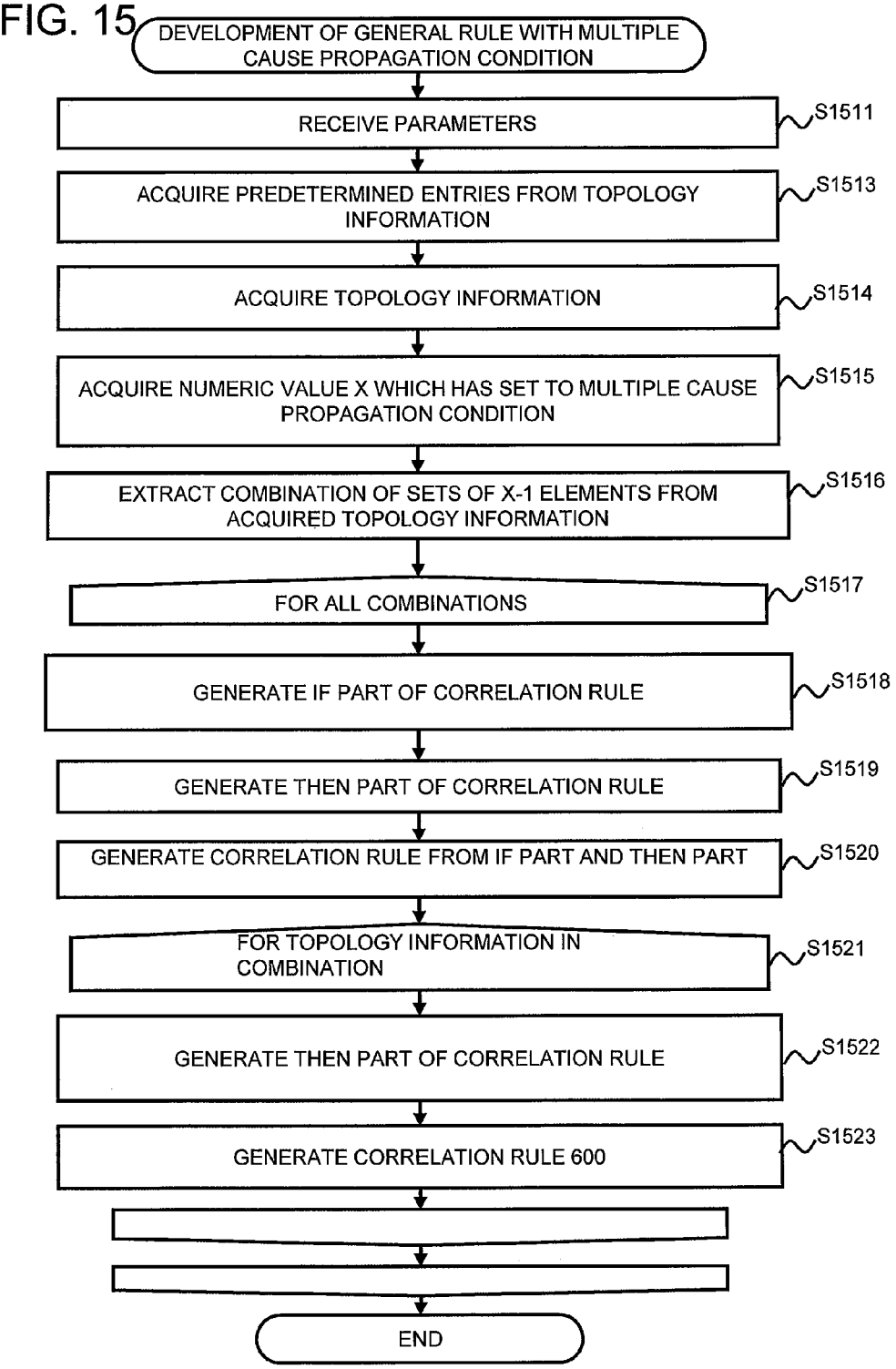
FIG. 15 is a flowchart showing an example of development processing of general rule with multiple cause propagation condition.

In step S1420, the "rule development processing" performs the "development processing of general rule with multiple cause propagation condition" shown from step S1511 to step S1523 of FIG. 15 by passing, as parameters, the general rule 400 acquired in step S1411, the topology construction method 500 acquired in step S1413, and the specific topology information acquired in step S1416.

FIG. 15 shows a flowchart of development processing of general rule with multiple cause propagation condition described in step S1420 of FIG. 14.

In step S1511, the "development processing of general rule with multiple cause propagation condition" receives the general rule 400, the topology construction method 500, and the topology information as parameters.

In step S1513, the "development processing of general rule with multiple cause propagation condition" acquires all entries in the configuration information table 137 from the topology information acquired in step S1511. The predetermined entry is the entry of the configuration information table 137 corresponding to the managed component condition described in the condition element to which the multiple cause propagation condition 431 is not configured among the condition elements of IF part 412 in the general rule 400.

In step S1514, based on the means indicated by the topology construction method 500 acquired in step S1511, the "development processing of general rule with multiple cause propagation condition" acquires all the topology information, which is different from the topology information acquired in step S1511 and includes the predetermined entries of the configuration information table 137 acquired in step S1513, from the configuration information table 137.

In step S1515, the "development processing of general rule with multiple cause propagation condition" acquires a predetermined value X in the multiple cause propagation condition 431 configured to the condition element of the general rule 400 acquired in step S1511.

In step S1516, the "development processing of general rule with multiple cause propagation condition" extracts all combinations of sets of (X−1) pieces of topology information from all the topology information acquired in step S1514.

In step S1517, the "development processing of general rule with multiple cause propagation condition" repeats the processing from step S1518 to step S1523 for all the combinations of the topology information extracted in step S1516.

In step S1518, the "development processing of general rule with multiple cause propagation condition" generates the IF part 601 of the correlation rule based on the managed component identifiers included in all the topology information in the combination of the specific topology information extracted in step S1516, the managed component identifiers included in the topology information acquired in step S1511, and information of the IF part 412 of the general rule 400 acquired in step S1511.

In step S1519, the "development processing of general rule with multiple cause propagation condition" generates the THEN part 1902 of the correlation rule based on the managed component identifiers included in the topology information acquired in step S1511, and information of the THEN part 413 of the general rule 400 acquired in step S1511.

In step S1520, the "development processing of general rule with multiple cause propagation condition" integrates the IF part 601 of the correlation rule generated in step S1518 and the THEN part 602 of the correlation rule generated in step S1519 into the correlation rule 600, and adds the correlation rule 600 to the correlation rule list 126.

In step S1521, the "development processing of general rule with multiple cause propagation condition" repeats the processing from step S1522 to step S1523 for all the topology information included in the combinations of the specific topology information extracted in step S1516.

In step S1522, the "development processing of general rule with multiple cause propagation condition" generates the THEN part 602 of the correlation rule based on the managed component identifiers included in the specific topology information, and information of the THEN part 413 of the general rule 400 acquired in step S1511.

In step S1523, the "development processing of general rule with multiple cause propagation condition" integrates the IF part 601 of the correlation rule generated in step S1518 and the THEN part 602 of the correlation rule generated in step S1522 into the correlation rule 600, and adds the correlation rule 600 to the correlation rule list 126.

For example, the rule development processing receives the managed component type "Computer," the managed component identifier "ServerA," and the event type "Nic_Err" from the entry 911 of FIG. 9, and parses the general rule 400a (steps S1411 to S1412).

The rule development processing acquires the topology construction method 500a from the topology construction method repository 135 by using the general rule name "GeneralRule1" of the general rule 400a as a key (step S1413).

The rule development processing acquires the entry 311 from the configuration information table 137 by using the managed component identifier "ServerA" as a key (step S1414). Further, the rule development processing confirms the origin managed component condition 512a of the topology construction method 500a. The origin managed component condition 512a makes it a condition that the managed component type is "Computer" and the attribute "provided service" is the specific service "ServiceX."

Then, the rule development processing confirms the entry 311. In the entry 311, "WebService" is configured to the value of the provided service 303. Therefore, the rule development processing recognizes that the ServerA in itself is the origin managed component (step S1415).

In the case where the managed component identifier acquired in step S1411 is not the identifier of the origin managed component, the rule development processing acquires the entry corresponding to the origin managed component from the configuration information table 137 based on means indicated by the topology construction condition 515a.

In this embodiment, % Servicex % is treated as a variable, and the value of the variable is substituted for the general rule or the topology construction method based on the managed component associated with the received event message. Therefore, in this embodiment, "WebService" is substituted for % Servicex %.

According to the topology construction condition 515a of the topology construction method 500a, the rule development processing searches the configuration information table 137 for all the Computers which have the access service 304 "WebService" for the provided service "WebService" of ServerA. Consequently, the entry 315 which is the configuration information on the client computer 153 is found.

Therefore, as the topology for developing the general rule 400a, the rule development processing acquires a combination of topology information "entry 311-entry 315" which has the entry 311 (ServerA) as the origin and the entry 315 (Client) as the endpoint (step S1416).

In the general rule 400a, the multiple cause propagation condition 431 is configured to the second condition element. Then, the rule development processing starts the development processing of general rule with multiple cause propagation condition by passing the general rule 400a and the acquired topology information "entry 311-entry 315" as parameters (steps S1417 to S1420).

The development processing of general rule with multiple cause propagation condition receives the general rule 400a (the value "WebService" is substituted for % ServiceX %), the topology information "entry 311-entry 315," and the topology construction method 500a (the value "WebService" is substituted for % ServiceX %) as parameters (step S1511).

The development processing of general rule with multiple cause propagation condition (hereinafter, also referred to as "development processing with condition" for short) acquires the entry 315 which corresponds to the condition of the managed component indicated by the condition element "Computer. access service=WebService (WebService) AveResponseTime_Err" of the general rule 400a, to which the multiple cause propagation condition 431 is not configured, from the topology information "entry 311-entry 315" acquired in step S1511 (step S1513).

For the entry 315 of the endpoint managed component, the development processing with condition searches the configuration information table 137 for an entry (except for the entry 311) which has the provided service 303 "WebService," based on the topology construction condition 515a "Computer. provided service=WebService."

The development processing with condition acquires the topology information "entry 312-entry 315," "entry 313-entry 315," "entry 314-entry 315" for the found ServerB, ServerC, ServerD (step S1514).

Next, the development processing with condition acquires the numerical value "2" which is configured to the multiple cause propagation condition from the general rule 400a, and obtains the value "1" by subtracting 1 from the numerical value "2."

Based on the value "1," the development processing with condition extracts a combination for selecting "one" unit as a set from the topology information "entry 312-entry 315," "entry 313-entry 315," "entry 314-entry 315" (steps S1515, S1516). That is, the development processing with condition extracts combination topologies "entry 312-entry 315," "entry 313-entry 315," "entry 314-entry 315."

In the case where the numerical value configured to the multiple cause propagation condition is "3," the combinations "entry 312-entry 315," "entry 313-entry 315," "entry 313-entry 315," "entry 314-entry 315," "entry 312-entry 315," "entry 314-entry 315" are extracted.

Next, the development processing with condition performs the processing for selecting one set from the extracted combinations on all the combinations (step S1517).

For example, in the case where the combination "entry 312-entry 315" is selected, the development processing with condition generates from the IF part 412 of the general rule 400a and the entries included in the topology information "entry 311-entry 315" and "entry 312-entry 315," the IF part 601 (FIG. 6) which has "(WebService)AveResponseTime_Err" of Client (entry 315), "Nic_Err" of ServerA (entry 311), and "Nic_Err" of ServerB (entry 312) as the condition part (step S1518).

Next, the development processing with condition generates the THEN part 602 (FIG. 6) which has "Nic_Err" of ServerA (entry 311) as the conclusion part based on the topology information "entry 311-entry 315" and the general rule 400a, and adds the correlation rule 600a to the correlation rule list 126 (step S1519 to S1520).

The development processing with condition selects one piece of topology information from the extracted combination "entry 312-entry 315." Since the combination has only one piece of topology information in this description, the development processing with condition selects "entry 312-entry 315" (step S1521).

The development processing with condition generates the correlation rule 600d by generating the THEN part (FIG. 6) which has "Nic_Err" of ServerB (entry 312) as the conclusion part based on the selected topology information "entry 312-entry 315" and the general rule 400a, and adds the correlation rule 600d to the correlation rule list 126 (steps S1522, S1523).

After the loop of step S1517 and the loop of step S1521 are repeated, the correlation rules 600a to 600c and the correlation rules 600d, 600g, 600j among the correlation rules of FIG. 6 are generated respectively and added to the correlation rule list 126.

FIG. 16 shows a flowchart of the "rule development processing for conclusion event" described in step S1317 of FIG. 13.

In step S1611, the "rule development processing for conclusion event" acquires all the conclusion elements of the THEN parts 602 of the correlation rules 600 included in the correlation rule list 126 without duplication.

In step S1612, the "rule development processing for conclusion event" repeats the processing from step S1613 to step S1618 for the conclusion elements of all the THEN parts 602 acquired in step S1611.

In step S1613, the "rule development processing for conclusion event" acquires the managed component identifiers recorded in the specific conclusion elements acquired in step S1611.

In step S1614, the "rule development processing for conclusion event" acquires the entries corresponding to the managed component identifiers acquired from the configuration information table 137 in step S1613, and acquires the managed component type 302 in each entry.

In step S1615, the "rule development processing for conclusion event" acquires from the general rule search table 131 all the general rule names 1203 corresponding to the component types 302 acquired in step S1614 and the event types recorded in the specific conclusion elements acquired in step S1611.

In step S1616, the "rule development processing for conclusion event" acquires from the general rule repository 136 the general rules 400 corresponding to the general rule names 1203 acquired in step S1615.

In step S1617, the "rule development processing for conclusion event" repeats the processing of step S1618 for all the general rules 400 acquired in step S1616.

In step S1618, the "rule development processing for conclusion event" performs the "rule development processing" shown from steps S1411 to S1420 of FIG. 14 by passing, as parameters, the specific general rules 400 acquired in step S1616, the managed component identifiers acquired in step S1613, the managed component types acquired in step S1614, and the event types recorded in the specific conclusion elements of the correlation rules acquired in step S1611.

As an example, the case where the correlation rules 600a to 600c and the correlation rules 600d, 600g, 600j of FIG. 6 are on the correlation rule list 126 will be described. In that case, all the conclusion elements which are acquired without duplication are "ServerA Nic_Err," "ServerB Nic_Err," "ServerC Nic_Err," "ServerD Nic_Err" (step S1611).

The rule development processing for conclusion event selects one of the acquired conclusion elements (step S1612). For example, in the case where "ServerB Nic_Err" is selected in step S1612, the rule development processing for conclusion event acquires the managed component identifier "ServerB" in that conclusion element (step S1613).

Further, the rule development processing for conclusion event acquires the entry 312 from the configuration information table 137 by using ServerB as a key, and acquires the managed component type "Computer" from the entry 312 (step S1614).

The rule development processing for conclusion event uses "Computer" and the event type "Nic_Err" of the conclusion element as keys in searching the general rule search table 131 of FIG. 12 for the entry 1211 and the entry 1212 and acquires these entries. The rule development processing for conclusion event acquires "GeneralRule1" and "GeneralRule3" in the general rule name 1203 from the entries 1211, 1212 (step S1615).

The rule development processing for conclusion event acquires the general rules 400a, 400c under the acquired general rule names of "GeneralRule1" and "GeneralRule3" from the general rule repository 136 (step S1616).

The rule development processing for conclusion event performs the processing for selecting one from the general rules 400a, 400c on all the general rules (step S1617). For example, in the case where the rule development processing for conclusion event selects the general rule 400a, it performs the rule development processing of FIG. 14 and passes the general rule 400a, the managed component type "Computer," the managed component identifier "ServerB," and the event type "Nic_Err" as parameters (step S1618).

As a result, the correlation rules 600d to 600f, 600h, 600k of FIG. 6 are added to the correlation rule list 126. In the case where the general rule 400c is selected in step S1617, the correlation rule 600p is added to the correlation rule list 126.

<Correlation rule Memory Generator Program>

Figure 17:
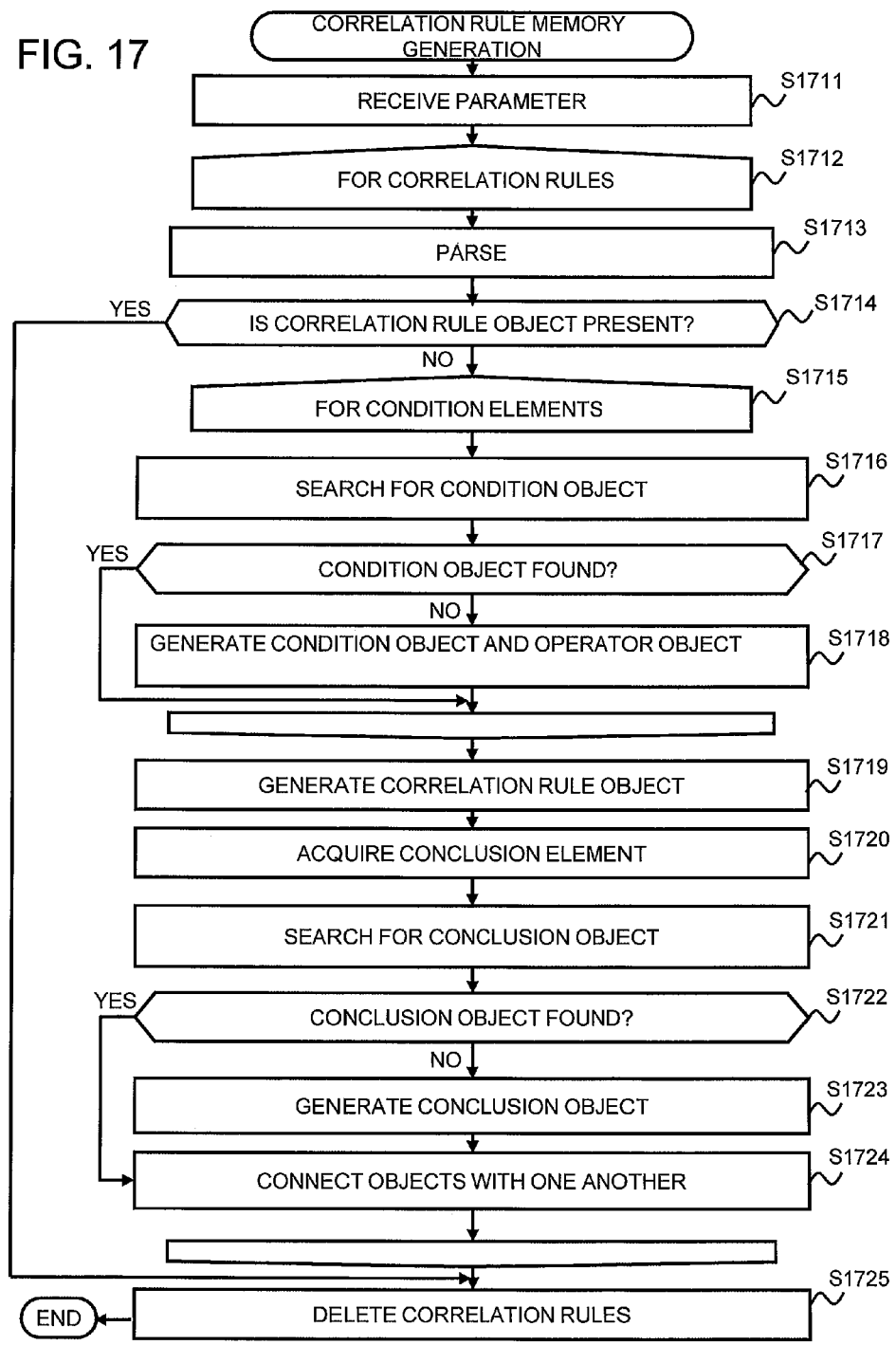
FIG. 17 is a flowchart showing an example of correlation rule memory generator program processing.

FIG. 17 shows a flowchart of the correlation rule memory generation processing performed by the correlation rule memory generator program 122. The correlation rule memory generator program 122 may be adapted to be started by the correlation rule generator program 129.

In step S1711, the correlation rule memory generator program 122 receives the correlation rule list 126 as parameters.

In step S1712, the correlation rule memory generator program 122 repeats the processing from step S1713 to step S1724 for all the correlation rules 600 included in the correlation rule list 126 acquired in step S1711.

Next, in step S1713, the correlation rule memory generator program 122 parses the specific correlation rules 600 in the correlation rule list 126 acquired in step S1711.

In step S1714, the correlation rule memory generator program 122 examines whether an correlation rule object 703 corresponding to the specific correlation rules 600 is present in the correlation rule memory 121. If it is present (S1714: YES), the processing jumps step S1715 to step S1724 to proceed to step S1725. If it is not present (S1714: NO), the processing proceeds to step S1715.

In step S1715, the correlation rule memory generator program 122 repeats the processing from step S1716 to step S1718 for all the condition elements included in the IF parts 601 of the specific correlation rules 600.

In step S1716, the correlation rule memory generator program 122 examines whether a condition object 701 corresponding to the specific condition elements is present in the correlation rule memory 121.

If the correlation rule memory generator program 122 cannot find a corresponding condition object 701 in step S1717 (S1717: NO), the processing proceeds to step S1718. On the other hand, if a condition object 701 is found (S1717: YES), the processing does not performs step S1718 and proceeds to the next step.

In step S1718, the correlation rule memory generator program 122 generates the condition objects 701 and the operator objects 702 for the specific condition elements into the correlation rule memory 121, and connects these newly generated condition objects 701 and the operator objects 702 with each other.

In step S1719, the correlation rule memory generator program 122 generates an correlation rule object 703 corresponding to the specific correlation rules 600, and then, connects all the related operator objects 702.

In step S1720, the correlation rule memory generator program 122 acquires the conclusion elements from the THEN parts 602 of the specific correlation rules 600.

In step S1721, the correlation rule memory generator program 122 examines whether a conclusion object 704 corresponding to the condition elements in step S1720 is present in the correlation rule memory 121.

If the correlation rule memory generator program 122 cannot find a corresponding conclusion object 704 in step S1722 (S1722: NO), the processing proceeds to step S1723. On the other hand, if a conclusion object 704 is found (S1722: YES), the processing proceeds to step S1724.

In step S1723, the correlation rule memory generator program 122 generates a conclusion object 704 for the conclusion elements acquired in step S1720 into the correlation rule memory 121.

In step S1724, the correlation rule memory generator program 122 connects the related conclusion object 704 with the correlation rule object 703 generated in step S1719.

In step S1725, the correlation rule memory generator program 122 deletes all the correlation rules 600 which were processed from step S1713 to step S1724 from the correlation rule list 126.

For example, the correlation rule memory generator program 122 receives the correlation rule list 126 as parameters, and if the correlation rule 600a of FIG. 6 is on the correlation rule list 126, it selects the correlation rule 600a (steps S1711 to S1712).

The correlation rule memory generator program 122 parses the correlation rule 600a. As a result of the parsing, it is found that the condition elements "ServerA Nic_Err," "ServerB Nic_Err," and "Client (WebService)AveResponseTime_Err" are recorded in the IF part 601 and the conclusion element "ServerA Nic_Err" is recorded in the THEN part 602.

Then, the correlation rule memory generator program 122 searches the correlation rule memory 121 for the correlation rule object 703 which has a combination of the managed component identifier and the event type of the condition object 701 connected with the condition object 701 which has ServerA-Nic_Err, ServerB-Nic_Err, Client-(WebService) AveResponseTime_Err via the operator object 702 (but the Not attribute is False) and also has a combination of the managed component identifier and the event type is connected with the conclusion object 704 of ServerA-Nic_Err, among the correlation rule objects 703. If a corresponding correlation rule object 703 is not present, the correlation rule memory generator program 122 generates an correlation rule object 703 into the correlation rule memory 121 (step S1713 to step S1724).

As shown in FIG. 7, the condition objects 701 of the correlation rule 600a are 701a, 701b, and 701c. These condition objects 701a to 701c are connected with the operator objects 702a to 702c, respectively. The conclusion object 704 of the correlation rule 600a is 704a.

Therefore, the connections 704a to 703a to 702a to 701a, 704a to 703a to 702b to 701b, and 704a to 703a to 702a to 701c need to be generated with respect to the correlation rule object 703a for the correlation rule 600a.

Similarly, the condition objects 701 of the correlation rule 600b are 701b, 701c, and 701d. Therefore, the condition objects 701b and 701c overlap the condition objects of the correlation rule 600a. In that case, the correlation rule object 703a and the correlation rule object 703b are generated so that they share the corresponding operator objects 702b to 702c and the condition objects 701b to 701c, and connected with each other.

The correlation rule object 600 and the correlation rule 600b share the conclusion object 704a. The condition objects of the correlation rule 600m are the condition objects 701b and 701g, and the condition object 701b overlaps the condition object of the correlation rule 600a. In that case, the conclusion object 704a and the conclusion object 704b share the corresponding operator object 702b and the condition object 701b.

When the correlation rule memory generator program 122 has generated the correlation rule memory as shown in FIG. 7 with respect to all the correlation rules 600 in the correlation rule list 126, it deletes all the correlation rules in the correlation rule list 126 (step S1725).

In this embodiment, whether all of the condition object 701, the operator 702, and the conclusion object 704 are the condition elements of the IF part 601 of the correlation rule is examined and whether they match the conclusion elements of the THEN part 602 is examined in step S1714 to search the correlation rule memory 121; though, the search condition is not limited to that and may be any condition as far as it can uniquely identify the correlation rule.

<Event Writing Program>

Figure 18:
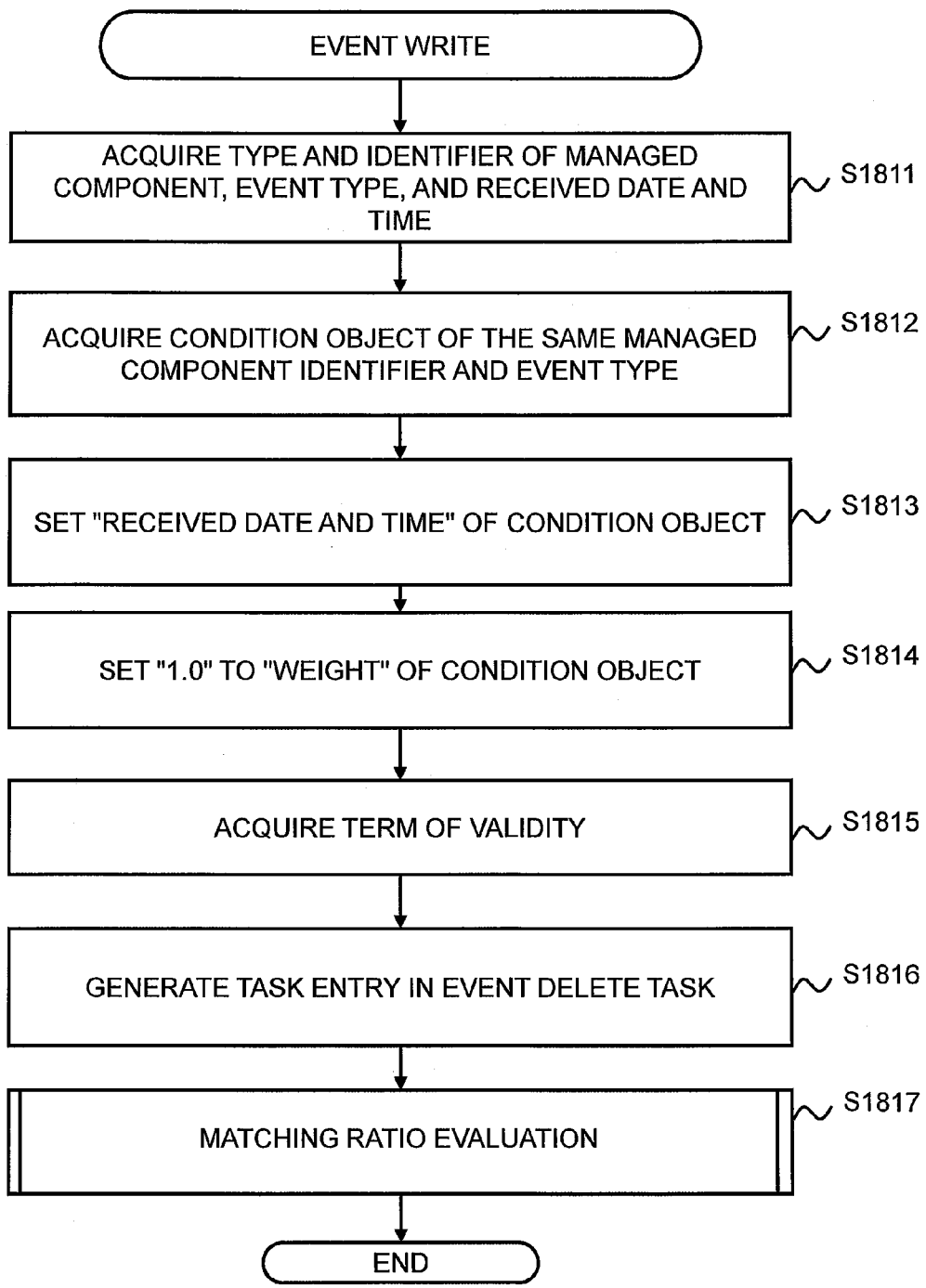
FIG. 18 is a flowchart showing an example of event writing program processing.

FIG. 18 shows a flowchart of the event write processing which is performed by the event writing program 124.

In step S1811, the event writing program 124 acquires the managed component type 901, the managed component identifier 902, the event type 903, and the received date and time 904 respectively from the entry of the event queue table 132 acquired as parameters.

In step S1812, the event writing program 124 decides the condition object 701 which has the same managed component identifier and event type as those acquired in step S1811 in the correlation rule memory 121.

In step S1813, the event writing program 124 configures the value of the received date and time 904 acquired in step S1811 to the "received date and time" attribute of the condition object 701 decided in step S1812.

In step S1814, the event writing program 124 configures "1.0" to the "weight" attribute of the condition object 701 acquired in step S1812.

In step S1815, the event writing program 124 acquires the term of validity 1003 corresponding to the managed component type 901 and the event type 903 acquired from the event delete configuration table 133 in step S1811.

In step S1816, the event writing program 124 generates a task entry in the event delete task table 134 so that the event deleting program can perform the event delete task at the date and time specified to the start date and time 1101.

For example, in the case where the entry to be processed in the event queue table 132 is the entry 911 of FIG. 9, the managed component type is "Computer" and the event type is Nic_Err.

Next, with reference to the event delete configuration table 133 for the computer which has Nic_Err in the entry 1011, it is understood that the term of validity 1003 is ten minutes. Therefore, in this embodiment, the task entry generated in the event delete task table 134 in step S1816 would be the start date and time 1101="received date and time"+ten minutes; the managed component identifier 1102="ServerA"; the event type 1103="Nic_Err."

In step S1817, the event writing program 124 starts the matching ratio evaluation program 125 and passes the condition object 701 decided in step S1812 to the matching ratio evaluation program 125 as a parameter. In the above described example in which the entry to be processed is the entry 911 of FIG. 9, the parameter is the condition object 701a of FIG. 7. After starting the matching ratio evaluation program 125, the event writing program 124 finishes the processing.

<Matching Ratio Evaluation Program>

Figure 19:
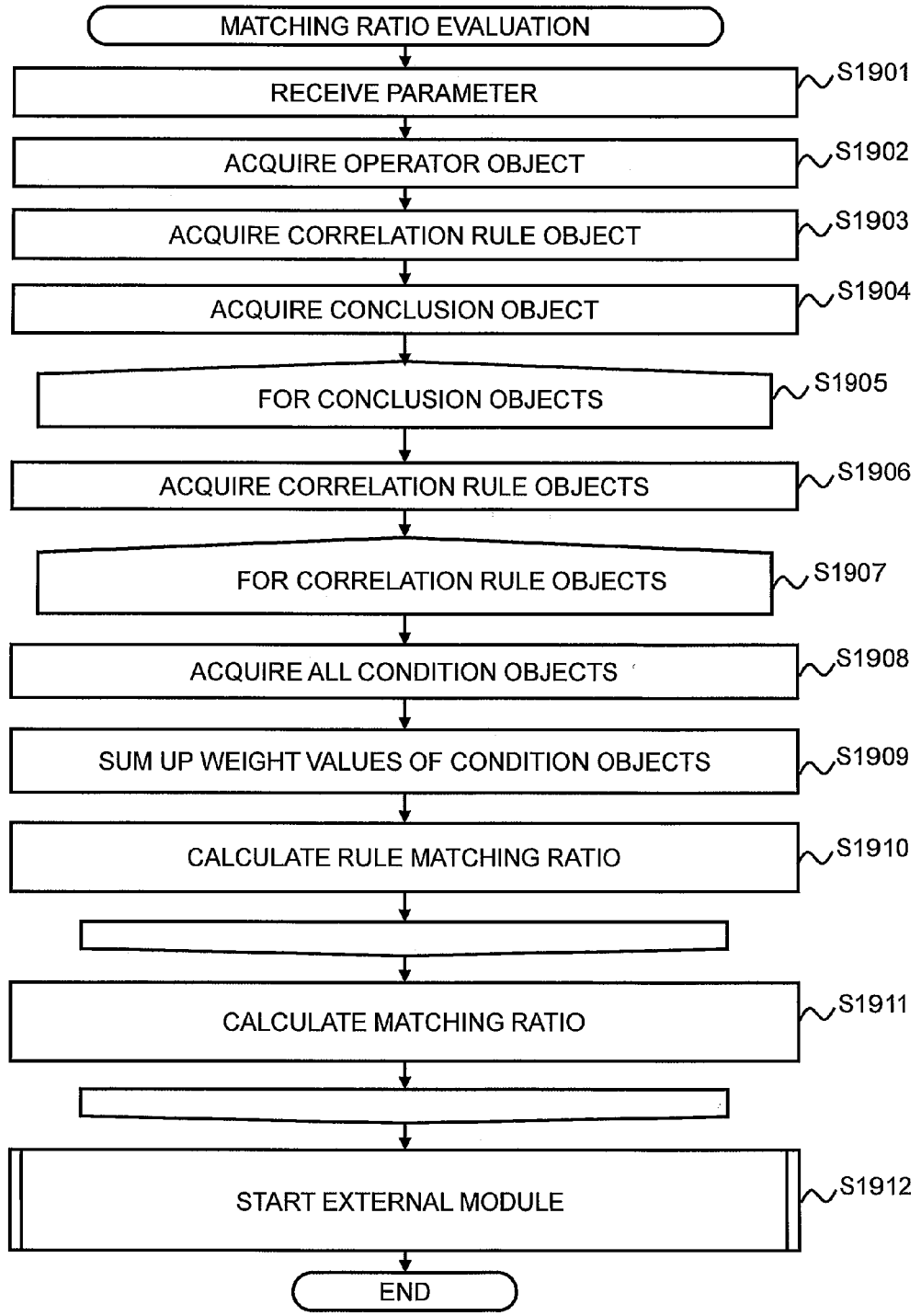
FIG. 19 is a flowchart showing an example of matching ratio evaluation program processing.

FIG. 19 shows a flowchart of the processing for performing the matching ratio evaluation which is performed by the matching ratio evaluation program 125. The matching ratio evaluation program 125 is started by the event writing program 124 or the event deleting program 127 and starts processing.

In step S1901, when the matching ratio evaluation program 125 is started by the event writing program 124 or the event deleting program 127, it receives the specific condition object 701 as a parameter.

In step S1902, the matching ratio evaluation program 125 acquires the operator object 702 connected with the received specific condition object 701.

In step S1903, the matching ratio evaluation program 125 acquires the correlation rule object 703 for connecting with the specific operator object 702 acquired in step S1902.

In step S1904, the matching ratio evaluation program 125 acquires the conclusion object 704 for connecting with the correlation rule object 703 acquired in step S1903.

In step S1905, the matching ratio evaluation program 125 repeats the processing from step S1906 to step S1911 for all the conclusion objects 704 acquired in step S1904.

In step S1906, the matching ratio evaluation program 125 acquires all the correlation rule objects 703 connected with the specific conclusion object 704.

In step S1907, the matching ratio evaluation program 125 repeats the processing from step S1908 to step S1910 for all the correlation rule objects 703 acquired in step S1906.

In step S1908, the matching ratio evaluation program 125 traces the connections from the specific correlation rule object 703 to any of the other operator objects 702, then, from any of the operator objects 702 to any of the other condition objects 701. As a result, the matching ratio evaluation program 125 acquires all the condition objects 701 together with the specific correlation rule objects 703 acquired in step S1906.

In step S1909, the matching ratio evaluation program 125 calculates the sum of the weight values of all the condition objects 701 acquired in step S1908.

For example, in the example shown in FIG. 7, the correlation rule object 703a is connected with the operator objects 702a to 702c. The operator objects 702a to 702c are connected with the condition objects 701a to 701c, respectively.

Each of the condition objects 701a to 701c has the weight value of 1.0. As a result, in this embodiment, the sum of the weights is equal to 3.0.

In step S1910, the matching ratio evaluation program 125 calculates the value of the rule matching ratio (RMR) according to the expression "RMR=the sum of the weights/the number of the condition objects," and configures the calculation result to the RMR attribute of the corresponding correlation rule object 703. For example, as shown in FIG. 7, the RMR of the correlation rule object 703a is equal to 1.0(=3.0/3).

In step S1911, the matching ratio evaluation program 125 calculates the value of the matching ratio (MR) according to the expression "MR=Max (the RMR of the connected correlation rule object," and configures the calculation result to the MR attribute of the corresponding conclusion object 704.

For example, as shown in FIG. 7, the correlation rule objects connected with the conclusion object 704a are 703a to 703d, and the RMR for the respective correlation rule objects are 1.00 for 703a, 0.66 for 703b, 0.66 for 703c, and 0.50 for 703d. As a result, the MR of the conclusion object 704a is equal to 1.0(=3.0/3).

In step S1912, the matching ratio evaluation program 125 starts the external module 128 by passing the conclusion object 704, the matching ratio of which is calculated as a parameter, to the external module 128 and finishes the processing.

<External Module>

As an example of the external module 128, a module for displaying the result obtained as a conclusion of the root cause analysis on the display 117 will be described. An example of the analysis which is displayed by a screen module 128 on the display 117 in the case where the correlation rule memory 121 of FIG. 7 is acquired will be shown in FIG. 21.

As shown in FIG. 21, an analysis display screen 2100 displayed by the external module 128 may include a root cause evaluation place 2101, a cause state 2102, a matching ratio 2103, and an occurred phenomenon 2104.

The root cause evaluation place 2101 displays the name of the managed component which is identified by the attribute "managed component identifier" of the conclusion object 704. The cause state 2102 displays the state indicated by the attribute "cause" which indicates the cause of the error. The matching ratio 2103 displays the probability of accuracy. The occurred phenomenon 2104 displays the other faults or the other states caused by the cause state 2012 which occurred at the root cause place 2101.

Figure 32:
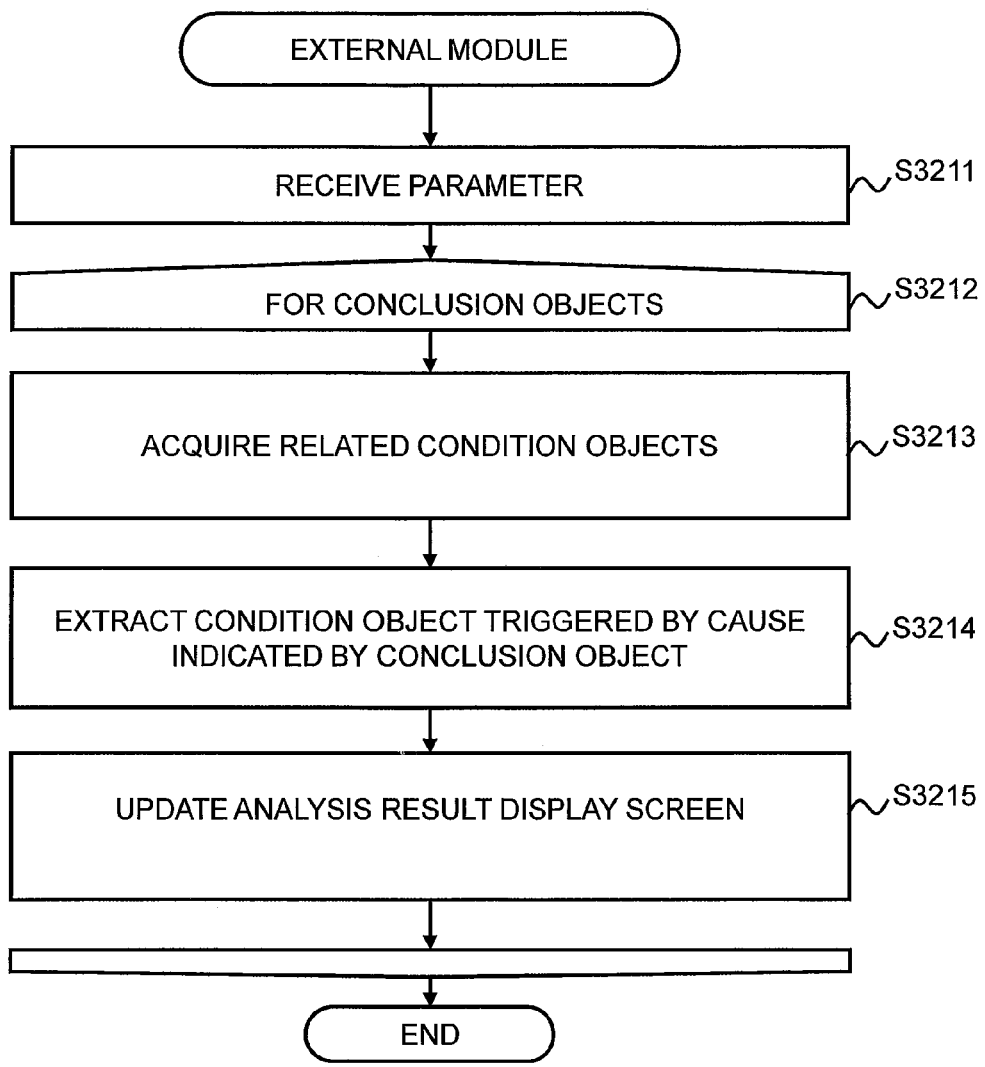
FIG. 32 is a flowchart of processing by an external module acquiring information to show on the display.

FIG. 32 shows a flowchart of the processing performed by the external module 128 for displaying the screen 2100 of FIG. 21.

In step S3211, the external module 128 receives the conclusion object 704 as parameters.

In step S3212, the external module 128 repeats the processing from step S3213 to step S3215 for all the received conclusion objects 704.

In step S3213, the external module 128 acquires all the condition objects 701 together with the conclusion objects 704 by tracing the connections from the specific conclusion objects 704 to the other correlation rule objects 703, then, from the correlation rule objects 703 to the other operator objects 702, further, from any of the other operator objects 702 to any of the other condition objects 701.

In step S3214, the external module 128 extracts, from the condition objects 701 acquired in step S3213, the condition object 701 which indicates that it is a received event and is triggered by the cause indicated by the specific conclusion object 704.

In step S3215, the external module 128 generates information to display on the analysis display screen 2100 from information of the attribute of the specific conclusion object 704 and information of the attribute of all the condition objects 701 acquired in step S3214, and updates the screen 2100 with the information.

For example, in the case where the external module 128 receives the conclusion object 704a shown in FIG. 7 as parameters, the condition objects 701 which are associated with the conclusion object 704a and indicate received events are the condition objects 701a to 701c.

Among the condition objects 701a to 701c, the condition object 701 which indicates the event triggered by the cause indicated by the conclusion object 704a is the condition object 701b which indicates "Client (WebService)AveResponseTime_Err ((the average response time of the Web service of the client computer increasing error)).

The method for judging whether an even is triggered by the cause indicated by the conclusion object 704a or not will be described. For example, the condition object 701a is generated based on the condition element "Computer. provided service=% ServiceX % Nic_Err" of the general rule 400a of FIG. 4, and the condition element "Computer. provided service=% ServiceX % Nic_Err" is equal to the state of the managed component indicated by the conclusion element of the THEN part 413a of the general rule 400a. Therefore, it can be judged that the event indicated by the condition object 701a is not an event which is triggered by the cause indicated by the conclusion object 704a.

Through the above described processing, the external module 128 displays on the screen the information indicated in the line 2111 of FIG. 21 based on the information of attributes of the acquired condition object 701a and conclusion object 704a.

In FIG. 21, even in the case where an event occurred in a certain managed component is caused by a combination of faults in a plurality of managed components, the managed components which caused the event or the cause states are separately displayed instead of displayed as a combination. In contrast, for example, in the line 2111 of FIG. 21, a combination of managed components such as "Server A and Server B" may be displayed in the root cause place 2101. Also in the cause state 2102, information of the cause states may be displayed in a combination.

<Event Deleting Program>

Figure 20:
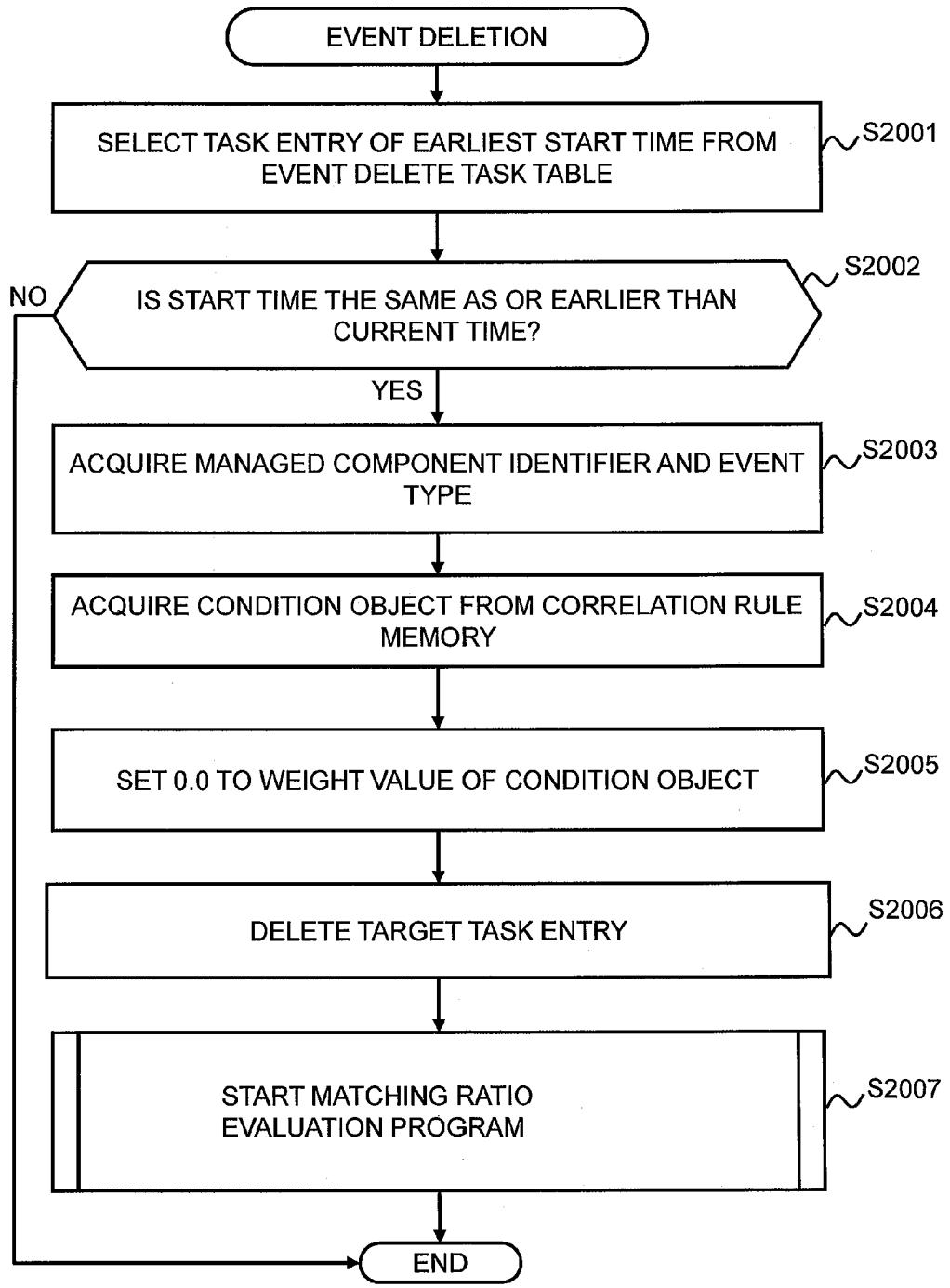
FIG. 20 is a flowchart showing an example of event deleting program processing.

FIG. 20 shows a flowchart an example of event delete processing which is performed by the event deleting program 127 in the monitoring computer 101. The event deleting program 127 periodically, for example at predetermined intervals, starts the processing.

In step S2001, the event deleting program 127 selects a task entry of the earliest start date and time 1101 by referencing the event delete task table 134.

In step S2002, the event deleting program 127 examines whether the start date and time 1101 of the task entry is the same as the current date and time or earlier than the current date and time. If it is the same as or the earlier than the current date and time (S2002: YES), the processing proceeds to step S2003. On the other hand, if an entry of the start date and time 1101 which is the same or earlier than the current date and time is not present in the event delete task table 134 (S2002: NO), it means that the event needs not to be deleted at the moment by this processing, therefore, the processing finishes.

In step S2003, the event deleting program 127 acquires the managed component identifier 1102 and the event type 1103 of the entry.

In step S2004, by referencing the correlation rule memory 121, the event deleting program 127 acquires the condition object 701 corresponding to the managed component identifier 1102 and the event type 1103 which were acquired in step S2003.

In step S2005, the event deleting program 127 configures "0.0" to the weight value of the condition object 701 acquired in step S2004.

In step S2006, the event deleting program 127 deletes the target task entry from the event delete task table 134.

In step S2007, the event deleting program 127 starts the matching ratio evaluation program 125 by passing the condition object 701 acquired in step S2004, as a parameter. Therefore, it is understood that as the event deleting program 127 decreases the weight value of the condition object 701, the matching ratio of the corresponding conclusion object 704 is also decreased.

As it is apparent from the above described disclosure, in this embodiment, the root cause analysis can be performed for a fault propagation pattern, by which a managed component receives the propagation of a combination of events occurred in a plurality of managed components.

In this embodiment, in the general rule which is a fault propagation model independent from the system topology of the monitoring targets, a condition for identifying the above described fault propagation pattern is configured. As a result, this embodiment can analyze the root cause by generating the specific correlation rules and correlation rule memories for performing the root cause analysis based on the topology information of the monitoring target system.

In this embodiment, the case where the correlation rule for the received event is non-periodically generated from the general rule and the topology information is described; though, instead of that configuration, the present invention may be adapted to create all the correlation rules for the monitoring targets in advance before receiving the event.

Example 2

The example 2 will be described. In the example 2, the other correlation rule generation processing and the other matching ratio evaluation processing will be described.

In the example 1, correlation rules are generated respectively for all combinations of the managed components with respect to the general rule 400a which indicates that a combination of events of a plurality of managed components is the cause. However, in the case where the correlation rules are respectively generated for all the combinations, the data volume to be generated for the correlation rule list 126 and the correlation rule memory 121 becomes too large, which may cause the lack of capacity of the memory 112. In addition, as the correlation rules for one conclusion element is so many that it takes a long time in calculating the matching ratio for one conclusion element.

Figure 26A:
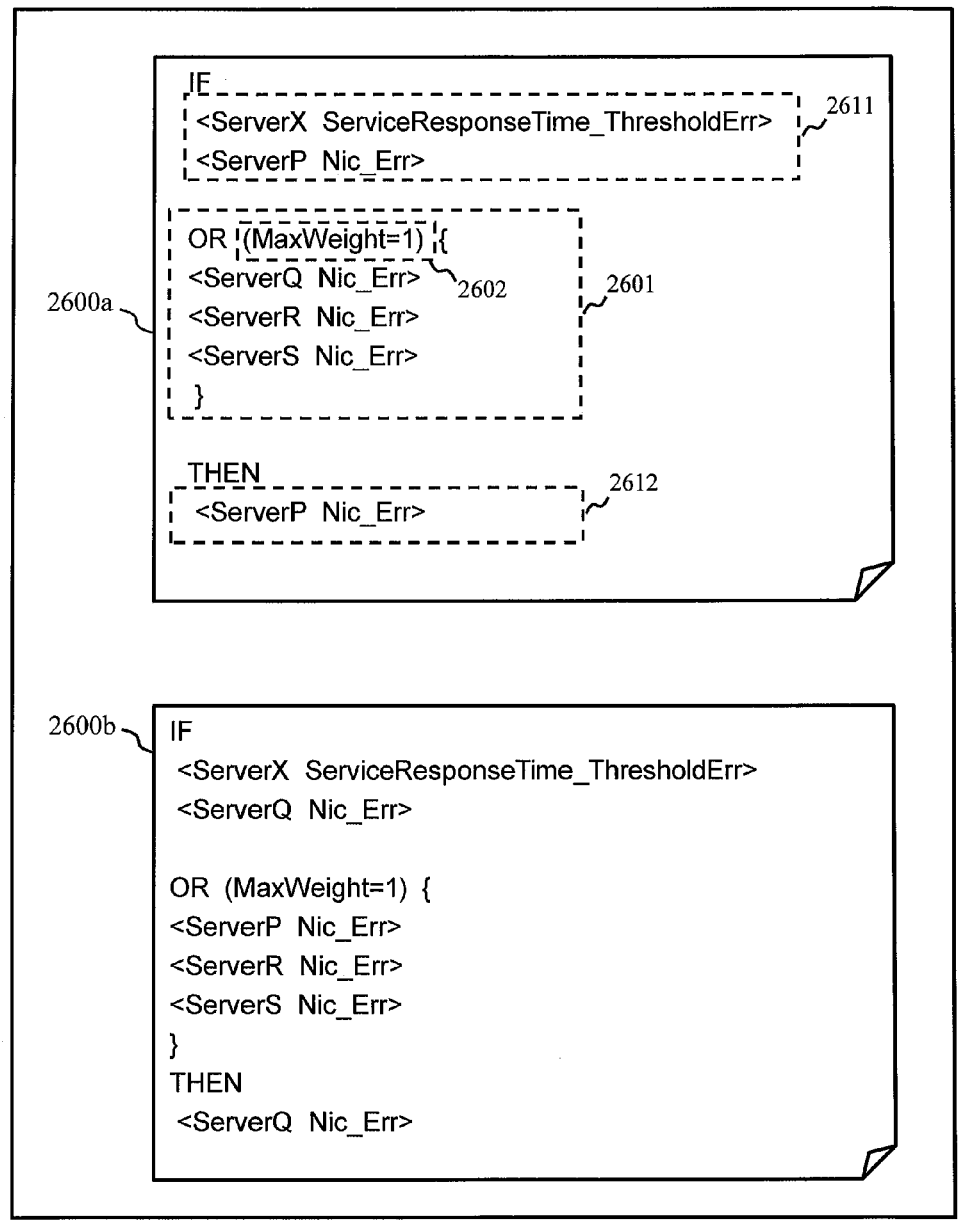
FIG. 26A is a diagram illustrating an example of an correlation rule list of the embodiment 2.
Figure 26B:
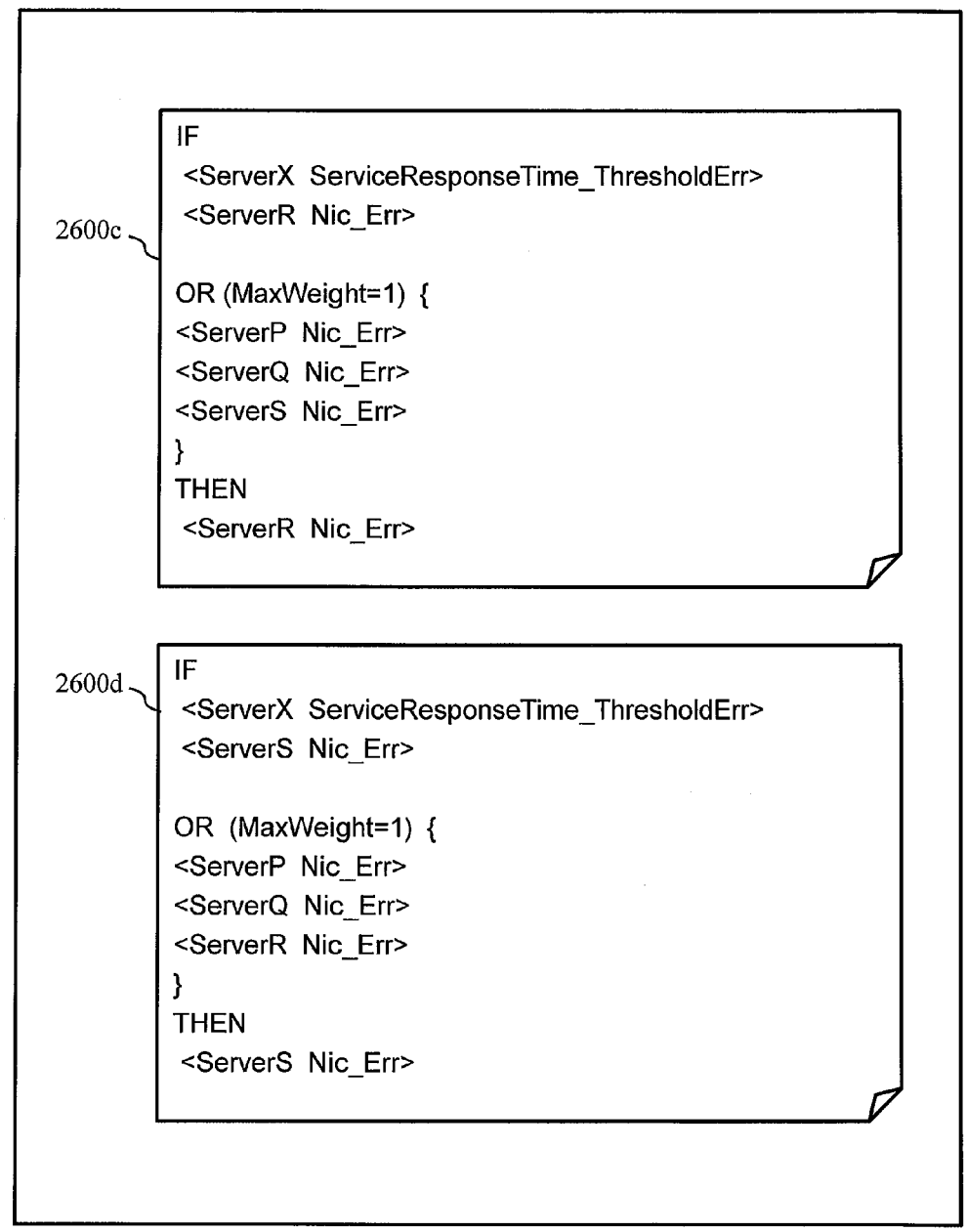
FIG. 26B is a diagram illustrating another example of the correlation rule list.
Figure 27:
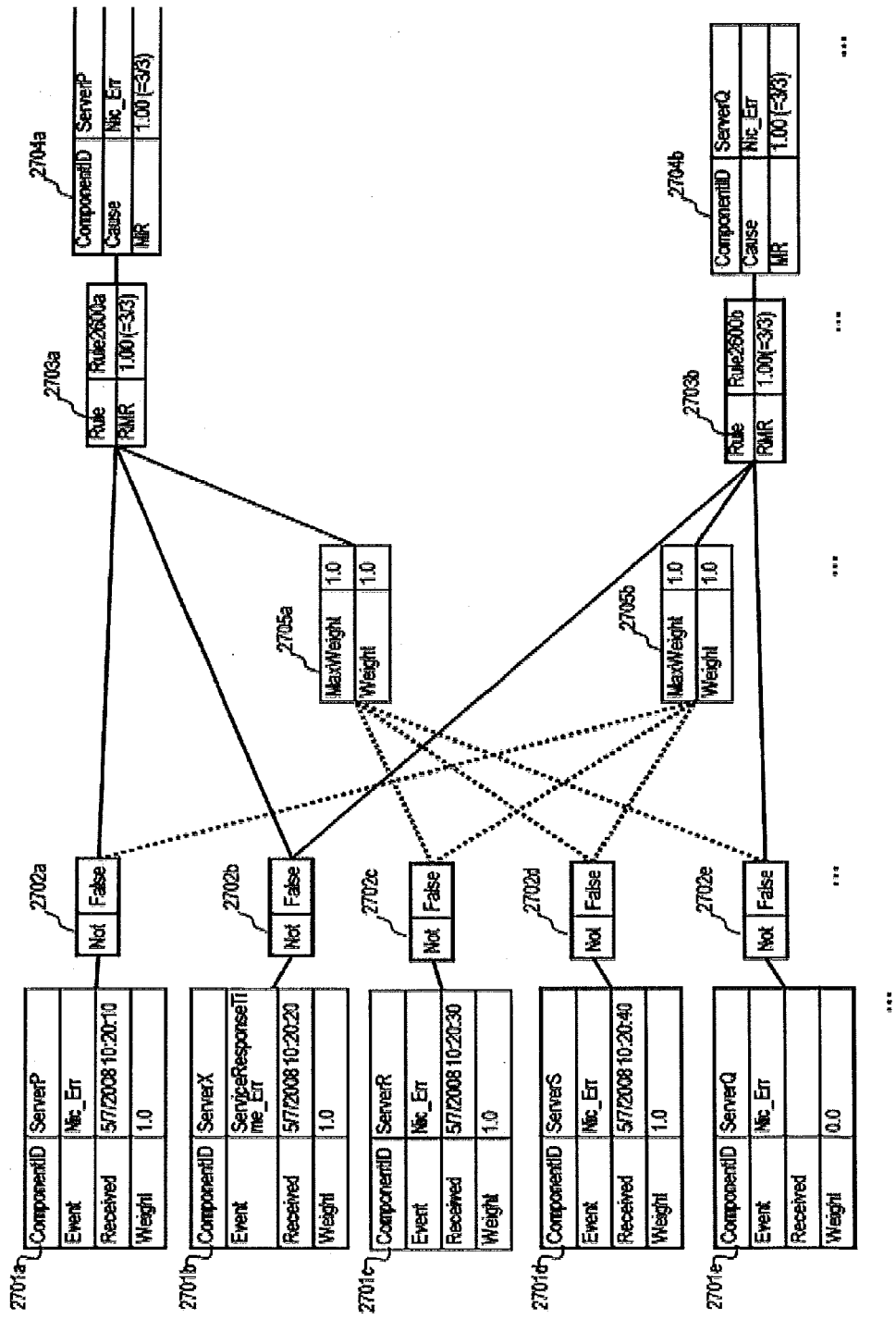
FIG. 27 is a diagram illustrating an example of association in an correlation rule memory of the embodiment 2.
Figure 28:
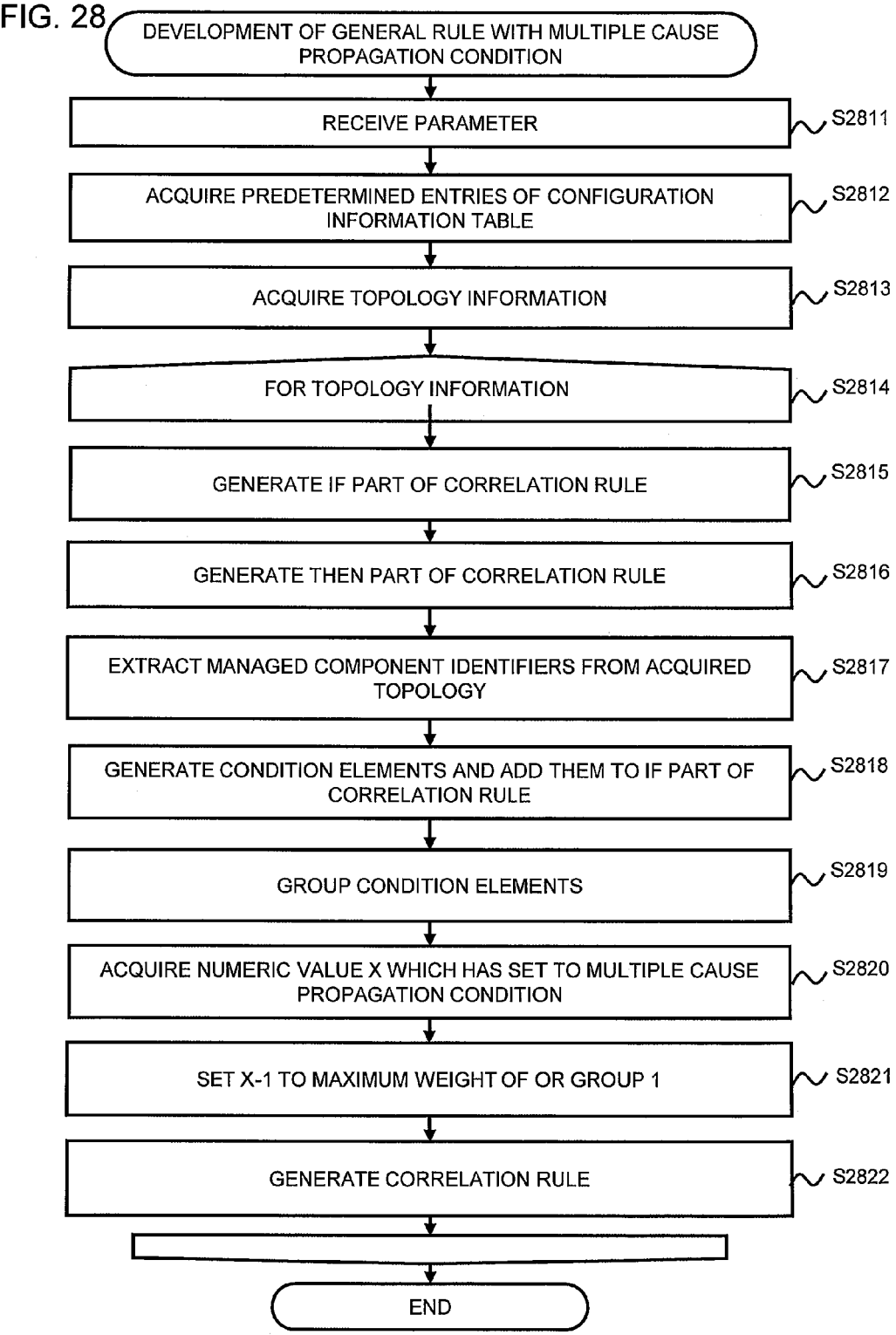
FIG. 28 is a flowchart showing an example of development processing of general rule with multiple cause propagation condition of the embodiment 2.
Figure 29:
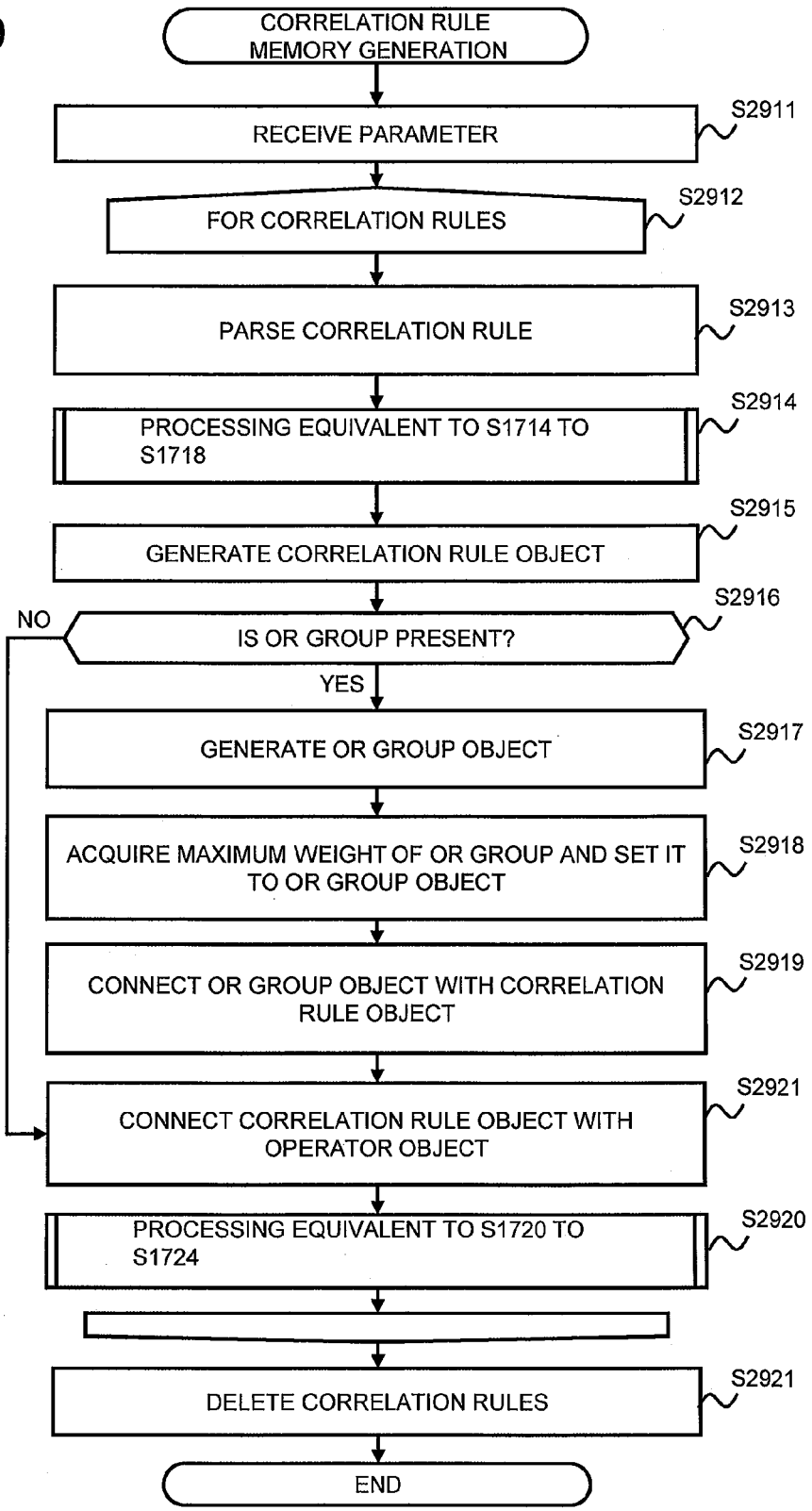
FIG. 29 is a flowchart showing an example of correlation rule memory generator program processing of the embodiment 2.
Figure 30A:
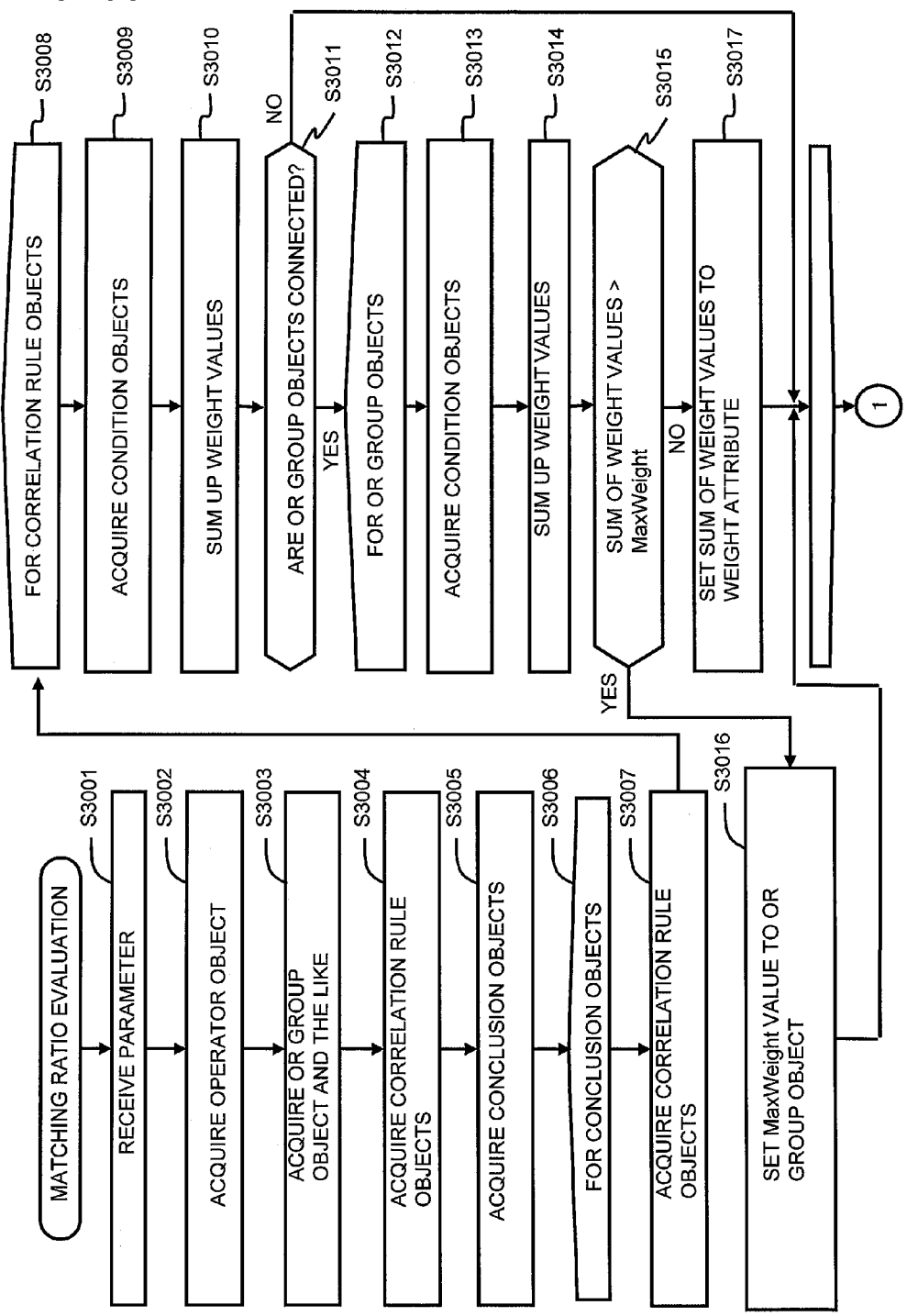
FIG. 30A is a flowchart of matching ratio evaluation program of the embodiment 2.
Figure 30B:
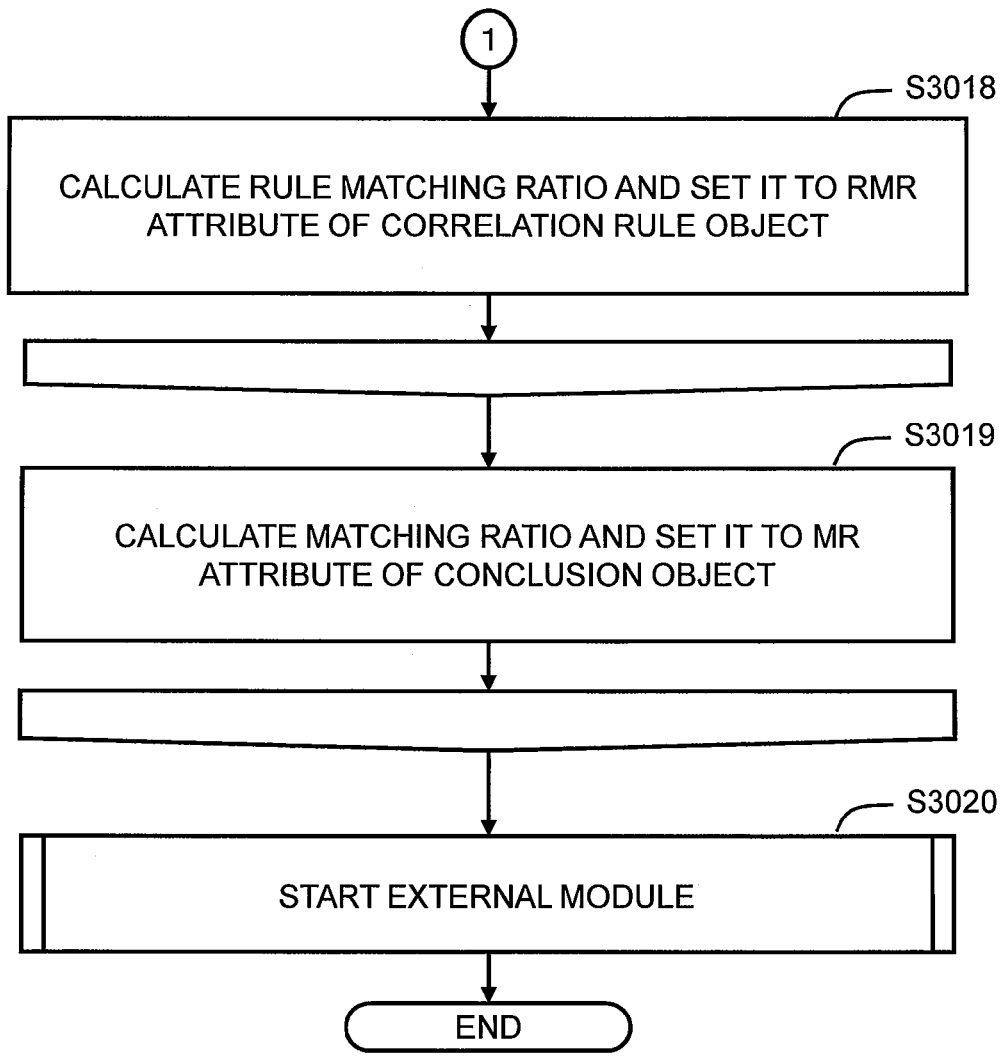
FIG. 30B is a flowchart continued from FIG. 30A.

In the example 2, in order to solve the above described problem, structures and generation processing of the correlation rules and the correlation rule memories and calculation processing of the matching ratio evaluation are modified. The structures of the modified correlation rules are shown in FIG. 26 (FIG. 26A, FIG. 26B), the structures of the correlation rule memories are shown in FIG. 27, the development processing of general rule with multiple cause propagation condition in the correlation rule generation processing is shown in FIG. 28, the correlation rule memory generation processing is shown in FIG. 29, and the calculation processing of the matching ratio evaluation is shown in FIG. 30 (FIG. 30A, FIG. 30B), respectively.

The other structures and processing of data are the same as those of the example 1. In the example 2, the monitoring targets and fault occurrence pattern which are to be subjected to the root cause analysis will be described by taking cases different from those in the example 1. Exemplary hardware and logical composition of the monitoring target for describing the example 2 are shown in FIG. 22, an example of the configuration information table is shown in FIG. 23, an example of the general rule in the general rule repository 136 is shown in FIG. 24, an example of the topology construction method in the topology construction method repository 135 is shown in FIG. 25, respectively.

<Hardware Configuration and Logical Composition of Monitoring Target>

Figure 22:
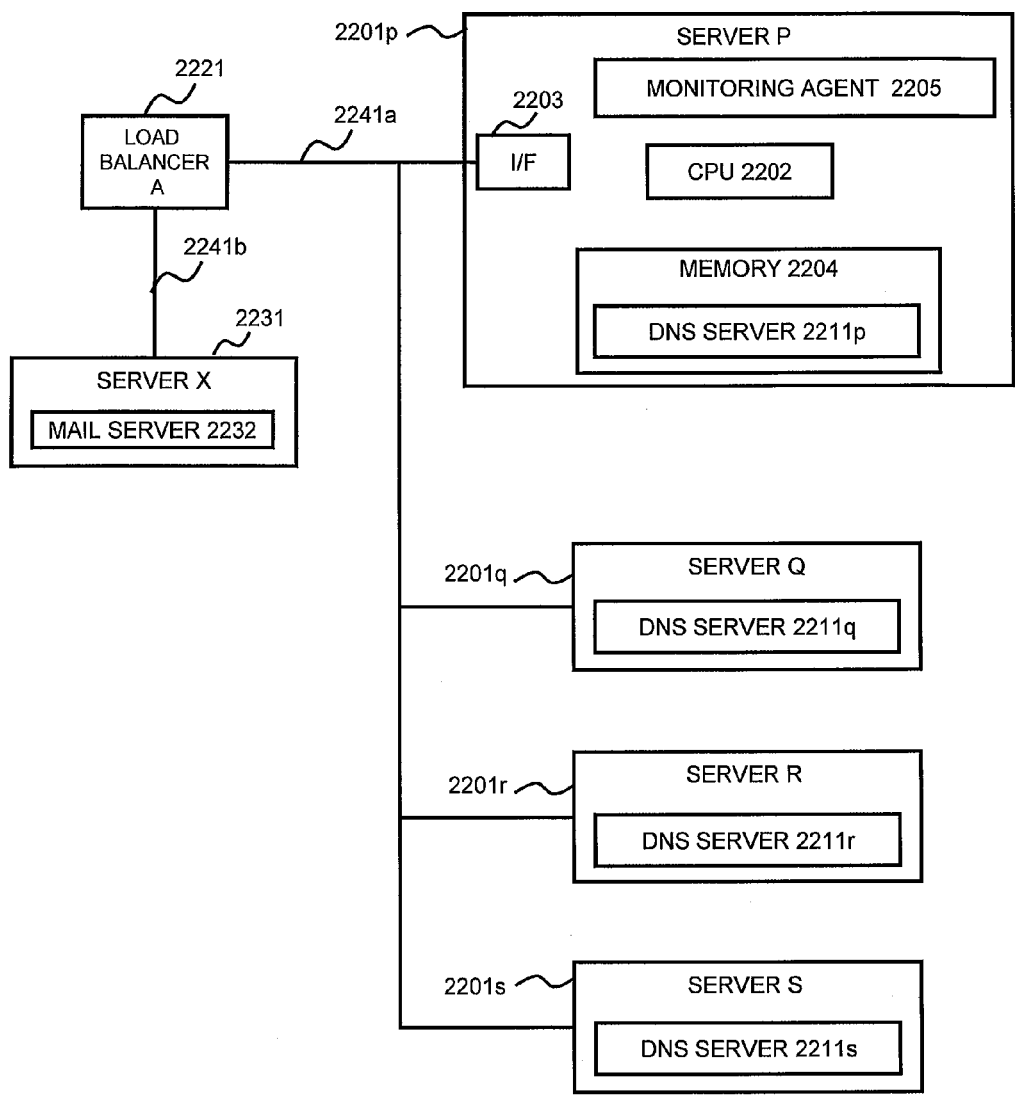
FIG. 22 is a diagram illustrating an example of a hardware configuration and a logical composition of monitoring targets of an embodiment 2.

FIG. 22 shows exemplary hardware and logical composition of a monitoring target for describing this embodiment.

Each of servers 2201 (p to s), 2231 may be a monitoring target node which is executing an application and the like. Each of the servers 2201, 2231 may be a general-purpose computer including a CPU 2202, a memory/storage 2204, and a network interface 2203.

Each of the servers 2201, 2231 may also include a monitoring agent 2205 as in the example 1. When a specific state transition is detected, the monitoring agent 2205 sends an event message to the monitoring computer 101 via a LAN 2241.

In this embodiment, as an example, the server 2201 has a DNS (Domain Name System) server 2211, and the server 2231 has a mail server 2232. The DNS server 2211 provides the DNS service for the mail server 2232 via the LAN 2241. The DNS server 2211 may be referred to as an application 2211. The server may be referred to as a computer.

As an example, a load balancer 2221 may be an apparatus for improving scalability of the DNS service provided by the application 2211. The load balancer 2221 once collects requests for the DNS service, then allocates the requests to any of the servers 2201p to 2201s according to a specific rule. The application 2211 which received the request provides the DNS service for the mail server 2232 which originated the request. As such, the load balancer 2221 may be an apparatus for improving scalability of the DNS service by distributing the load on each server 2201.

This embodiment improves scalability of the DNS service by using the four servers 2201 which provides the DNS service and one load balancer 2221. Any number of load balancers 2221 and any number of servers 2201 may be used without limited to the above numbers. A service other than the DNS service may be provided. In addition, one or more network switches may be provided between the server 2231 and the load balancer 2221 and between each server 2201 and the load balancer 2221.

<Configuration Information Table>

FIG. 23 shows a data structure of the configuration information table 137 according to this embodiment. Also in this embodiment, as in the example 1, the configuration information table 137 is used for searching for the topology information of the monitoring target managed component, to which the general rule is applied, when the correlation rule dependent on a specific topology is generated from the general rule.

As examples of the configuration information of this embodiment, each item of a computer managing table 2300a which stores information on the computers (servers 2201, 2231), and each item of a load balancer managing table 2300c which stores information on the load balancer 2221 are considered.

The columns 2301a, 2302a, 2303, 2304 among the columns of the computer managing table 2300a have the same structures of 301a, 302a, 303, 304 of the computer managing table 300a in the example 1. However, the data registered in the managing table 300a of the example 1 and the data registered in the computer managing table 2300a of FIG. 23 may be different from each other.

The computer managing table 2300a has a column 2305. The column 2305 stores the managed component identifier for identifying the load balancer 2221 to which the corresponding computer 2201 is connected, and is referred to as connected load balancer 2305.

The load balancer managing table 2300c includes three columns of a managed component identifier 2301c which stores a unique value for identifying each load balancer 2221, a managed component type 2302c which represents the type of the corresponding managed component, a computer 2201 to which the corresponding load balancer 2221 is connected, and a connected computer 2306 which stores the managed component identifier of 2231.

Also in this embodiment, as in the example 1, the topology information can be acquired from the configuration information table 137.

<General Rule Name>

FIG. 24 shows a data structure of the general rule according to this embodiment. Also in this embodiment, as in the example 1, the general rule is a fault propagation model described in a form independent from a specific topology.

The general rule 2400 of FIG. 24 is an example of general rule which is used in the root cause analysis performed on a fault of a complex fault propagation pattern. The general rule 2400 suggests that a combination of NIC faults of a computer 2201 is the root cause. The general rule 2400 of FIG. 24 has the same structure as that of the general rule 400 of FIG. 4 in the example 1. However, the information registered in the general rule 400 of the example 1 and the information registered in the general rule 2400 of FIG. 24 may be different from each other.

The general rule shown in FIG. 24, i.e., the general rule 2400, the general rule name 2411 of which is indicated by GeneralRule11 will be described. As the IF parts 2412, when the "ServiceResponseTime_ThresholdErr (the service response time threshold value exceeding error) in a computer, the access service of which is a specific service ServiceX" and "(Nic_Err (NIC fault error) in the computer, the provided service of which is the specific service ServiceX" are detected, is defined as a condition.

If the condition of the IF part 2412 is satisfied, the THEN part 2413 concludes that "the provided service is (Nic_Err (NIC fault error) in the computer of ServiceX" is the cause.

The multiple cause propagation condition 2431 described in the general rule 2400 of FIG. 24 is the data with the same meaning as that of the multiple cause propagation condition 431 of FIG. 4 in the example 1.

Also "% ServiceX %" is the data with the same meaning as that described in the general rule 400 of FIG. 4 of the example 1.

<Topology Construction Method>

FIG. 25 shows a configuration example of topology construction method information according to this embodiment. Also in this embodiment, as in the example 1, the topology construction method information is the information defining a means for generating the information on the association (topology) among a plurality of managed components which is to be the monitoring targets based on the configuration information.

The topology construction method 2500 of FIG. 25 has the same structure as that of the topology construction method 500 of FIG. 5 in the example 1. However, the information registered in the topology construction method 500 of the example 1 and the information registered in the topology construction method 2500 of FIG. 25 may be different from each other.

The topology construction method 2500 of FIG. 25 is a topology construction method used by the correlation rule generator program 129 in generating an correlation rule from the general rule GeneralRule11.

The topology construction method 2500 shown in FIG. 25 indicates the matters below as for the topology information to apply to GeneralRule11. The topology information indicates that it is the topology in which one of the computers is the origin, the load balancer is the transit point, and the other of the computers is the endpoint. Further, the topology information indicates that a combination of computers, in which the connected load balancer of one of the computers has the same managed component identifier of that of any of the load balancers in the monitoring targets, and the connected computer of the above described load balancer has the same managed component identifier as that of the other computer, and the above described one of the computers has the same provided service name as the access service name of the other computer, can be acquired by searching the configuration information table 137 for the combination.

In this embodiment, as in the example 1, "% ServiceX %" in (Computer. access service)=% ServiceX % and (Computer. provided service)=% ServiceX % described in the topology construction method may be a fixed value independent from the environment of the monitoring target or may be a variable. In the case where it is a variable, the identifier of the service provided by the computer or accessed by the computer may be acquired from the configuration information table 137 or the received event message and substituted for the topology construction method 2500 before the topology information is acquired. In this embodiment, it is described as a variable.

<Correlation Rule>

FIG. 26 (FIG. 26A, FIG. 26B) shows an exemplary configuration diagram of the correlation rule saved in the correlation rule list 126 for describing this embodiment.

FIG. 26 shows examples of correlation rules 2600 (a to d) which are generated from the general rule 2400 of FIG. 24 and the configuration information table 137 of FIG. 23. As in the example 1, the correlation rule 2600 can be divided into two parts, i.e., the IF part 2611 and the THEN part 2612. Also as in the example 1, the IF part 2611 may include one or more condition elements.

The example 2 is different from the example 1 in that some of the condition elements of the IF part belong to an OR group 2601. In this embodiment, the correlation rule 2600 has identification information which indicates that some of the condition elements of the IF part belong to the OR group 2601. Further, the correlation rule 2600 has information which indicates the maximum weight of each of the OR groups 2601.

That is, in the case where the number of occurring events among the events which are indicated by the condition elements of the OR group 2601 increases to or exceeds the value of the maximum weight 2602 which is configured to the OR group 2601, it is considered that the condition is satisfied with the OR group 2601 as one condition element. Here, one OR group has the maximum weight equal to the weight of the condition element by the value of the maximum weight 2602.

For example, the correlation rule 2600a has two conditions in the IF part, i.e., "<ServerXServiceResponseTime_ThresholdErr (the service response time threshold value exceeding error in ServerX)>" and "<ServerP Nic_Err(NIC fault error in the Server P)>." Further, the IF part of the correlation rule 2600a has the OR group 2601 which has the maximum weight 2602 of "1." The OR group 2601 has three conditions, i.e., "<ServerQ Nic_Err(NIC fault error in Server Q)>," "<ServerR Nic_Err(NIC fault error in Server R)>," and "<ServerS Nic_Err(NIC fault error in the Server S)>."

Therefore, as in the example 1, when an error event like "Nic_Err (NIC fault error)" is received from "Server P" (2201*p* of FIG. 22), the condition "<ServerP Nic_Err>" becomes true.

When an error event like "Nic_Err (NIC fault error)" is received from any one of "Server Q," "Server R," and "Server S," the OR group becomes true.

If all the conditions of the IF part are true, it is estimated that the conclusion element of the THEN part is true according to a specific rule. For example, the correlation rule 2600*a* has the conclusion element "<ServerP Nic_Err>." Therefore, according to the correlation rule 2600*a*, in the case where the Server X reports an error which indicates the exceeding of the threshold value of the service response time, and the Server P reports the NIC fault error, and any one of the Server Q, the Server R, and the Server S reports the NIC fault error, it is estimated that the root cause of these errors is the NIC fault in the Server P Also in this embodiment, as in the example 1, each element of the IF part and the THEN part of the correlation rule 2600 includes the identifier for identifying the managed component, which is the monitoring target, and the event type representing the type of the event.

<Correlation Rule Memory>

FIG. 27 shows an example of association between the object models which are saved in the correlation rule memory 121 according to this embodiment.

In FIG. 27, five kinds of objects, i.e., condition objects 2701, operator objects 2702, correlation rule objects 2703, conclusion objects 2704, and OR group objects 2705 are shown. These objects and connections between them are generated by the correlation rule memory generator program 122.

The condition objects 2701, the operator objects 2702, the correlation rule objects 2703, and the conclusion objects 2704 have the same attributes as those of the condition objects 701, the operator objects 702, the correlation rule objects 703, and the conclusion objects 704 of FIG. 7 of the example 1.

The example 2 is different from the example 1 in that the OR group object 2705 may be present in the correlation rule memory 121 and, in the case where the OR group object 2705 is to be added, the OR group object 2705 is connected between the correlation rule object 2703 and the operator object 2702.

The OR group object 2705 has two kinds of attributes. The two kinds of attributes are the "maximum weight" (MaxWeight), which is the maximum weight value which can be allocated to the OR group object 2705, and the "weight," which is the weight value allocated to the OR group object 2705.

The value of the maximum weight 2602 of the correlation rule 2600 is configured to the value of the "maximum weight" of the OR group object 2705. The OR group object 2705 is connected to the operator object 2702 and the operator object 2702 is connected to the condition object 2701. To the attribute "weight" of the OR group object 2705, the smaller value of the sum of the "weight" of the condition objects 2701 connected to the OR group object 2705 and the "maximum weight" is configured.

As in the example 1, in this embodiment, the conclusion object 2704 connected to the correlation rule object 2703 indicates the conclusion element of one correlation rule. If the OR group 2601 is not present in the correlation rule 2600, the operator object 2702 connected to the correlation rule object 2703 and, further, the condition object 2701 connected to the operator object 2702 indicate the condition element of one correlation rule, as in the example 1.

If the OR group 2601 is present in the correlation rule 2600, the OR group object 2705 is connected to the correlation rule object 2703. Also, the operator object 2702 corresponding to the condition element belonging to the OR group 2601 is connected to the OR group object 2705 and, further, the condition object 2701 is connected to the operator object 2702.

The condition element which does not belong to the OR group is, as in the example 1, the operator object 2702 is connected to the correlation rule object 2703 and, further, the condition object 2701 is connected to the operator object 2702.

Also in this embodiment, as in the example 1, this object model is formed without redundancy of the condition element and the conclusion element. The correlation rule memory generator program 122 excludes redundancy in generating the condition object 2701.

For example, the correlation rule object 2703*a* has three connections with the operator objects 2702*a*, 2702*b*, and the OR group object 2705*a*. Here, the OR group object 2705*a* has three connections with the operator objects 2702*c*, 2702*d*, 2702*e*. The respective operator objects 2702 are connected to just one condition object 2701. Therefore, the IF part of the "correlation rule 2600*a*" includes two conditions and one OR group, and three conditions belong to the OR group.

In addition, the correlation rule object 2703*a* is connected to the conclusion object 2704*a*. Also the correlation rule object 2703*b* has three connections with the operator objects 2702*b*, 2702*e*, and the OR group object 2705*b*, and the OR group object 2705*b* has three connections with the operator objects 2702*a*, 2702*c*, 2702*d*. Therefore, the operator objects 2702*a* to 2702*e* are shared by the correlation rule objects 2703*a*, 2703*b*, and the OR group objects 2705*a*, 2705*b*.

Also in this embodiment, the "rule matching ratio" is the likelihood calculated by the ratio of the condition elements of the correlation rule to be true to the whole condition elements of the correlation rule. However, the total number of the condition elements which belong to the OR group is adapted to be the value configured to the "maximum weight" attribute of the OR group object 2705.

As a result, the expression for calculating the rule matching ratio is changed as described below.

> RMR=(the number of condition elements which are true out of the OR group+weight of the OR group)/(the total number of condition elements out of the OR group+the maximum weight of the OR group)

For example, in FIG. 27, the condition elements 2701*c*, 2701*d* are true. Therefore, since the sum of weights of the condition elements which belong to the OR group object 2705*a* is 1.0+1.0=2.0 and the "maximum weight" of the OR group object 2705*a* is 1.0, the analysis engine configures the smaller value 1.0 to the "weight" attribute of the OR group object 2705*a*.

Also the condition elements 2701*a*, 2701*b* of the correlation rule 2600*a* are true, the total number of the condition elements of the correlation rule 2600*a* is two, except for the condition elements belonging to the OR group, and the "maximum weight" of the OR group of the correlation rule 2600*a* is 1.0. Therefore, the analysis engine calculates the rule matching ratio of the correlation rule 2600*a* at (2+1.0)/(2+1.0)=1.0.

Also in this embodiment, as in the example 1, the analysis engine calculates the "rule matching ratio" and the "matching ratio." As a result, the conclusion of the highest ratio can be decided, even if only one of the condition elements is not true, which might be the case where the event message for one of the managed components is not sent to the analysis engine.

<Correlation Rule Generator Program>

In the example 1, an example of correlation rule generation processing which is performed by the correlation rule generator program 129 in the monitoring computer 101 is shown in FIG. 13, FIG. 14, FIG. 15, FIG. 16.

In this embodiment, the processing performed by the correlation rule generator program 129 is different from that of the example 1 in only the "development processing of general rule with multiple cause propagation condition" shown in FIG. 15. Therefore, FIG. 28 shows a flowchart of the development processing of general rule with multiple cause propagation condition performed by the correlation rule memory generator program 129.

In step S2811, the "development processing of general rule with multiple cause propagation condition" receives the general rule 2400, the topology construction method 2500, and the topology information as parameters. Hereinafter, the processing may be referred to as development processing with condition.

In step S2812, the development processing with condition acquires all of the predetermined entries from the topology information acquired in step S2811. Here, the predetermined entry is the entry of the configuration information table 137 corresponding to the managed component condition described in the condition element to which the multiple cause propagation condition 2431 is not configured among the condition elements of the IF part in the general rule 2400.

In step S2813, based on the means indicated by the topology construction method 2500 acquired in step S2812, the development processing with condition acquires all the topology information, which is different from the topology information acquired in step S2811 and includes the entries of the configuration information table 137 acquired in step S2812, from the configuration information table 137.

In step S2814, the development processing with condition repeats the processing from step S2815 to step S2822 for all the topology information acquired in step S2811 and step S2813, respectively.

In step S2815, the development processing with condition generates the IF part of the correlation rule based on the managed component identifiers included in the specific topology information, and information of the IF part of the general rule 2400 acquired in step S2811.

In step S2816, the development processing with condition generates the THEN part of the correlation rule 2600 based on the managed component identifiers included in the specific topology information, and information of the THEN part of the general rule 2400 acquired in step S2811.

In step S2817, the development processing with condition extracts the managed component identifier corresponding to the condition elements, by which the multiple cause propagation condition 2431 is configured to the general rule 2400 acquired in step S2811, from all the topology information, except for specific topology information, among the topology information acquired in step S2811 and step S2813.

In step S2818, the development processing with condition generates the condition elements of the correlation rule based on the managed component identifiers extracted in step S2817 and information of the IF part of the general rule 2400 acquired in step S2811, and adds the condition elements to the IF part of the correlation rule 2600 generated in step S2815.

In step S2819, the development processing with condition groups the condition elements added in step S2818 into the OR group 2601, and adds, to the correlation rule, the information for indicating that the corresponding condition elements belong to the OR group 2601.

In step S2820, the development processing with condition acquires the numerical value X which is configured in the multiple cause propagation condition 2431 of the general rule 2400 acquired in step S2811.

In step S2821, the development processing with condition configures the numerical value "X−1" to the maximum weight 2602 of the OR group 2601 which was configured in step S2819.

In step S2822, the development processing with condition integrates the IF part of the correlation rule 2600 to which information was added in step S2818 and step S2819 and the THEN part of the correlation rule 2600 generated in step S2816 into the correlation rule 2600. The development processing with condition adds the generated correlation rule 2600 to the correlation rule list 126.

For example, the development processing with condition receives the general rule 2400 of FIG. 24 (the value "DNSService" is substituted for % ServiceX %), the topology construction method 2500 of FIG. 25 (the value "DNSService" is substituted for % ServiceX %, and the value "MailService" is substituted for % ServiceY %), and the topology information "entry 2311—entry 2321—entry 2315" as parameters (step S2811).

The development processing with condition acquires the entry 2315 which satisfies the condition of the managed component indicated by the condition element "Computer. access service=DNSService ServiceResponseTime_ThresholdErr" of the general rule 2500, to which the multiple cause propagation condition 2431 is not configured, from the topology information entry 2311—entry 2321—entry 2315" acquired in step S2811 (step S2812).

Since the identifier stored in the connected load balancer 2305 of the entry 2315 of the configuration information table 137 is "LoadBalancerA" based on the topology construction condition 2515 "(Computer. connected load balancer)=(LB. managed component identifier))" in the topology construction method 2500, the development processing with condition acquires the entry with the identifier "LoadBalancerA" from the load balancer managing table 2300c for the entry 2315 of the endpoint managed component. As a result, the development processing with condition acquires the entry 2321.

Further, based on the topology construction condition 2515 "(LB. connected computer)=(Computer. managed component identifier)" and "(Computer. provided service)=(Computer. access service)," the development processing with condition searches for the entry (except for the entry 2311) which is the identifier stored in the connected computer 2306 of the entry 2321 and has the provided service 2303 of the computer managing table 2300a "DNSService."

As a result, the development processing with condition acquires the "topology information "entry 2312—entry 2321—entry 2315," "entry 2313—entry 2321—entry 2315," "entry 2314—entry 2321—entry 2315" for the found ServerQ, ServerR, ServerS (step S2813).

The development processing with condition selects any one of the topology information acquired in step S2811 and step S2813. For example, in the case where the topology information "entry 2311—entry 2321—entry 2315" is selected, the development processing with condition generates from the IF part of the general rule 2400 and the entries included in the topology information, the IF part 2611 of FIG. 26 which has "ServiceResponseTime_ThresholdErr" of ServerX (entry 2315) and "Nic_Err" of ServerP (entry 2311) as the condition part (step S2814 to step S2815).

The development processing with condition generates the THEN part 2612 of FIG. 26 which has "Nic_Err" of ServerP (entry 2311) as the conclusion part based on the topology information "entry 2311—entry 2321—entry 2315" and the general rule 2400 (step S2816).

The development processing with condition acquires the managed component identifiers ServerQ, ServerR, ServerS corresponding to the condition element "Computer. provided service=DNSService Nic_Err" of the general rule 2400 from the rest of the topology information which was not selected (step S2817).

The development processing with condition generates "Nic_Err" of each of ServerQ, ServerR, ServerS as the condition element of the correlation rule 2600a from the IF part of the general rule 2400 and the acquired managed component identifier. The development processing with condition groups these generated condition elements together as the OR group, and adds the OR group 22601 to the IF part of the correlation rule 2600 (steps S2818 to S2819).

The development processing with condition acquires the numerical value "2" which is configured to the multiple cause propagation condition 2431 of the general rule 2400, calculates (2−1)=1 from the acquired value, and configures the numerical value 1 to the maximum weight 2602 of the OR group 2601 (steps S2820 to S2821). The development processing with condition integrates the generated IF parts 2611, 2601 and THEN part 2612 of the correlation rule into the correlation rule 2600a, and adds the correlation rule 2600a to the correlation rule list 126 (step S2822).

<Correlation Rule Memory Generator Program>

FIG. 29 shows a flowchart of an example of correlation rule memory generation processing performed by the correlation rule memory generator program 122 according to this embodiment.

In step S2911, the correlation rule memory generator program 122 receives the correlation rule list 126 as parameters.

In step S2912, the correlation rule memory generator program 122 repeats the processing from step S2913 to step S2920 for all the correlation rules 2600 included in the correlation rule list 126 acquired in step S2911.

In step S2913, the correlation rule memory generator program 122 parses the specific correlation rules 2600 in the correlation rule list 126 acquired in step S2911.

In step S2914, the correlation rule memory generator program 122 generates the condition objects 2701 and the operator objects 2702 for the correlation rule memory 121 by performing the processing equal to that from step S1714 to step S1718 shown in FIG. 17 of the example 1, and connects these objects 2701, 2702 with each other.

In step S2915, the correlation rule memory generator program 122 generates the correlation rule object 2703 corresponding to the specific correlation rules 2600 in the correlation rule memory 121.

In step S2916, the correlation rule memory generator program 122 examines whether the OR group 2601 is present in the specific correlation rules 2600. If the OR group is not present (S2916: NO), the processing jumps step S2917 to step S2919 to proceed to step S2921 to be described later. If the OR group is present (S2916: YES), the processing proceeds to step S2917.

In step S2917, the correlation rule memory generator program 122 generates the OR object 2705 in the correlation rule memory 121, and connects all the operator objects 2702 corresponding to the condition elements which belong to the OR group 2601 of the specific correlation rules 2600.

In step S2918, the correlation rule memory generator program 122 acquires the maximum weight 2602 of the OR group 2601 from the specific correlation rules 2600, and configures it to the "maximum weight" attribute of the OR object 2705 which was generated in step S2917.

In step S2919, the correlation rule memory generator program 122 connects the OR object 2705 generated in step S2917 with the correlation rule object 2703 generated in step S2915.

In step S2921, the correlation rule memory generator program 122 connects the correlation rule object 2703 generated in step S2915 with the related operator object 2702.

In step S2920, the correlation rule memory generator program 122 performs the processing equal to that from step S1720 to step S1724 shown in FIG. 17 of the example 1, and connects the correlation rule object 2703 with the related conclusion object 2704.

In step S2921, the correlation rule memory generator program 122 deletes all the correlation rules 2600 in the correlation rule list 126 which were processed from step S2913 to step S2920.

For example, it is assumed that the correlation rule 2600a of FIG. 2 is on the correlation rule list 126 which was received by the correlation rule memory generator program 122 as parameters and that the correlation rule memory generator program 122 selects the correlation rule 2600a.

At that time, the correlation rule object 2703a corresponding to the correlation rule 2600a shown in FIG. 27 is generated in the correlation rule memory 121. As shown in FIG. 27, the condition objects 2701 of the correlation rule 2600a are 2701a to 2701e.

These condition objects 2701a to 2701e are connected with the operator objects 2702a to 2702e, respectively. The conclusion object 2704 of the correlation rule 2600a is 2704a. Since the correlation rule 2600a has the OR group 2601, the OR group object 2705a is generated in the correlation rule memory 121.

The condition objects 2701 corresponding to the condition elements which belong to the OR group of the correlation rule 2600a are 2701c, 2701d, 2701e. Therefore, the connections 2704a to 2703a to 2702a to 2701a, 2704a to 2703a to 2702b to 2701b, 2704a to 2703a to 2705a to 2702c to 2701c, 2704a to 2703a to 2705a to 2702d to 2701d, 2704a to 2703a to 2705a to 2702e to 2701e need to be generated with respect to the correlation rule object 2703a for the correlation rule 2600a.

Similarly, if the correlation rule 2600b is selected, the correlation rule object 2703b is generated, and the condition objects 2701 of the correlation rule 2600b are also 2701a to 2701e. Also, since the correlation rule 2600b has the OR group, the OR object 2705b is generated, and the condition objects 2701 corresponding to the condition objects which belong to the OR group of the correlation rule 2600b are 2701a, 2701c, 2701d.

Therefore, the condition objects 2701a to 2701e overlap those of the correlation rule 2600b. In that case, the correlation rule objects 2703a, 2703b and the OR objects 2705a, 2705b share the corresponding operator objects 2702a to 2702e and the condition objects 2701a to 2701b.

<Matching Ratio Evaluation Program>

FIG. 30 (FIG. 30A, FIG. 30B) shows a flowchart for performing the matching ratio evaluation which is performed by the matching ratio evaluation program 125 according to this embodiment.

In step S3001, when the matching ratio evaluation program 125 is started by the event writing program 124 or the event deleting program 127, it receives the specific condition object

2701 as a parameter. Hereinafter, the matching ratio evaluation program 125 may be referred to as evaluation program 125 for short.

In step S3002, the evaluation program 125 acquires the operator object 2702 connected with the specific condition object 2701 which is passed as a parameter.

In step S3003, the evaluation program 125 acquires all of the correlation rule object 2703 or the OR group object 2705 connected with the specific operator object 2702 extracted in step S3002.

In step S3004, the evaluation program 125 acquires all the correlation rule object 2703 connected with the OR group object 2705 acquired in step S3003.

In step S3005, the evaluation program 125 acquires the conclusion object 704 connected with the correlation rule object 2703 acquired in step S3003 or step S3004.

In step S3006, the evaluation program 125 repeats the processing from step S3007 to step S3019 for all the conclusion objects 2704 extracted in step S3005.

In step S3007, the evaluation program 125 acquires all the correlation rule objects 2703 connected with the specific conclusion object 2704.

In step S3008, the evaluation program 125 repeats the processing from step S3009 to step S3018 for all the correlation rule objects 2703 extracted in step S3007.

In step S3009, the evaluation program 125 acquires all the condition objects 2701 together with the specific correlation rule objects 2703 acquired in step S3007 by tracing the connections from the specific correlation rule objects 2703 to any of the other operator objects 2702, then, from any of the operator objects 2702 to any of the other condition objects 2701.

In step S3010, the evaluation program 125 calculates the sum of the weight values of all the condition objects 2701 acquired in step S3009. For example, in the example shown in FIG. 27, the correlation rule object 2703*a* is connected with the operator objects 2702*a*, 2702*b*. The operator objects 2702*a*, 2702*c* are connected with the condition objects 2701*a*, 2701*b*, respectively. Each of the condition objects 2701*a*, 2701*b* has the weight value of 1.0; therefore, the sum of weights is equal to 2.0 in this example.

In step S3011, the evaluation program 125 examines whether the OR group objects 2705 are connected with the specific correlation rule objects 2703. If they are not connected (S3011: NO), the processing jumps step S3012 to step S3017 and proceeds to the next processing. Otherwise (S3011: YES), the processing proceeds to step S3012.

In step S3012, the evaluation program 125 repeats the processing from step S3013 to step S3017 for all the OR group objects 2705 connected with the specific correlation rule objects 2703.

In step S3013, the evaluation program 125 acquires all the condition objects 2701 together with the specific OR group objects 2705 by tracing the connections from the specific OR group objects 2705 to any of the other operator objects 2702, then, from any of the operator objects 2702 to any of the other condition objects 2701.

In step S3014, the evaluation program 125 calculates the sum of the weight values of all the condition objects 2701 acquired in step S3013.

In step S3015, the evaluation program 125 compares the sum of the weight values of condition objects 2701 calculated in step S3014 with the value stored in the "maximum weight" attribute of the specific OR group objects acquired in step S3013 for examining whether the sum of the weight values calculated in step S3013 is the bigger. If it is bigger (S3015: YES), the processing proceeds to step S3016. Otherwise (S3015: NO), the processing proceeds to step S3017.

In step S3016, the evaluation program 125 configures the value stored in the "maximum weight" attribute of the specific OR group objects 2705 acquired in step S3013 to the "weight" attribute of the specific OR group objects 2705.

In step S3017, the evaluation program 125 configures the sum of the weight values of the condition objects 2701 calculated in step S3014 to the "weight" attribute of the specific OR group objects 2705 acquired in step S3013.

For example, in the example shown in FIG. 27, the correlation rule object 2703*a* is connected with the OR group object 2705*a*. The OR group object 2705*a* is connected with the operator objects 2702*c* to 2702*e*. The operator objects 2702*c* to 2702*e* are connected with the condition objects 2701*c* to 2701*e*, respectively. Each of the condition objects 2701*c*, 2701*e* has the weight value of 1.0, and the condition object 2701*e* has the weight value of 0.0. As a result, the sum of the weights is 2.0 in this embodiment.

On the other hand, 1.0 is configured to the "maximum weight" attribute of the OR group object 2705*a*. Therefore, since the sum of the weight values of the condition objects 2701 of the OR group object 2705*a* is bigger than the value of the "maximum weight" attribute of the OR group object 2705*a* (S3015: YES), the value "1.0" is stored in the "weight" attribute of the OR group object 2705*a* (S3016).

In step S3018 shown in FIG. 30B, the evaluation program 125 calculates the value of the rule matching ratio (RMR) according to the expression "RMR=(the number of the condition elements of true out of the OR group+the weight of the OR group)/(the total number of the condition elements out of the OR group+the maximum weight of the OR group," and configures the result to the RMR attribute of the corresponding correlation rule object 2703.

For example, as shown in FIG. 27, the number of the condition elements of true out of the OR group is two of the condition objects 2701*a*, 2701*b*, the weight of the OR group is 1.0 from the value of the "weight" attribute of the OR group object 2705*a*, the total number of the condition elements out of the OR group is two of 2701*a*, 2701*b*, and the maximum weight of the OR group is 1.0 from the value of the "maximum weight" attribute of the OR group object 2705*a*. As a result, the RMR of the correlation rule object 2703*a* is 1.0 (i.e., 3.0/3.0).

In step S3019, the evaluation program 125 calculates the value of the matching ratio (MR) according to the expression "Max (the RMR of the connected correlation rule object)," and configures the result to the MR attribute of the corresponding conclusion object 2704.

For example, as shown in FIG. 27, since the correlation rule object connected with the conclusion object 2704*a* is 2703*a*, and the RMR is 1.00, the MR of the conclusion object 2704*a* is 1.0 (i.e., 3.0/3.0).

In step S3020, the evaluation program 125 starts the external module 128 by passing the conclusion object 2704, the matching ratio of which is calculated as a parameter, to the external module 128 and finishes the processing.

As it is apparent from the above described disclosure, in this embodiment, as in the example 1, the root cause analysis can be performed for a fault propagation pattern, by which a managed component receives the propagation of a combination of events occurred in a plurality of managed components. In addition, in the example 2, as compared with the example 1, the number of correlation rules to be generated can be reduced, thus, the memory capacity consumed by the analysis engine and the processing time for calculating the matching ratio can be reduced.

In both of the example 1 and the example 2, the analysis engine (monitoring system 201) can decide the conclusion of the highest ratio by configuring the matching ratio to each conclusion of the analysis, even if only one of the condition elements is not true, which might be the case where the event message for one of the managed components is not sent to the analysis engine.

Also, the analysis engine not only decides the conclusion of the high ratio but also can present an event indicated by the condition element which is not true, an event which is expected to be received (hereinafter, also referred to as expected event) in the case where some of the condition elements related to a conclusion are true among the condition elements related to the conclusion.

That is, in the case where a conclusion is the true cause, the analysis engine can previously derive an event which is definitely triggered by occurrence of the event indicated by the conclusion based on the condition elements of all the correlation rules related to the conclusion. The analysis engine can improve the accuracy of likelihood with respect to the conclusion by presenting the event indicated by the condition element which is not true among the above described condition elements as an expected event so that whether the expected event occurs in fact or not is confirmed by another means.

In the embodiments shown by the example 1 and the example 2, in the case where the conclusion element of the correlation rule is the true cause with respect to the correlation rule for analyzing the fault pattern other than the complex fault propagation pattern, the event indicated by the condition element of the correlation rule always occurs.

However, in the case where the conclusion of the correlation rule is the true cause, all the condition elements of the correlation rule for analyzing the complex fault propagation pattern are not necessarily true. This is because since the complex fault propagation pattern is a fault propagation pattern in which a combination of a plurality of events is the cause, whether a conclusion of the correlation rule causes the events indicated by all the condition elements or not depends on whether another event occurs or not, even if the conclusion of the correlation rule is the true cause.

Therefore, the embodiments may include processing for determining whether or not to present it as the expected event among the events indicated by the condition elements of the correlation rule based on the group of received events.

Figure 31A:
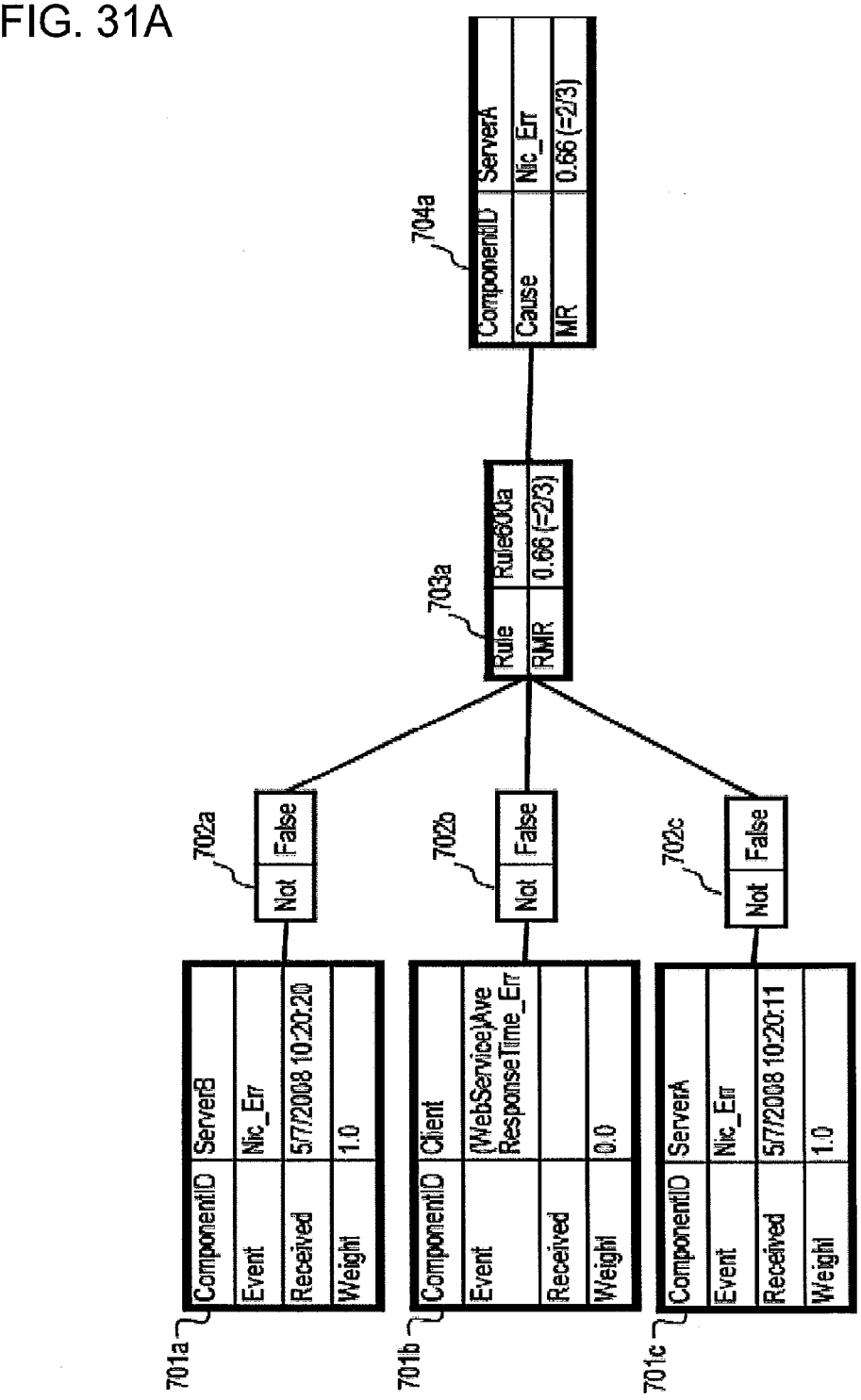
FIG. 31A is a diagram showing an example of a condition element to be presented as an expected event and condition elements not to be presented as an expected event.
Figure 31B:
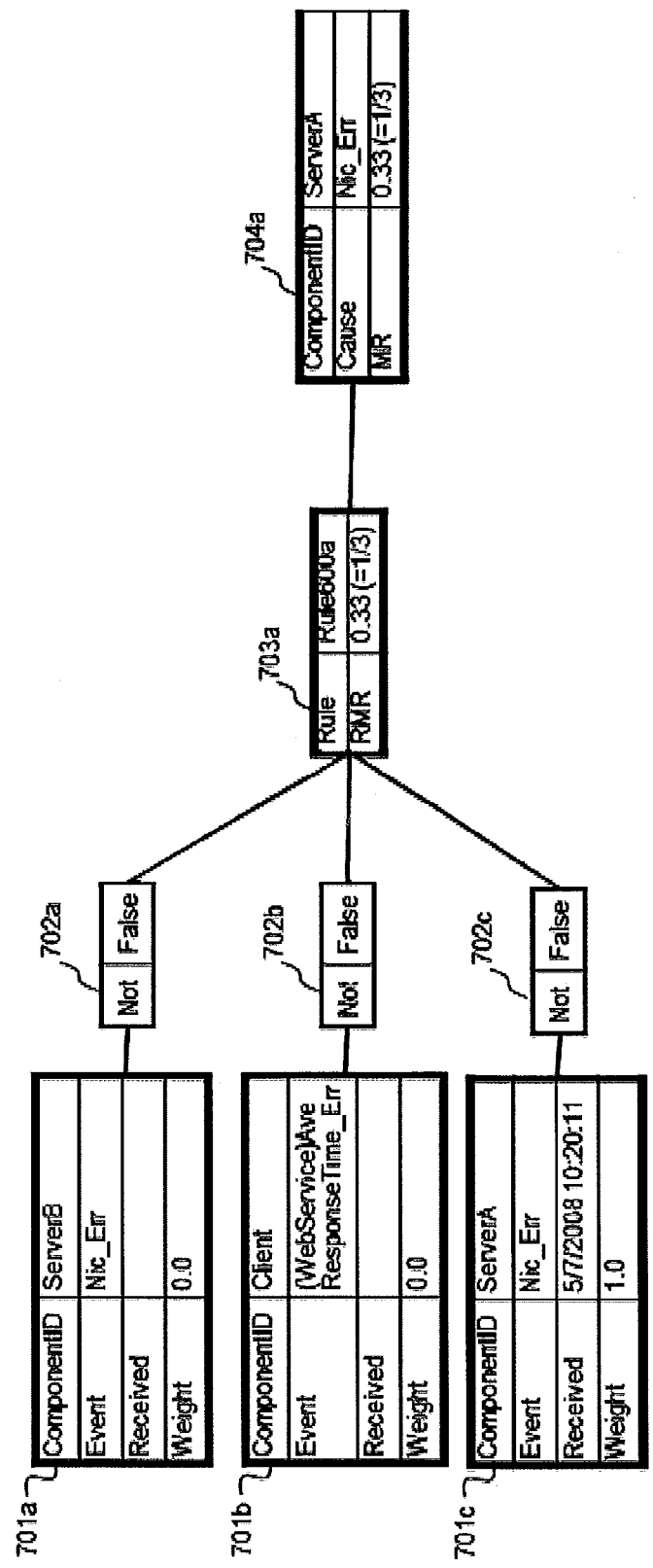
FIG. 31B is a schematic diagram the same as FIG. 31A.

For example, FIG. 31 (FIG. 31A, FIG. 31B) shows an object which represents the correlation rule 600a in the example of associating the correlation rule memory of the object model saved in the correlation rule memory 121 of FIG. 7.

In the object models of FIG. 31, the condition objects 701a, 701c are the condition elements of the correlation rule 600a generated from the condition element to which the multiple cause propagation condition 431 is configured and information of the configuration information table 137 among the condition elements of the IF part 412a of the general rule 400a.

Therefore, as shown in FIG. 31A, in the correlation rule 600a, it can be judged from the general rule 400a that the condition object 701b can be presented as the expected event of the conclusion object 704a in the case where both of the condition objects 701a and 701c are true.

Also, as shown in FIG. 31B, it can be judged from the general rule 400a that the condition object 701b is not presented as the expected event of the conclusion object 704a in the case where either of the condition objects 701a and 701c is true.

Further, the criteria for determining which condition element can be displayed as the expected event in the case which condition element is true may be stored in the correlation rule object 703 when the correlation rule object 703 is generated so that the judgment can be made only based on the information in the correlation rule memory 121.

The configuration described in the embodiments can be expressed as a monitoring method for a computer system as described below.

Expression 1.

A monitoring method for monitoring a computer system including a plurality of monitoring targets by using a computer, wherein the computer comprises a microprocessor for executing a predetermined computer program, a memory to be used by the microprocessor, and a communication interface part for the microprocessor to acquire information from the plurality of monitoring targets;

when the microprocessor executes the predetermined computer program, the computer acquires configuration information of the plurality of monitoring targets and stores the configuration information in the memory, stores a general rule, wherein the general rule previously associates a first event which can occur in any of the plurality of monitoring targets and a second event which can cause the first event, and in the case where a previously configured predetermined number or more of the second events occurred in a previously grouped plurality of predetermined monitoring targets among the plurality of monitoring targets, the general rule leads to an estimate that the second events would have caused the first event, executes an event information storing step of receiving, via the communication interface part, event information of an event which occurred in the plurality of monitoring targets and causing the memory to store the event information, generates an correlation rule at a predetermined timing, wherein the correlation rule is created based on the general rule and the configuration information, and in the case where the predetermined number or more of events corresponding to the second events are detected in events indicated by the event information, the correlation rule indicates that an event corresponding to the first event of the events indicated by the event information will occur, analyzes a cause of an event indicated by the received event information based on the received event information and the correlation rule, and outputs the analysis result to an external apparatus.

Expression 2.

A monitoring method described in expression 1, wherein the predetermined timing is when the event information is received, and the computer generates only an correlation rule related to the received event information when the computer receives the event information.

REFERENCE SIGNS LIST

101: monitoring computer, 102: server, 103: network switch, 141: monitoring agent, 153: client computer, 201: monitoring system, 202: monitoring target, 2201: server (DNS server), 2221: load balancer, 2231: server (mail server)

The invention claimed is:

1. A non-transitory computer readable medium with an executable program stored thereon, where the executable program causes a computer to function as a monitoring apparatus for monitoring a computer system including a plurality of monitoring targets, the monitoring apparatus performing acts comprising:

storing configuration information of the plurality of monitoring targets;

storing a general rule, where the general rule previously associates a first event which can occur in any of the plurality of monitoring targets and a second event which can cause the first event, and in the case where a previously configured predetermined number or more of the second events occurred in a previously grouped plurality of predetermined monitoring targets among the plurality of monitoring targets, the general rule leads to an estimate that the second events would have caused the first event;

storing event information of an event which occurred in the plurality of monitoring targets;

generating a correlation rule, where the correlation rule is created based on the general rule and the configuration information;

analyzing a cause of an event indicated by the received event information based on the received event information and the correlation rule;

upon detecting the predetermined number or more of events corresponding to the second events in events indicated by the event information, indicating, based on the correlation rule, that an event corresponding to the first event of the events indicated by the event information will occur;

outputting an analysis result that an event corresponding to the first event of the events indicated by the event information will occur;

generating the correlation rule related to the received event information and stored in a memory of the monitoring apparatus;

before generating the correlation rule related to the received event information, determining whether the correlation rule is stored in the memory, and in the case where the correlation rule is stored in the memory;

not generating another correlation rule;

calculating a matching ratio which indicates a ratio of the occurrence number of the event corresponding to the first event of the events indicated by the event information to the number of the predetermined monitoring targets; and saving the matching ratio.

2. The non-transitory computer readable medium according to claim 1, for further causing the computer to perform:

outputting the second events which are estimated to be a cause of the event indicated by the event information in a descending order according to the matching ratio.

3. The non-transitory computer readable medium according to claim 2, wherein a predetermined term of validity is configured to the received event information, and wherein the computer is further caused to perform:

estimating a cause of an event indicated by the event information by configuring a predetermined weight value to the received event information; and decreasing a weight value of the event indicated by the event information, the term of validity of which elapsed.

4. The non-transitory computer readable medium according to claim 3, wherein the weight value of the event indicated by the event information, the term of validity of which elapsed, is configured to a minimum value so that the event is treated as if it did not occur.

5. The non-transitory computer readable medium according to claim 4, wherein the general rule includes topology condition information indicating a topology condition wherein the topology condition defines connection between a monitoring target, in which an event corresponding to the first event occurred among the plurality of monitoring targets, and the predetermined monitoring targets, and wherein the correlation rule is generated based on the configuration information corresponding to the topology condition information and the general rule by searching for the configuration information based on the topology condition information corresponding to the event indicated by the event information.

6. The non-transitory computer readable medium according to claim 5, wherein the correlation rule is generated for a case where each of the predetermined monitoring targets causes an event corresponding to the first event.

7. The non-transitory computer readable medium according to claim 6, wherein the correlation rule is generated for each of the predetermined number of possible combinations of the predetermined monitoring targets.

8. The non-transitory computer readable medium according to claim 7, wherein the correlation rule is generated such that correlation rules which have the predetermined monitoring targets in common among all the monitoring targets of the predetermined number of combinations are generated as one correlation rule.

9. A monitoring apparatus for monitoring a computer system including a plurality of monitoring targets, comprising:

a microprocessor for executing a predetermined computer program, a memory to be used by the microprocessor, and a communication interface part for the microprocessor to acquire information from the plurality of monitoring targets, wherein the monitoring apparatus executes:

a configuration information storing step for the microprocessor to acquire configuration information of the plurality of monitoring targets and cause the memory to store the configuration information by executing the predetermined computer program;

a general rule storing step of storing a general rule, wherein the general rule previously associates a first event which can occur in any of the plurality of monitoring targets and a second event which can cause the first event, and in the case where a previously configured predetermined number or more of the second events occurred in a previously grouped plurality of predetermined monitoring targets among the plurality of monitoring targets, the general rule leads to an estimate that the second events would have caused the first event;

an event information storing step of receiving, via the communication interface part, event information of an event which occurred in the plurality of monitoring targets and causing the memory to store the event information;

an correlation rule generating step of generating an correlation rule, wherein the correlation rule is created based on the general rule and the configuration information, and in the case where the predetermined number or more of events corresponding to the second events are detected in events indicated by the event information, the correlation rule indicates that an event corresponding to the first event of the events indicated by the event information will occur;

an analyzing step for analyzing a cause of an event indicated by the received event information based on the received event information and the correlation rule, and an outputting step for displaying an analysis result made by the analyzing step on a display units;

wherein when the event information is received, the correlation rule generating step generates an correlation rule related to the received event information and stores the correlation rule in the memory; and wherein the analyzing step calculates a matching ratio which indicates a ratio of the occurrence number of the event corresponding to the first event of the events indicated by the event information to the number of the predetermined monitoring targets.

10. A monitoring apparatus according to claim 9 wherein the analyzing step
causes the second events which are estimated to be a cause of the event indicated by the event information to be displayed on the display unit in the descending order of the matching ratio.

* * * * *